(12) United States Patent
Tanaka et al.

(10) Patent No.: US 8,146,128 B2
(45) Date of Patent: Mar. 27, 2012

(54) DOWNLOAD EXECUTION APPARATUS

(75) Inventors: Michiko Tanaka, Osaka (JP); Yoshio Kawakami, Osaka (JP)

(73) Assignee: Panasonic Corporation, Osaka (JP)

( * ) Notice: Subject to any disclaimer, the term of this patent is extended or adjusted under 35 U.S.C. 154(b) by 635 days.

(21) Appl. No.: 11/814,731

(22) PCT Filed: Jan. 25, 2006

(86) PCT No.: PCT/JP2006/301157
§ 371 (c)(1),
(2), (4) Date: Jul. 25, 2007

(87) PCT Pub. No.: WO2006/080361
PCT Pub. Date: Aug. 3, 2006

(65) Prior Publication Data
US 2009/0019500 A1 Jan. 15, 2009

(30) Foreign Application Priority Data
Jan. 26, 2005 (JP) .................. 2005-018890

(51) Int. Cl.
*H04N 7/173* (2006.01)
(52) U.S. Cl. ...................................... 725/116
(58) Field of Classification Search .................. None
See application file for complete search history.

(56) References Cited

U.S. PATENT DOCUMENTS

| | | | | |
|---|---|---|---|---|
| 5,485,198 A | * | 1/1996 | Kallstrom | 725/151 |
| 5,666,293 A | * | 9/1997 | Metz et al. | 709/220 |
| 5,956,716 A | * | 9/1999 | Kenner et al. | 707/10 |
| 7,428,023 B2 | * | 9/2008 | Allen et al. | 348/734 |
| 2001/0001160 A1 | * | 5/2001 | Shoff et al. | 725/51 |
| 2002/0031087 A1 | * | 3/2002 | Gotoh et al. | 370/231 |
| 2002/0128029 A1 | * | 9/2002 | Nishikawa et al. | 455/517 |
| 2004/0249783 A1 | * | 12/2004 | Best et al. | 707/1 |
| 2005/0155057 A1 | * | 7/2005 | Wei | 725/38 |
| 2005/0177853 A1 | * | 8/2005 | Williams et al. | 725/81 |
| 2008/0184328 A1 | * | 7/2008 | Kim et al. | 725/151 |

FOREIGN PATENT DOCUMENTS

| | | |
|---|---|---|
| JP | 2000-278621 | 10/2000 |
| JP | 2000 278621 | 10/2000 |
| JP | 2000278621 A * | 10/2000 |

(Continued)

OTHER PUBLICATIONS

English Language Abstract of JP 2000-278621.

(Continued)

*Primary Examiner* — Brian Pendleton
*Assistant Examiner* — Cai Chen
(74) *Attorney, Agent, or Firm* — Greenblum & Bernstein, P.L.C.

(57) ABSTRACT

There is provided a download execution apparatus that can prevent, at least, sudden interruption of the viewing or recording by a user when a program is downloaded. An AM includes a download source determination unit which compares current tuning information and a frequency required for downloading, and determines a download source, a tuning frequency obtainment unit which obtains tuner use situation and the frequency being tuned to by respective tuners that are in use, a download frequency obtainment unit which obtains a frequency required to download an application, a store unit which downloads and stores a program from a determined download source, a notification unit which notifies the downloading of the program to a user, and a tuning request unit which tunes a specified tuner to a frequency required for downloading a program.

45 Claims, 59 Drawing Sheets

FOREIGN PATENT DOCUMENTS

| | | |
|---|---|---|
| JP | 2001 53697 | 2/2001 |
| JP | 2002 41390 | 2/2002 |
| JP | 2002 142164 | 5/2002 |
| JP | 2002 165046 | 6/2002 |
| JP | 2003 67284 | 3/2003 |
| WO | 03/088645 | 10/2003 |

OTHER PUBLICATIONS

English Language Abstract of JP 2001-53697.
English Language Abstract of JP 2002-142164.
English Language Abstract of JP 2002-165046.
English Language Abstract of JP 2002-41390.
OCAP 1.0 Profile OC-SP-OCAP1.0-111-040604, pp. 41-80 (Jun. 2004).
English Language Abstract of JP 2003-67284.
English language translation of JP 2000-278621 (Paragraph Nos. [0001], [0004] and [0012] and Figs. 1-4 and 9-11).
Search report from E.P.O., mail date is Mar. 24, 2010.

* cited by examiner

FIG. 3

| Frequency band | Usage | Modulation technique |
|---|---|---|
| 5~130MHz | Out Of Band (OOB) Data exchange between head end and terminals | QPSK |
| 130~864MHz | In-band Ordinary television broadcasting including video and audio | QAM |

FIG. 4

| Frequency band | Usage |
|---|---|
| 70~74MHz | Data transmission from head end 101 to terminal apparatuses |
| 10.0~10.1MHz | Data transmission from terminal apparatus A 111 to head end 101 |
| 10.1~10.2MHz | Data transmission from terminal apparatus B 112 to head end 101 |
| 10.2~10.3MHz | Data transmission from terminal apparatus C 113 to head end 101 |

FIG. 5

| Frequency band | Usage |
|---|---|
| 150~156MHz | Television channel 1 |
| 156~162MHz | Television channel 2 |
| ⋮ | ⋮ |
| 310~311MHz | Radio channel 1 |
| ⋮ | ⋮ |

| Java (TM) program identifier 1801 | Control information 1802 | DSMCC identifier 1803 | Program name 1804 |
|---|---|---|---|
| 301 | autostart | 1 | /a/TopXlet |
| 302 | present | 1 | /b/GameXlet |

1811
1812

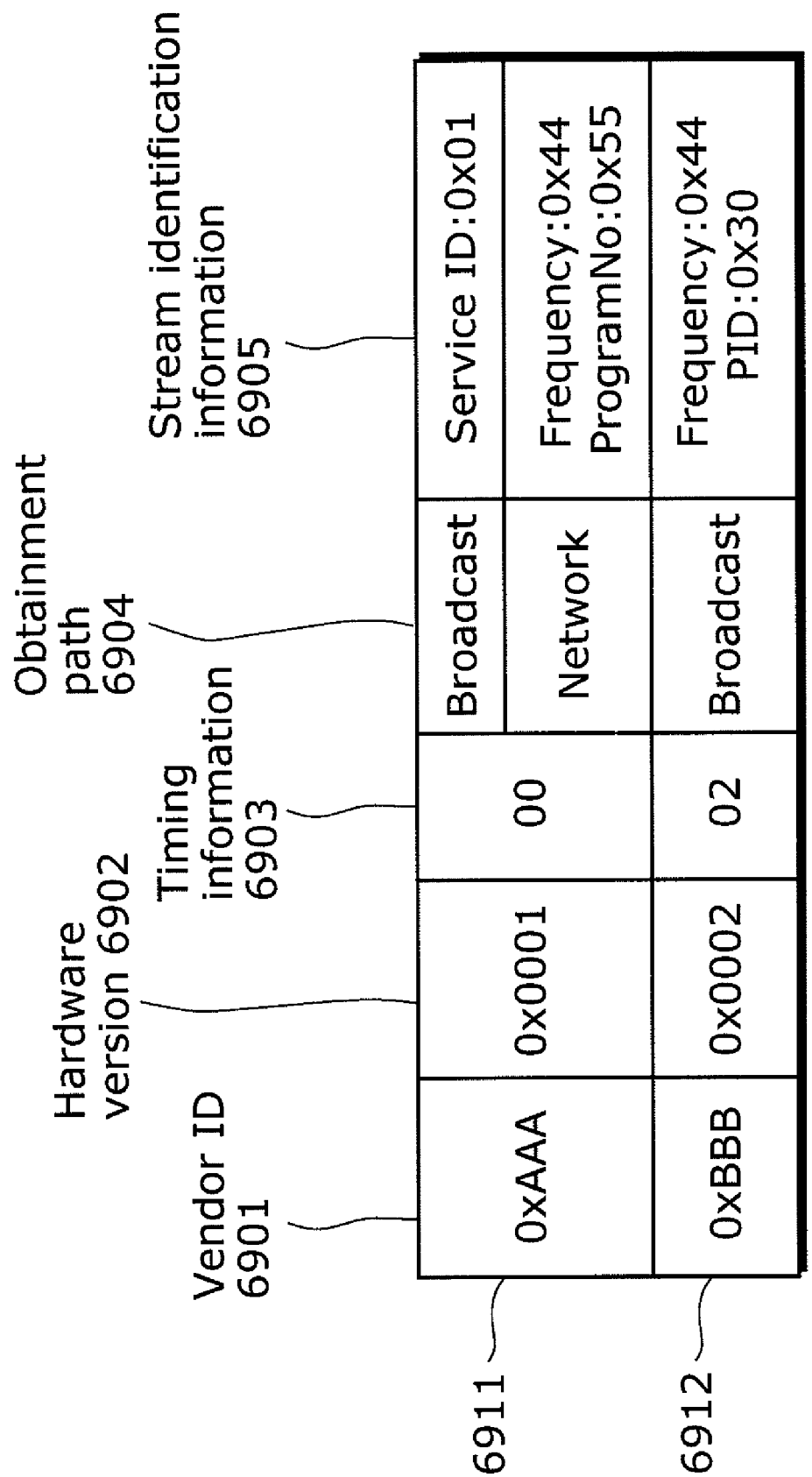

DOWNLOAD EXECUTION APPARATUS

TECHNICAL FIELD

The present invention relates to a download execution apparatus such as a digital broadcast receiver which downloads a program and executes the downloaded program.

BACKGROUND ART

In the downloading of a program with a conventional broadcast receiver, a program to be downloaded is inserted into a transport stream to be sent through a broadcast signal, and a method of downloading by tuning to the transport stream on which the program flows is common. As a method of inserting a program into a transport stream, a method called DSMCC is being used. Since DSMCC is a common technology, detailed description shall be omitted. In this manner, tuning occurs when downloading of a program is performed. For this reason, in a broadcast receiver which performs the downloading of a program, in order not to interrupt the viewing or recording by a viewer, it is detected whether or not the current state of the broadcast receiver is that of viewing or recording, before the downloading of a program is performed, and the downloading of the program is performed when the receiver is in a state where viewing or recording is not being performed. With this, the downloading of a program does not interfere with the TV show viewing or recording of the user.

Meanwhile, Patent Reference 1 proposes a method which inquires from the user whether or not to download a program. Patent Reference 1 is characterized in that, as shown in FIG. 1, when an error occurs within the broadcast receiver, a version upgrade of the program is detected, and confirmation is made, with the user, as to whether or not version upgrading is to be performed.

As described above, as methods for performing the downloading of a program, there exist a method in which downloading is performed only when the state of the broadcast receiver is a state in which viewing or recording is not being performed, as well as a method which notifies a user of whether or not to download when an error occurs in the broadcast receiver so as to receive a reply.

Meanwhile, the broadcast receiver receives a program download request from a broadcast station and starts downloading. In such program download request, there are instances where plural methods with which the broadcast receiver can download are described. As an example, the OCAP Specification (OCAP 1.0 Profile OC-SP-OCAP 1.0-I11-040604) shall be described. The OCAP Specification is characterized in that a program describing a service such as EPG or VOD is downloaded and executed on a broadcast receiver. The OCAP specification stipulates that it is possible to download using distribution by transport stream and distribution via a network. As such, in a broadcast station, a program can be distributed as a transport stream, or distributed via a network, or distributed from both. However, in the OCAP Specification there is no stipulation regarding which distribution method to use, and the conduct to be observed in the case where the viewing of the user is interrupted, when a reception terminal device receives a download request indicating plural downloading methods.

Patent Reference 1: Japanese Unexamined Patent Application Publication No. 2003-67284

DISCLOSURE OF INVENTION

Problems that Invention is to Solve

However, in the method in which downloading is performed only when the state of the broadcast receiver is a state in which viewing or recording is not being performed, there is a problem that the downloading of a program is postponed when a download request from the broadcast station cannot be received in the state where the broadcast receiver is not performing viewing or recording. Furthermore, the user cannot know that the downloading of the program has been postponed. Consequently, although the use of a method which notifies a user when downloading has been considered, since Patent Reference 1 adopts a course of action in which an inquiry as to whether or not to download is made to the user when an error occurs within the broadcast receiver, the downloading of the program does not occur until the error occurs.

Furthermore, when downloading is attempted upon receiving a download request for a program concerning something other than the TV show which is currently being viewed or recorded by the viewer, the viewing or recording by the user will be interrupted in the case where, for example, the tuners that can be used for downloading, out of the tuners included in the broadcast receiver, are all currently being used and the frequency in which the transport stream to be downloaded flows is different from the frequency currently being tuned to.

In addition, the Common Download Specification (Open Cable Common Download Specification) stipulates the method for downloading the firmware (software embedded in a device) of a broadcast receiver into a terminal. The Common Download Specification stipulates the sending of a download request specifying the download timing, in addition to download-source information, to a terminal. As such, depending on the download timing specification, there is a possibility that the viewing by the user will be interrupted. However, the Common Download Specification does not stipulate the conduct to be observed in the terminal in such a case.

Thus, the present invention is conceived in view of the above-mentioned circumstances, and has as an objective to provide a download execution apparatus that can prevent the sudden interruption of the viewing or recording by a user when a program is downloaded.

Means to Solve the Problems

In order to achieve the aforementioned object, the download execution apparatus according to the present invention is a download execution apparatus which executes downloading of a program, the download execution apparatus including: a download request reception unit which receives a download request which includes a plurality of pairs of a download method and download source information of the program; a download source determination unit which determines one pair from among the plurality of pairs included in the download request; and a download execution unit which executes the downloading of the program, based on the pair of the download method and the download source information determined by the download source determination unit.

Accordingly, since a message regarding the downloading of a program is notified to the customer according to whether or not there is a tuner that can be used for downloading a program, it is possible to prevent the sudden interruption of the viewing or recording by a user when a program is downloaded.

Furthermore, it is also possible that the download execution apparatus further includes: a tuning frequency obtainment unit which obtains a frequency being tuned to by the tuner; and a download frequency obtainment unit which obtains a frequency of a broadcast signal which includes the program, based on the download source information, wherein the tuning judgment unit judges whether or not the downloading of the program can be executed with the current tuning, based on the frequency obtained by the tuning frequency obtainment unit and the frequency obtained by the download frequency obtainment unit, and judges that there is a tuner that can be used for the downloading of the program in the case where the downloading of the program can be executed with the current tuning.

Accordingly, it is possible to notify a message to the user, only when there is a need to change the tuning, from the frequency to which the tuner used by the user is tuned, to an other frequency, and execute the downloading of a program. Moreover, messages other than the aforementioned message can also be notified to the user. Furthermore, TV show viewing and recording are examples for the use of a tuner by the user.

Furthermore, it is also possible that the tuning judgment unit further judges whether or not there is a tuner that is not being used, based on the frequency obtained by the tuning frequency obtainment unit, and judges that there is a tuner that can be used for the downloading of the program in the case where there is a tuner that is not being used.

Accordingly, in the case where it is judged that downloading cannot be executed with the current tuning and there is no tuner that is not being used, it is possible to notify a message to the user and execute the downloading of the program.

Furthermore, it is also possible that the download execution apparatus further includes a tuning execution unit which executes tuning to the frequency obtained by the download frequency obtainment unit in the case where the tuning judgment unit judges that the downloading of the program cannot be executed with the current tuning.

Accordingly, by executing tuning when it is judged that downloading cannot be executed with the current tuning, the downloading of the program can be performed.

Furthermore, it is also possible that, when executing the tuning, the tuning execution unit selects a tuner to execute the tuning, in accordance with a use situation of the tuner and a purpose of use.

Accordingly, by selecting the tuner for executing tuning in accordance with the use situation of the tuner and a purpose of use when executing the tuning, it is possible to reduce the impact on the user using the tuner.

Furthermore, it is also possible that the message notification unit notifies the message to the user, in the case where the tuning judgment unit judges that there is no tuner that can be used for the downloading of the program.

Accordingly, by performing message notification to the user in the case where it is judged that downloading cannot be executed with the current tuning and there is no tuner that is not being used, it is possible to notify the message to the user only when there is an impact on the user using the tuner.

Furthermore, it is also possible that the message notification unit displays the message for a predetermined time period. Accordingly, it is possible to prevent the message from being displayed continuously.

Furthermore, it is also possible that the message notification unit notifies to the user that downloading is currently being executed, in the case where the downloading of the program is being executed by the download execution unit. Accordingly, it is possible to notify the download stand-by state to the user.

Furthermore, it is also possible that the message notification unit provides at least one of a predetermined image, a predetermined video, and a predetermined sound to the user, in the case where the downloading of the program is being executed by the download execution unit. Accordingly, it is possible to reduce the annoyance, to the user, caused by the switching of video or sound during downloading.

Furthermore, it is also possible that the download execution apparatus further includes a reply acceptance unit which accepts, from the user, a reply to the message notified to the user by the message notification unit. Accordingly, two-way message notification between the user and the download execution apparatus becomes possible, and it becomes possible for the download execution apparatus to perform processing in accordance with the reply of the user.

Furthermore, it is also possible that the reply acceptance unit sets a time limit for accepting the reply from the user. Accordingly, processing is possible even in the case where the reply of the user cannot be received.

Furthermore, it is also possible that the message notification unit notifies the downloading of the program to the user, and the reply acceptance unit accepts, from the user, an approval or rejection reply to the downloading of the program notified to the user by the message notification unit. Accordingly, it is possible to prevent the downloading of a program that is not desired by the user. Furthermore, it is also possible that the download request includes the plurality of pairs of the download method and the download source information of the program, the download execution apparatus further includes a download source determination unit which determines one pair from among the plurality of pairs included in the download request, and the download execution unit executes the downloading of the program, based on the pair of the download method and the download source information determined by the download source determination unit. Accordingly, it is possible to specify one download method and download source information from the plurality of pairs of download methods and download source information, and perform the downloading of the program.

Furthermore, it is also possible that the message notification unit notifies the downloading of the program and the download method to the user, and the reply acceptance unit accepts, from the user, an approval or rejection reply to the downloading of the program and the download method notified to the user by the message notification unit. Accordingly, it is possible to prevent downloading using a download method that is not desired by the user.

Furthermore, it is also possible that, in the case where the reply acceptance unit accepts, from the user, a rejection reply to the download method, the download source determination unit determines, from among the plurality of pairs included in the download request, a pair having a download method other than the rejected download method. Accordingly, it is possible to prevent downloading using a download method that is not desired by the user.

Furthermore, it is also possible that the message notification unit notifies, based on the plurality of pairs, at least part of the download methods of the program to the user so as to make a download method inquiry, the reply acceptance unit accepts a download method selected by the user from among the download methods of the program notified to the user by the message notification unit, and the download source determination unit determines the pair of the download method accepted by the reply acceptance unit. Accordingly, it is possible to determine the download method desired by the user.

Furthermore, it is also possible that the message notification unit notifies a download method inquiry to the user, in the case where the tuning judgment unit judges that there is no tuner that can be used for the downloading of the program. Accordingly, it is possible for the user to select the download method only when there is an impact on the user using the tuner.

Furthermore, it is also possible that the message notification unit further notifies supplementary information for selecting the download method to the user. Accordingly, it is possible to assist the download source selection process by the user.

Furthermore, it is also possible that the download execution apparatus further includes a timer setting unit which sets a time for starting the downloading of the program. Accordingly, since it is possible to start the downloading at a predetermined time, interruption of subsequent processing for the user can be prevented by setting-in the time at which the processing for the user ends.

Furthermore, it is also possible that the reply acceptance unit accepts the time for starting the downloading of the program from the user, and the timer setting unit is sets the time accepted by the reply acceptance unit as the time for starting the downloading of the program. Accordingly, by setting-in the time at which the processing for the user ends, interruption of subsequent processing for the user can be prevented. Furthermore, it is possible for the user to know when the next downloading will be performed.

Furthermore, it is also possible that the timer setting unit sets the time for starting the downloading of the program, in accordance with a preset time. Accordingly, it is possible to start the downloading from the set time, even when the time for starting the downloading is not set by the user.

Furthermore, it is also possible that the timer setting unit sets the time for starting the downloading of the program, when the reply acceptance unit accepts, from the user, a rejection reply to the downloading of the program. Accordingly, by setting the time at which the processing for the user ends, interruption of subsequent processing for the user can be prevented. Furthermore, it is possible for the user to know when the next downloading will be performed.

Furthermore, the download execution apparatus according to the present invention is a download execution apparatus which executes downloading of a program, the download execution apparatus including: a download request reception unit which receives a download request which includes a plurality of pairs of a download method and download source information of the program; a download source determination unit which determines one pair from among the plurality of pairs included in the download request; and a download execution unit which executes the downloading of the program, based on the pair of the download method and the download source information determined by the download source determination unit.

Accordingly, it is possible to identify one download method and download-source information from plural sets of download methods and download-source information, and perform the downloading of the program.

Furthermore, it is also possible that the download methods of the program in the download request include at least a method of receiving from a stream into which the program is encoded and multiplexed, a method of obtaining from a network, and a method of obtaining the program from a recording medium. Accordingly, it is possible to select the download method from a method of receiving from a stream into which the program is encoded and multiplexed, a method of obtaining from a network, and a method of obtaining the program from a recording medium.

Furthermore, it is also possible that the download execution unit performs at least one of executing the downloading from the stream, executing the downloading from the network, and the obtaining of the program from the recording medium. Accordingly, it is possible to execute the downloading of the program.

Furthermore, it is also possible that the download source determination unit assigns a priority to each of the download methods of the program in the download request, and determines one pair from among the plurality of pairs included in the download request based on the priority. Accordingly, it is possible to determine the download method and the download source effectively.

Furthermore, it is also possible that the download source determination unit assigns a priority for preferential handling over other methods, to the download method of receiving from a stream into which the program is encoded and multiplexed. Accordingly, processing in the same manner as in the conventional application downloading method is possible, and processing becomes possible even in a download execution apparatus which is not provided with a network or other download methods.

Furthermore, it is also possible that the download execution apparatus further includes: at least one tuner which receives a broadcast signal; and a tuning judgment unit which judges whether or not there is a tuner that can be used for the downloading of the program, based on the download source information. Accordingly, it is possible to check the presence of a tuner to be used in the downloading of the program.

Furthermore, it is also possible that the download execution apparatus further includes: a tuning frequency obtainment unit which obtains a frequency being tuned to by the tuner; and a download frequency obtainment unit which obtains a frequency of a broadcast signal which includes the program, based on the download source information, wherein the tuning judgment unit judges whether or not the downloading of the program can be executed with the current tuning, based on the frequency obtained by the tuning frequency obtainment unit and the frequency obtained by the download frequency obtainment unit, and judges that there is a tuner that can be used for the downloading of the program in the case where the downloading of the program can be executed with the current tuning. Accordingly, it is possible to judge whether or not it is necessary to change the tuning, from the frequency being tuned to by the tuner being used by the user to another frequency, and determine the download source.

Furthermore, it is also possible that the tuning judgment unit further judges whether or not there is a tuner that is not being used, based on the frequency obtained by the tuning frequency obtainment unit, and judges that there is a tuner that can be used for the downloading of the program in the case where there is a tuner that is not being used. Accordingly, in the case where it is judged that downloading cannot be executed with the current tuning and there is no tuner that is not in use, it is possible to determine another download source.

Furthermore, it is also possible that the download source determination unit determines, from among the pairs included in the download request, a pair having the method of downloading from the network or the method of obtaining the program from the recording medium, in the case where the tuning judgment unit judges that there is no tuner that can be used for the downloading of the program. Accordingly, in the case where it is not possible to use the download method of receiving from a stream into which the program is encoded and multiplexed, it is possible to select the method of obtaining from a network, and the method of obtaining the program from a recording medium.

Furthermore, it is also possible that the download execution apparatus further includes: a message notification unit which notifies a message to a user; and a reply acceptance unit which accepts, from the user, a reply to the message notified to the user by the message notification unit Accordingly, two-way message notification between the user and the download execution apparatus becomes possible, and it becomes possible for the download execution apparatus to perform processing in accordance with the reply of the user.

Furthermore, it is also possible that the message notification unit notifies, to the user, the download method of receiving from a stream into which the program is encoded and multiplexed, and in the case where the reply acceptance unit accepts, from the user, a rejection reply to the download method, the download source determination unit determines, from among the pairs included in the download request, a pair having the method of downloading from the network. Accordingly, in the case where the user does not desire the downloading of a program from a stream into which the program is encoded and multiplexed, which is popular as a conventional application download method, it is possible to perform the downloading from the network.

Furthermore, it is also possible that the download source determination unit assigns a priority for preferential handling over other methods, to the method of downloading from the network. Accordingly, in the case where the user is currently using the tuner, it is possible to execute the downloading of the program without interrupting the processing for the user.

Furthermore, it is also possible that the download source determination unit determines, at all times, the method of downloading from the network, in the case where the method of downloading from the network is present in the plurality of pairs included in the download request. Accordingly, in the case where the user is currently using the tuner, it is possible to execute the downloading of the program without interrupting the processing for the user.

Furthermore, it is also possible that the download source determination unit assigns a priority for preferential handling over other methods, to the method of obtaining of the program from the recording medium. Accordingly, in the case where the user is currently using the tuner, it is possible to obtain the program without interrupting the processing for the user.

Furthermore, it is also possible that the download source determination unit determines, at all times, the method of obtaining of the program from the recording medium, in the case where the method of obtaining of the program from the recording medium is present in the plurality of pairs included in the download request. Accordingly, in the case where the user is currently using the tuner, it is possible to obtain the program without interrupting the processing for the user.

Furthermore, it is also possible that the download source determination unit determines a pair which enables the fastest downloading, from among the pairs included in the download request. Accordingly, it is possible to execute the downloading in the fastest manner.

Furthermore, it is also possible that the download execution unit detects an error in the downloading of the program, and generates error information when the error is detected, and when the error is detected by the download execution unit, the download source determination unit determines, based on the error information, one pair from among the plurality of pairs included in the download request again. Accordingly, even in the case where an error occurs during the downloading, the downloading of the program can be executed again.

Furthermore, it is also possible that the download execution unit detects the error in the case where detection of or connection to a download source is not possible, and generates the error information indicating that detection of or connection to the download source of the program is not possible. Accordingly, even in the case where detection of or connection to a download source is not possible, the downloading of the program can be executed again.

Furthermore, it is also possible that the download execution unit detects the error in the case where the program does not exist in a download source of the program, and generates the error information indicating that the program does not exist in the download source of the program. Accordingly, even in the case where the program does not exist in the download source, the downloading of the program can be executed again.

Furthermore, it is also possible that the tuning execution unit detects an error in tuning, and generates error information when the error is detected, and when the error is detected by the tuning execution unit, the download source determination unit determines, based on the error information, one pair from among the plurality of pairs included in the download request again. Accordingly, even in the case when the occurrence of an error in the tuning is detected, the downloading of the program can be executed again.

Furthermore, it is also possible that the download execution apparatus further includes a store unit which stores the program downloaded by the download execution unit. Accordingly, when executing a program, the need to perform the downloading of the program is eliminated.

Furthermore, it is also possible that the download execution apparatus is a broadcast receiving apparatus. Accordingly, when the download source determination unit determines the download method and the download source, it is possible to use information of resources included in the broadcast receiving apparatus, such as a tuner device and a network.

Note that the present invention can be implemented, not only as a download execution apparatus such as that described herein, but also as a download execution method having, as steps, the characteristic units included in the aforementioned download execution apparatus, and as a program which causes a computer to execute such steps. In addition, it goes without saying that such a program can be delivered via a recording medium such as a CD-ROM and a transmission medium such as the Internet.

Effects of the Invention

According to the download execution apparatus according to the present invention, since a message regarding the downloading of a program is notified to the user, the sudden interruption of the viewing or recording of the user can be prevented.

Furthermore, it is possible to identify one download method and download-source information from plural sets of download methods and download-source information, and perform the downloading of the program.

BRIEF DESCRIPTION OF DRAWINGS

FIG. 3 is an example of the usage of a frequency band used in communications between the head end and the terminal apparatuses, in the cable television system according to the present invention.

FIG. 4 is an example of the usage of a frequency band used in communications between the head end and the terminal apparatuses, in the cable television system according to the present invention.

FIG. 5 is an example of the usage of a frequency band used in communications between the head end and the terminal apparatuses, in the cable television system according to the present invention.

FIG. 69 is a diagram showing an example of firmware update information in the tenth embodiment.

NUMERICAL REFERENCES

1205*b* AM
2901 Download source determination unit
2902 Tuning frequency obtainment unit
2903 Download frequency obtainment unit
2904 Store unit
2905 Notification unit
2906 Tuning request unit

BEST MODE FOR CARRYING OUT THE INVENTION (First Embodiment)

Figure 1:
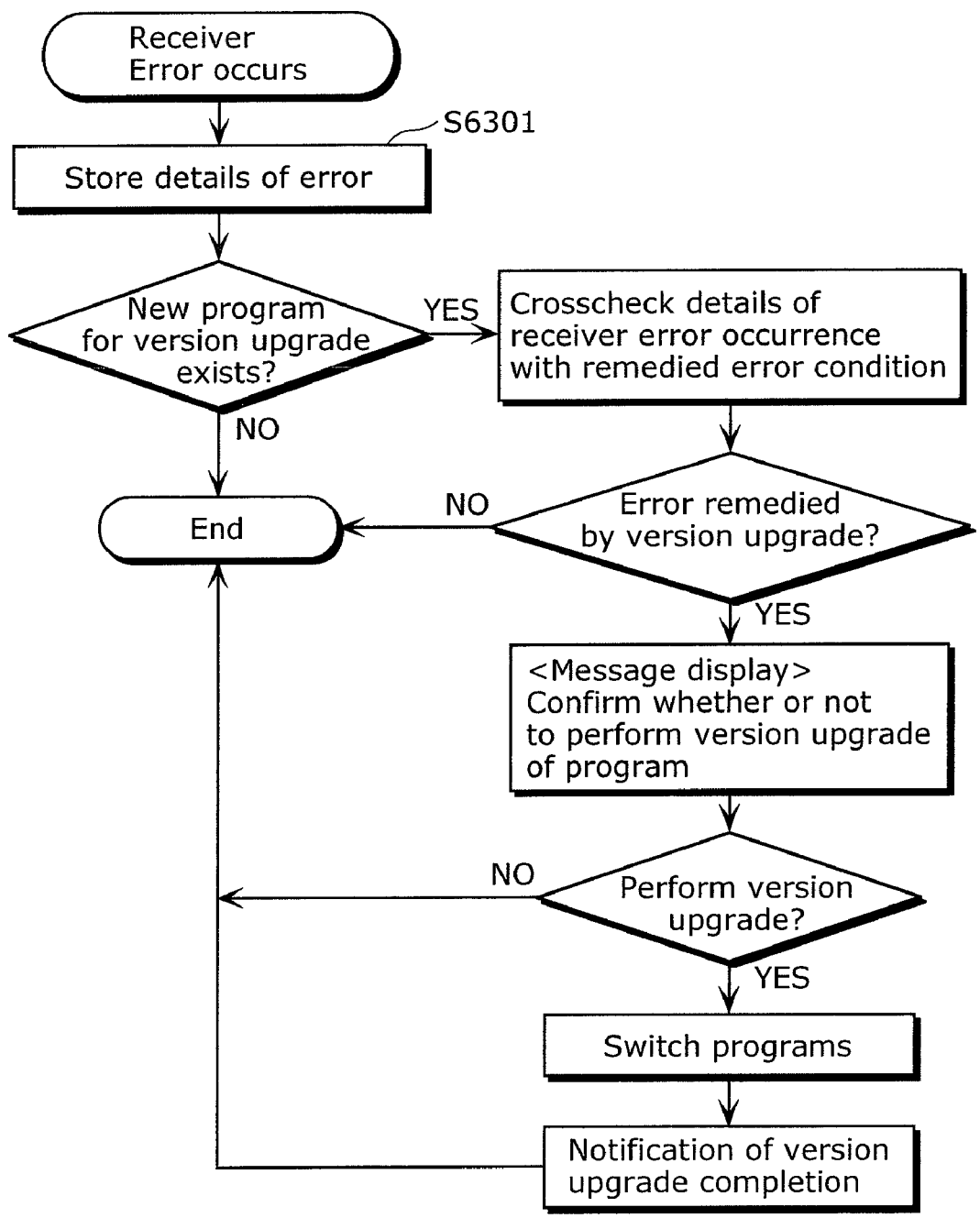
FIG. 1 is a flow chart which shows the conventional process in the downloading of a program.
Figure 2:
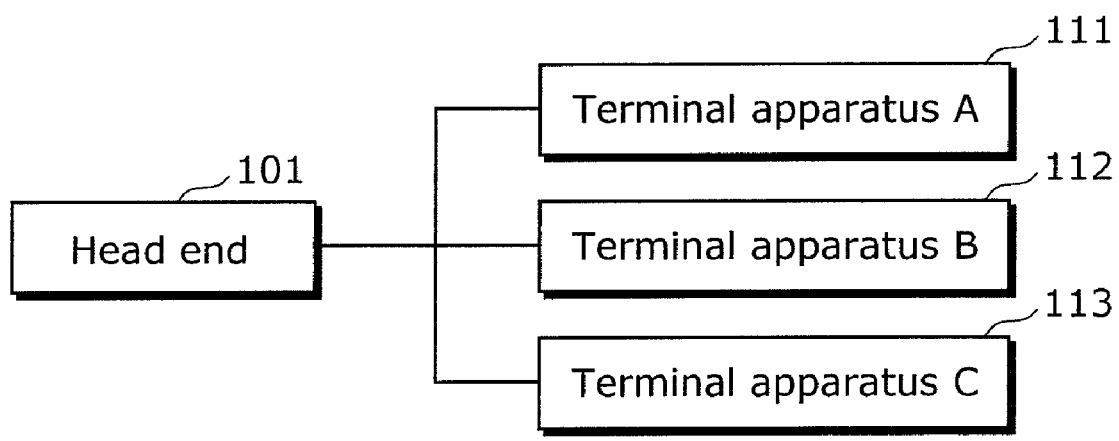
FIG. 2 is a configuration diagram showing the first embodiment of the cable television system according to the present invention.

An embodiment of the cable television system according to the present embodiment shall be described with reference to the diagrams. FIG. 2 is a block diagram showing a relationship of apparatuses that make up a cable television system; the cable television system is made up of a head end 101 and three terminal apparatuses, namely, a terminal apparatus A 111, a terminal apparatus B 112, and a terminal apparatus C 113. In the present embodiment, although three terminal apparatuses are connected to one head end, the present invention can be implemented even when an arbitrary number of terminal apparatuses are connected to the head-end.

The head end 101 sends a broadcast signal for video, audio, data, and the like, to a plurality of terminal apparatuses. In order to realize this, a frequency band is divided for use in transmissions between the head end 101, and the terminal apparatus A 111, the terminal apparatus B 112, and the terminal apparatus C 113. FIG. 3 is a chart showing an example of the division of the frequency band. The frequency band is roughly divided into two types: Out Of Band (abbr. OOB) and In-Band. 5 MHz to 130 MHz is assigned as OOB, and is mainly used in data exchange between the head end 101 and the terminal apparatus A 111, the terminal apparatus B 112, and the terminal apparatus C 113. 130 MHz to 864 MHz is assigned as In-Band, and is mainly used for broadcast channels including video and audio. QPSK modulation format is used with OOB, and QAM64 modulation format is used with In-Band. Modulation format technology is generally known and of little concern to the present invention, and therefore, detailed descriptions are omitted. FIG. 4 is an example of a more detailed use of the OOB frequency band. 70 MHz to 74 MHz is used in data sending from the head end 101, and all of the terminal apparatus A 111, the terminal apparatus B 112, and the terminal apparatus C 113 receive the same data from the head end 101. On the other hand, 10.0 MHz to 10.1 MHz is used in data sending from the terminal apparatus A 111 to the head end 101; 10.1 MHz to 10.2 MHz is used in data sending from the terminal apparatus B 112 to the head end 101; and 10.2 MHz to 10.3 MHz is used in data sending from the terminal apparatus C 113 to the head end 101. Through this, it is possible to send data unique to each terminal apparatus from each terminal apparatus A 111, B 112, and C 113 to the head end 101. FIG. 5 is an example of use of an In-Band frequency band. 150 MHz to 156 MHz and 156 MHz to 162 MHz are assigned to a TV channel 1 and a TV channel 2 respectively, and thereafter, TV channels are assigned at 6 MHz intervals. Radio channels are assigned in 1 MHz units from 310 MHz on. Each of these channels may be used as analog broadcast or as digital broadcast. Digital broadcast is sent in the transport packet format based on the MPEG-2 Specification, and data for various data broadcasts can be transmitted, in addition to audio and video.

The head end 101 is equipped with a QPSK modulation unit, a QAM modulation unit, and the like in for sending the appropriate broadcast signal to the respective frequency bands. In addition, the head end 101 has a QPSK demodulator for receiving data from the terminal apparatuses. Furthermore, the head end 101 can be thought of as having various devices related to such modulation units and demodulation unit. However, the present invention relates mainly to the terminal apparatuses, and therefore detailed descriptions are omitted.

The terminal apparatus A 111, the terminal apparatus B 112, and the terminal apparatus C 113 receive and reproduce broadcast signals from the head end 101. Furthermore, the terminal apparatus A 111, the terminal apparatus B 112, and the terminal apparatus C 113 transmit data unique to each terminal apparatus to the head end 101. In the present embodiment, these three terminal apparatuses adopt the same configuration.

Figure 6:
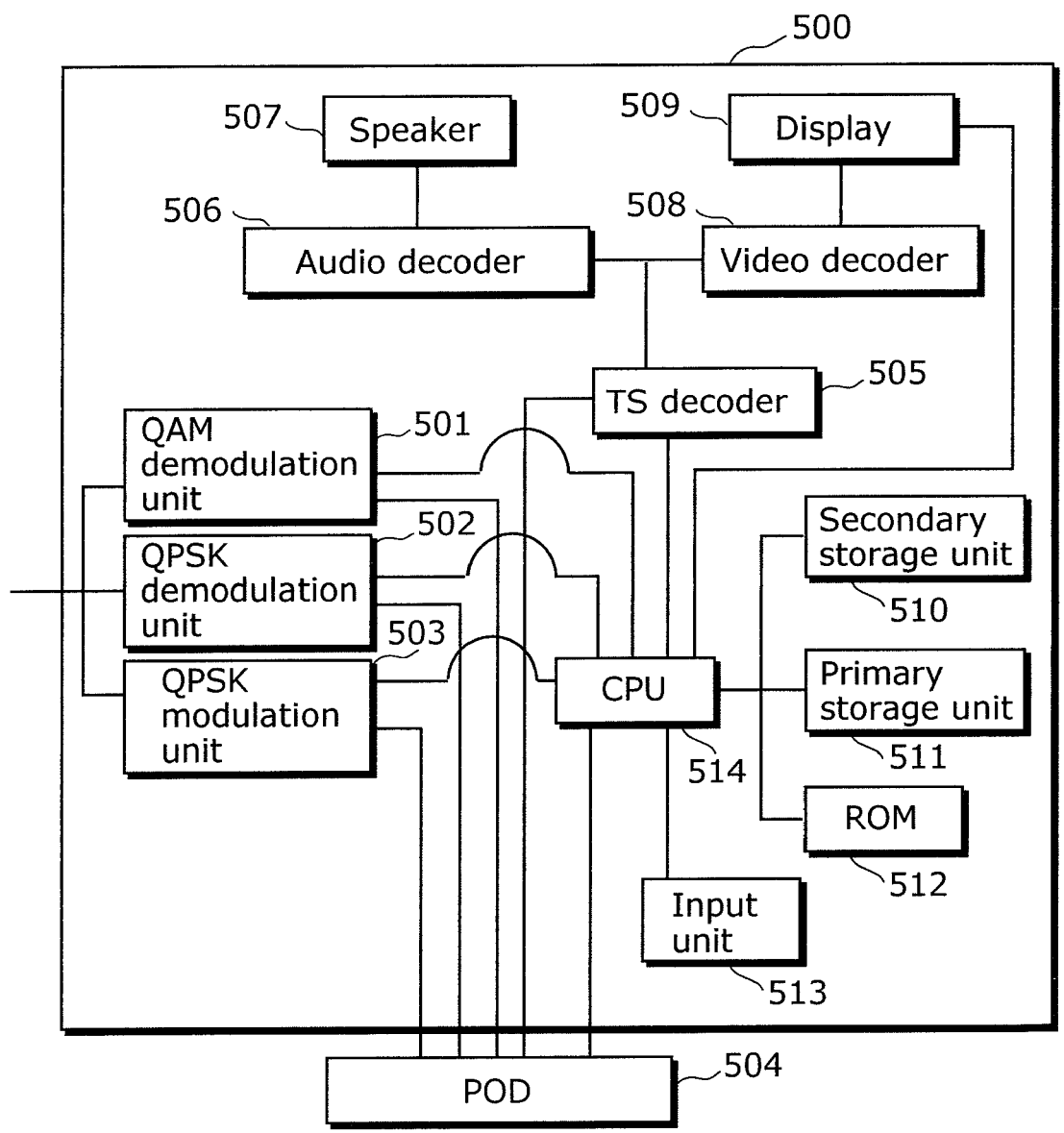
FIG. 6 is a configuration diagram of the terminal apparatus in the cable television system according to the present invention.

FIG. 6 is a block diagram showing the hardware configuration of the terminal apparatuses (broadcast execution apparatuses). A terminal apparatus (download execution apparatus) 500 includes a QAM demodulation unit 501, a QPSK demodulation unit 502, a QPSK modulation unit 503, a TS decoder 505, an audio decoder 506, a speaker 507, a video decoder 508, a display 509, a secondary storage unit 510, a primary storage unit 511, a ROM 512, an input unit 513, and a CPU 514. Furthermore, a POD 504 can be attached to/detached from the terminal apparatus 500.

Figure 7:
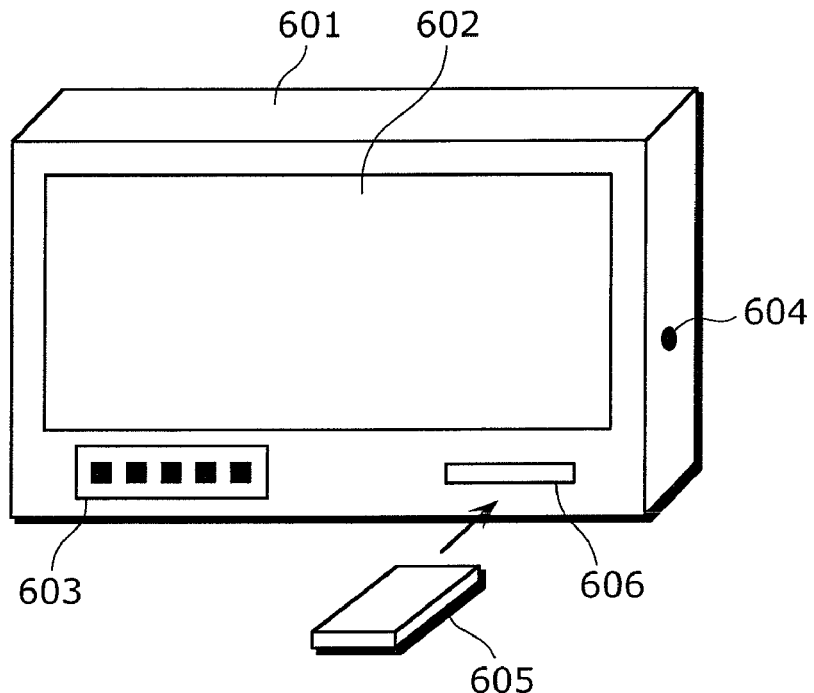
FIG. 7 is a diagram showing an example of the appearance of the terminal apparatus in the cable television system according to the present invention.

FIG. 7 shows a flat-screen television which is an example of the external appearance of the terminal apparatus 500.

A flat-screen television housing 601 houses all constituent elements of the terminal apparatus 500 except the POD 504.

A display 602 corresponds to the display 509 in FIG. 6.

A front panel 603 is composed of plural buttons, and corresponds to the input unit 513 in FIG. 6.

A signal input terminal 604 is connected with a cable for performing the sending and receiving of signals with the head end 101. Furthermore, the signal input terminal 604 is connected to the QAM demodulation unit 501, the QPSK demodulation unit 502, and the QPSK modulation unit 503 in FIG. 6.

A POD card 605 corresponds to the POD 504 in FIG. 6. The POD 504 is embodied independently of the terminal apparatus 500 and can be attached to/detached from the terminal apparatus 500, as with the POD card 605 in FIG. 7. A detailed description of the POD 504 is given later.

An insertion slot 604 is an insertion slot into which the POD card 605 is inserted.

Referring to FIG. 6, the QAM demodulation unit 501 demodulates a signal which has been QAM-modulated in and transmitted from the head end 101, according to tuning information that includes a frequency specified by the CPU 514, and passes the result to the POD 504.

The QPSK demodulation unit 502 demodulates a signal which has been QPSK-modulated in and transmitted from the head end 101, according to tuning information that includes a frequency specified by the CPU 514, and passes the result to the POD 504.

The QPSK modulation unit 503 QPSK-demodulates the signal passed from the POD 504, according to demodulation information that includes a frequency specified by the CPU 514, and transmits the result to the head end 101.

As shown in FIG. 7, the POD 504 can be attached to/detached from the main body of the terminal apparatus 500. The definition of the connection interface between the main body of the terminal 500 and the POD 504 is given in the OpenCable™ HOST-POD Interface Specification (OC-SP-HOST-POD-IF-I12-030210) and specifications referred to by such specification. Here, a detailed description is omitted, and a description is given only for portions relevant to the present invention.

Figure 8:
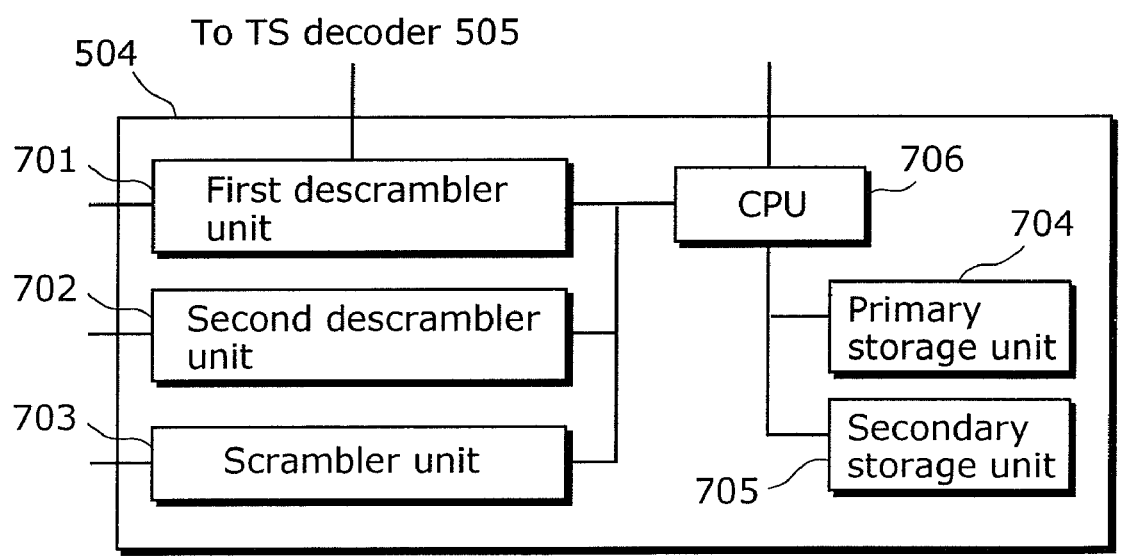
FIG. 8 is a configuration diagram of the hardware configuration of the POD according to the present invention.

FIG. 8 is a block diagram showing an internal configuration of the POD 504. The POD 504 is made up of a first descrambler unit 701, a second descrambler unit 702, a scrambler unit 703, a primary storage unit 704, a secondary storage unit 705, and a CPU 706.

The first descrambler unit 701, under instruction from the CPU 706, receives a scrambled signal from the QAM demodulation unit 501 of the terminal apparatus 500 and descrambles such signal. Then, the first descrambler unit 701 transmits the descrambled signal to the TS decoder 505 of the terminal apparatus 500. Information required for decoding such as a key is provided by the CPU 706 as necessary. More specifically, the head end 101 broadcasts several pay channels. When the user purchases the right to view these pay channels, the first descrambler unit 701 receives required information such as a key from the CPU 706 and performs descrambling, and the user is able to view these pay channels. When required information such as a key is not provided, the first descrambler unit 701 passes the received signal directly to the TS decoder 505 without performing descrambling.

The second descrambler unit 702, under instruction from the CPU 706, receives a scrambled signal from the QPSK demodulation unit 502 of the terminal apparatus 500 and descrambles such signal. Then, the second descrambler unit 702 passes the descrambled data to the CPU 706.

The scrambler unit 703, under instruction from the CPU 706, scrambles the data received from the CPU 706 and sends the result to the QPSK modulation unit 503 of the terminal apparatus 500.

The primary storage unit 704, specifically made up of a primary memory such as a RAM, is utilized for storing data temporarily when the CPU 706 performs processing.

The secondary storage unit 705, specifically made up of a secondary storage memory such as a flash ROM, is utilized for storing a program to be executed by the CPU 706 as well as for storing data which should not be deleted even when the power is turned off.

Figure 9:
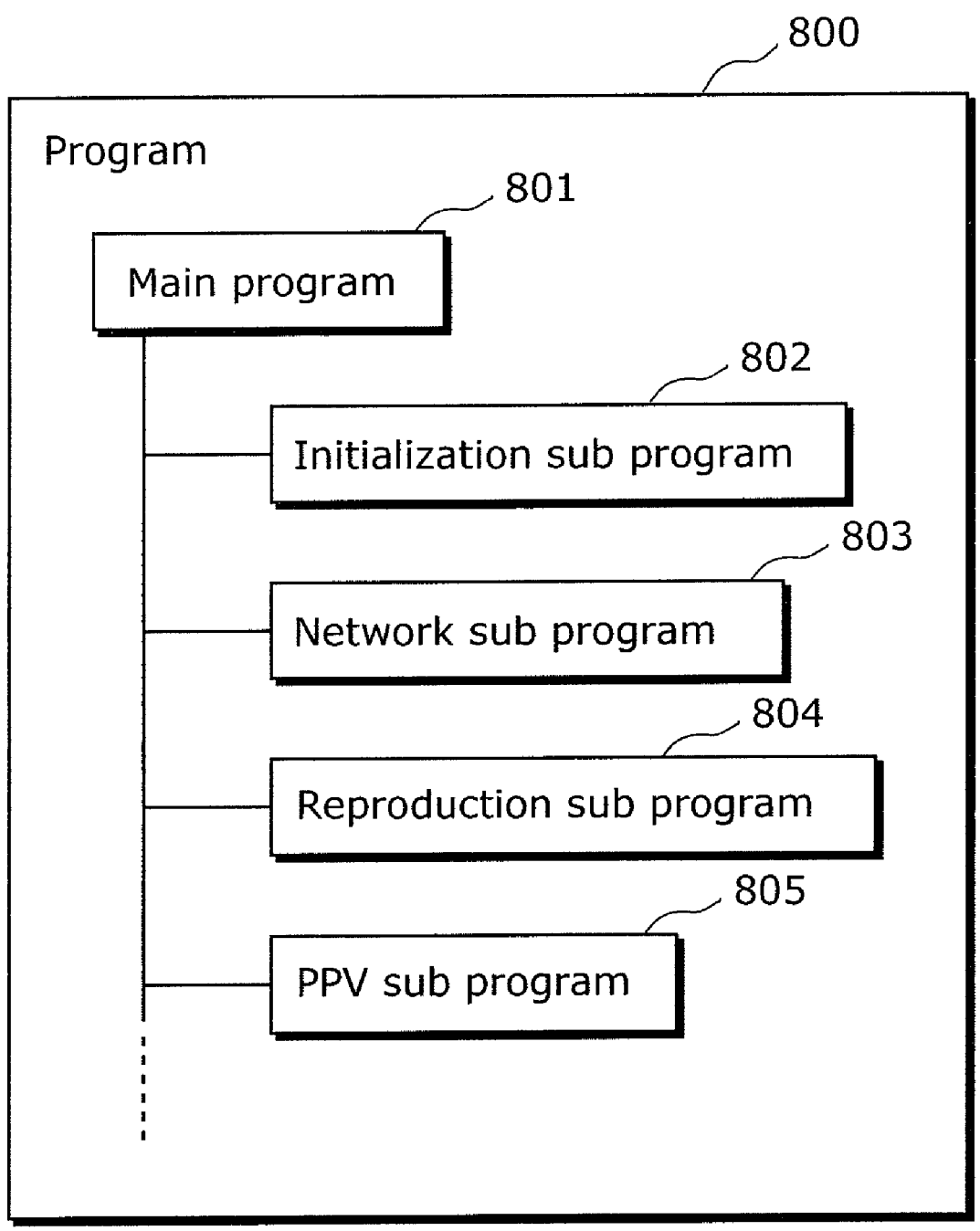
FIG. 9 is a configuration diagram of the program configuration stored by the POD according to the present invention.

The CPU 706 executes the program stored by the secondary storage unit 705. The program is made up of plural subprograms. FIG. 9 shows an example of the program stored by the secondary storage unit 705. In FIG. 9, a program 800 is made up of plural subprograms including a main program 801, an initialization subprogram 802, a network subprogram 803, a reproduction subprogram 804, and a PPV subprogram 805.

Here, PPV, which is an abbreviation of Pay Per View, refers to a service that allows the user to view a certain TV show such as a movie, on a charge basis. When the user enters his personal identification number, the purchase of the right to view the TV show is notified to the head end 101, scrambling is cancelled, and such TV show can be viewed by the user. With this viewing, the user is required to pay the purchase price at a later date.

The main program 801, which is the subprogram activated first by the CPU 706 when the power is turned on, controls the other subprograms.

The initialization subprogram 802, which is activated by the main program 801 when the power is turned on, performs information exchange with the terminal apparatus 500 and performs initialization. The details of this initialization is defined in detail in the OpenCable (™) HOST-POD Interface Specification (OC-SP-HOSTPOD-IF-I12-030210) and in specifications referred to by such specification. Furthermore, the initialization subprogram 802 also performs initialization not defined in these specifications. Here, a part of such initialization is introduced. When the power is turned on, the initialization subprogram 802 notifies the QPSK demodulation unit 502 of a first frequency stored in the secondary storage unit 705 via the CPU 514 of the terminal apparatus 500. The QPSK demodulation unit 502 performs tuning using the provided first frequency, and transmits the resulting signal to the second scrambler unit 702. Moreover, the initialization subprogram 802 provides the second descrambler unit 702 with descrambling information such as a first key stored in the secondary storage unit 705. As a result, the second descrambler unit 702 performs descrambling and passes the result to the CPU 706 which is executing the initialization subprogram 802. As such, the initialization subprogram 802 can receive the information. In the present embodiment, the initialization subprogram 802 receives information via the network subprogram 803. A detailed description on this is given later. Furthermore, the initialization subprogram 802 notifies the QPSK modulation unit 503 of a second frequency stored in the secondary storage unit 705, via the CPU 514 of the terminal apparatus 500. The initialization subprogram 802 provides the scrambler unit 703 with scrambling information stored in the secondary storage unit 705. When the initialization subprogram 802 provides, via the network subprogram 803, the scrambler unit 703 with information required to be sent, the scrambler unit 703 scrambles the data using the provided scrambling information, and provides the scrambled data to the QPSK modulation unit 503 of the terminal apparatus 500. The QPSK modulation unit 503 modulates the provided scrambled information, and sends the modulated information to the head end 101.

As a result, it becomes possible for the initialization subprogram 802 to carry out two-way communication with the head end 101, via the terminal apparatus 500, the second descrambler unit 702, the scrambler unit 703, and the network subprogram 803. The network subprogram 803, which is used by plural subprograms such as the main program 801 and the initialization subprogram 802, is a subprogram intended for carrying out two-way communication with the head end 101. More specifically, the network subprogram 803 behaves as if other subprograms using the network subprogram 803 were carrying out a two-way communication with the head end 101 in accordance with TCP/IP. A detailed description of TCP/IP is omitted here, since it is a publicly known technique which stipulates the protocols for performing the exchange of information between plural terminals. When activated by the initialization subprogram 802 at power-on time, the network subprogram 803 notifies, via the terminal apparatus 500, the head end 101 of an MAC address (an abbreviation of Media Access Control address) which is an identifier for identifying the POD 504 and which is stored in the secondary storage unit 705 beforehand, and requests for the obtainment of an IP address. The head end 101 notifies the POD 504 of the IP address via the terminal apparatus 500, and the network subprogram 803 stores such IP address in the primary storage unit 704. From here on, the head end 101 and the POD 504 communicate with each other using such IP address as the identifier of the POD 504.

The reproduction subprogram 804 provides the first descrambler unit 701 with descrambling information such as a second key stored in the secondary storage unit 705 as well as descrambling information such as a third key provided by the terminal apparatus 500, so as to allow descrambling to be performed. Furthermore, the reproduction subprogram 804 receives, via the network subprogram 803, information indicating that the signal inputted in the first descrambler unit 701 is a PPV channel. On the notification that the signal is a PPV channel, the reproduction subprogram 804 activates the PPV subprogram 805.

When activated, the PPV subprogram 805 displays, on the terminal apparatus 500, a message prompting the user to purchase the TV show, and accepts an input from the user. More specifically, when information intended to be displayed on the screen is sent to the CPU 514 of the terminal apparatus 500, a program running on the CPU 514 of the terminal apparatus 500 displays the message on the display 509 of the terminal apparatus 500. Then, when the user enters the personal identification number via the input unit 513 of the terminal apparatus 500, the CPU 514 of the terminal apparatus 500 accepts it, and sends it to the PPV subprogram 805 running on the CPU 706 of the POD 504. The PPV subprogram 805 sends the accepted personal identification number to the head end 101, via the network subprogram 803. When such personal identification number is correct, the head end 101 notifies, via the network subprogram 803, the PPV subprogram 805 of descrambling information required for descrambling such as a fourth key. The PPV subprogram 805 provides the first descrambler unit 701 with the accepted descrambling information such as the fourth key, and then the first descrambler unit 701 descrambles the signal being inputted.

Figure 10:
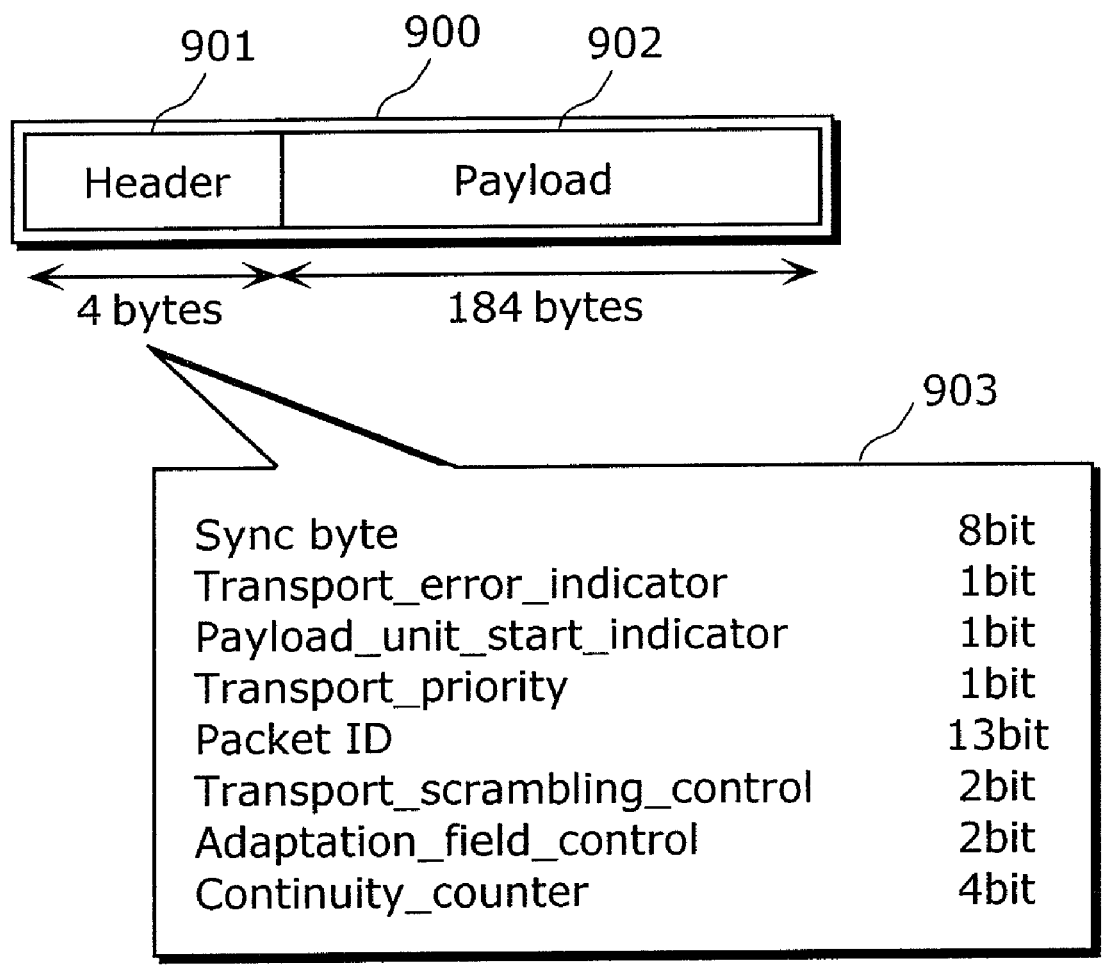
FIG. 10 is a configuration diagram of a packet defined in the MPEG standard.
Figure 11:
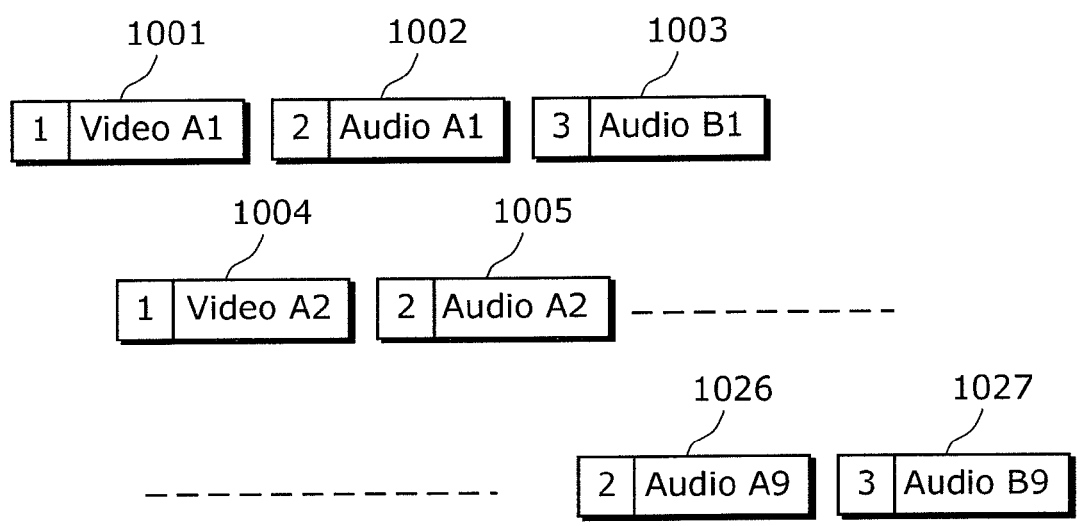
FIG. 11 is a diagram showing an example of an MPEG-2 transport stream.

Referring to FIG. 6, the TS decoder 505 performs filtering on the signal accepted from the POD 504, and passes necessary data to the audio decoder 506, the video decoder 508, and the CPU 514. Here, the signal sent from the POD 504 is an MPEG-2 transport stream. A detailed description about an MPEG-2 transport stream is given in the MPEG specification ISO/IEC138181-1, and therefore detailed description is omitted in the present embodiment. An MPEG-2 transport stream is composed of plural fixed-length packets, and a packet ID is assigned to each packet. FIG. 10 is a diagram showing the structure of a packet. 900 is a packet structured by 188 bytes having fixed length. The top four bytes are a header 901 storing information for identifying the packet, and the remaining 184 bytes is a payload 902 which contains the information to be transmitted. 903 shows the breakdown of the header 901. A packet ID is included in the 13 bits of the twelfth to twenty-fourth bits from the top. FIG. 11 is a schematic diagram illustrating plural packet strings to be transmitted. A packet 1001 carries a packet ID "1" in its header and includes the first information of video A in its payload. A packet 1002 carries a packet ID "2" in its header and includes the first information of audio A in its payload. A packet 1003 carries a packet ID "3" in its header and includes the first information of audio B in its payload.

A packet 1004 carries the packet ID "1" in its header and includes the second information of the video A in its payload, and is the continuation of the packet 1001. Similarly, packets 1005, 1026, and 1027 carry follow-on data of the other packets. By concatenating the contents of the payloads of packets having the same packet IDs in the above manner, it is possible to reproduce a continuing video and audio.

Referring to FIG. 11, when the CPU 514 indicates, to the TS decoder 505, the packet ID "1" as well as "the video decoder 508" as an output destination, the TS decoder 505 extracts packets having the packet ID "1" from the MPEG-2 transport stream received from the POD 504, and passes them to the video decoder 508. In FIG. 11, only the video data is passed over to the video decoder 508. At the same time, when the CPU 514 indicates, to the TS decoder 505, the packet ID "2" as well as "the audio decoder 506", the TS decoder 505 extracts packets having the packet ID "2" from the MPEG-2 transport stream received from the POD 504, and passes them to the audio decoder 506. In FIG. 11, only the audio data is passed over to the audio decoder 506.

This process of extracting only necessary packets according to the packet IDs corresponds to the filtering performed by the TS decoder 505. The TS decoder 505 is capable of performing more than one filtering simultaneously, at the instruction of the CPU 514. Referring to FIG. 6, the audio decoder 506 concatenates audio data embedded in the packets in the MPEG-2 transport stream provided by the TS decoder 505, performs digital-to-analog conversion on the concatenated data, and outputs the result to the speaker 507.

The speaker 507 outputs the signal provided by the audio decoder 506.

The video decoder 508 concatenates video data embedded in the packets in the MPEG-2 transport stream provided by the TS decoder 505, performs digital-to-analog conversion on the concatenated data, and outputs the result to the display 509.

The display 509, which is specifically made up of a Braun tube or liquid crystal, outputs the signal provided by the video decoder 508.

The secondary storage unit 510, which is specifically made up of a flash memory or a hard disk and the like, stores and deletes data and programs specified by the CPU 514. Furthermore, the stored data and programs are referred to by the CPU 514. The stored data and programs are kept stored even when power to the terminal apparatus 500 is cut off.

The primary storage unit 511, which is specifically made up of a RAM and the like, temporarily stores and deletes data and programs specified by the CPU 514. Furthermore, the stored data and programs are referred to by the CPU 514. The stored data and programs are deleted when power to the terminal apparatus 500 is cut off.

The ROM 512 is a read-only memory device, specifically made up of are a ROM, a CD-ROM, or a DVD, and the like. The ROM 512 stores a program to be executed by the CPU 514.

Figure 12:
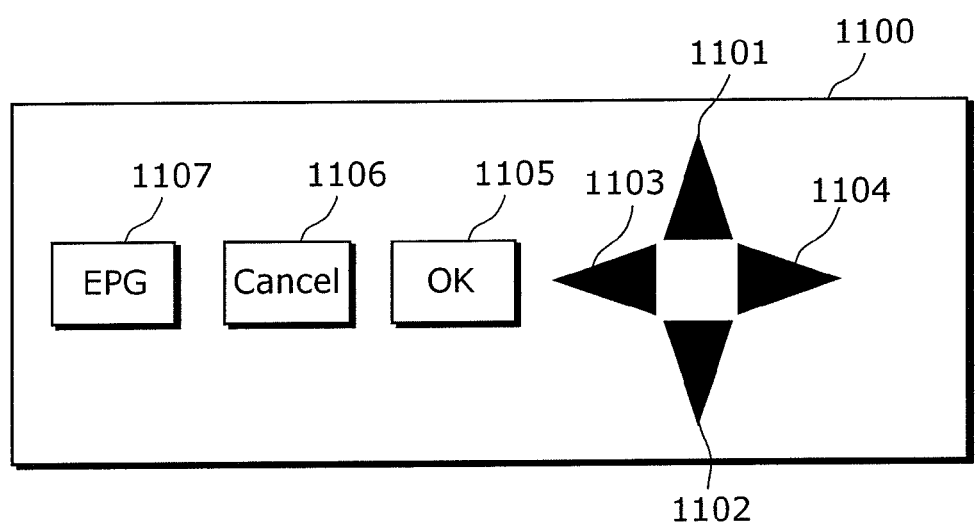
FIG. 12 is a diagram showing an example of an external view in the case where the input unit is made up of a front panel.

The input unit 513, which is specifically made up of a front panel or remote control, accepts an input from the user. FIG. 12 shows an example of the input unit 513 in the case where it is made up of a front panel. 1100 is a front panel, and corresponds to the front panel unit 603 shown in FIG. 7. Such front panel 1100 includes seven buttons, namely, an up-cursor button 1101, a down-cursor button 1102, a left-cursor button 1103, a right-cursor button 1104, an OK button 1105, a cancel button 1106, and an EPG button 1107. When the user presses down a button, the identifier of such pressed button is notified to the CPU 514.

The CPU 514 executes the program stored in the ROM 512. Following the instructions from such program to be executed, the CPU 514 controls the QAM demodulation unit 501, the QPSK demodulation unit 502, the QPSK modulation unit 503, the POD 504, the TS decoder 505, the display 509, the secondary storage unit 510, the primary storage unit 511, and the ROM 512.

Figure 13:
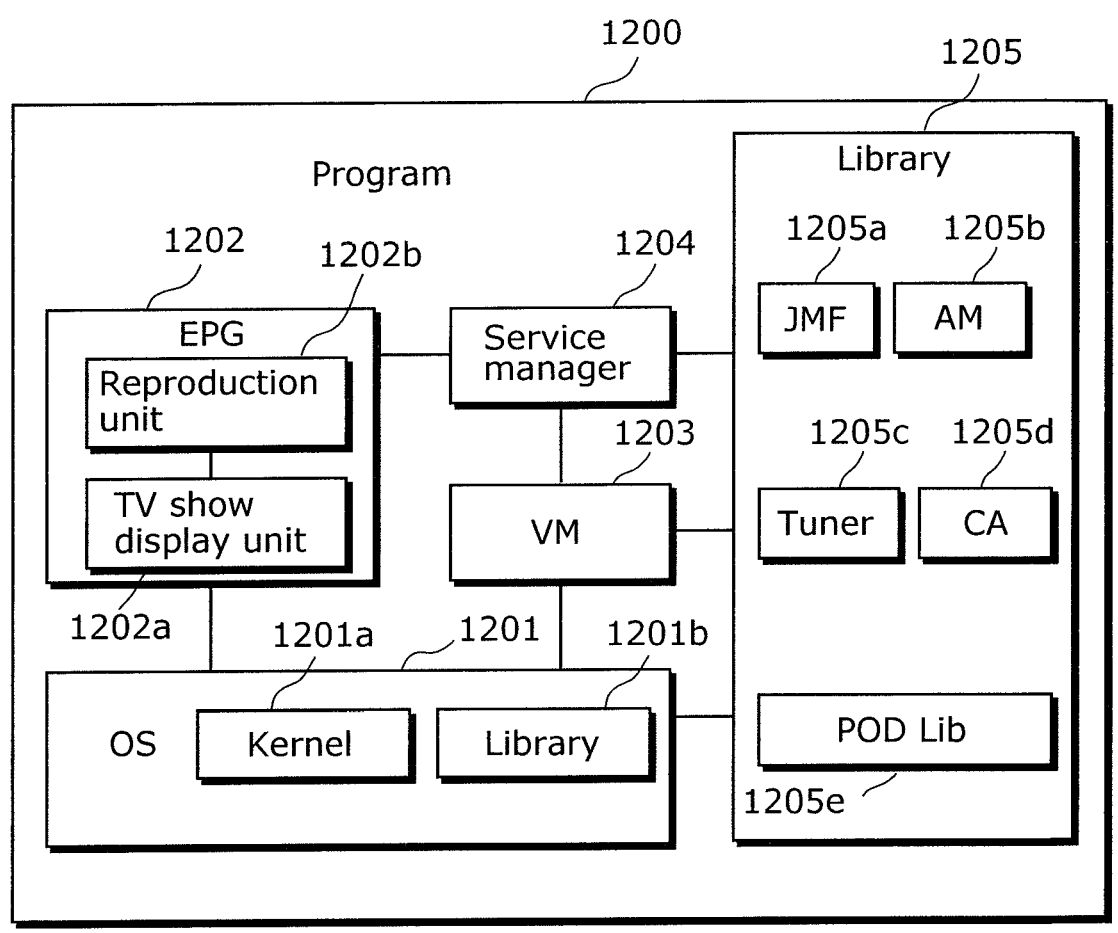
FIG. 13 is a configuration diagram of the program configuration stored by the terminal apparatus according to the present invention.

FIG. 13 is a diagram showing an example of the structure of the program stored in the ROM 512 and executed by the CPU 514.

A program 1200 is made up of plural subprograms, and more specifically, is made up of an OS 1201, an EPG 1202, a Java™ VM 1203 (hereafter referred to as VM 1203), a service manager 1204, and a Java™ library 1205 (hereafter referred to as library 1205).

The OS 1201 is a subprogram activated by the CPU 514 when power to the terminal apparatus 500 is turned on. The OS 1201 stands for operating system, an example of which is Linux and the like. The OS 1201 is a generic name for publicly known technology made up of a kernel 1201a for executing a subprogram in parallel with another subprogram and of a library 1201b, and therefore a detailed description is omitted. In the present embodiment, the kernel 1201a of the OS 1201 executes the EPG 1202 and the VM 1203 as subprograms. Furthermore, the library 1201b provides these subprograms with plural functions required for controlling the constituent elements of the terminal apparatus 500.

As an example of such functions, tuning shall be described. In the tuning function, tuning information including a frequency is received from another subprogram and then passed over to the QAM demodulation unit 501. It is possible for the QAM demodulation unit 501 to perform demodulation based on the provided tuning information, and pass the demodulated data to the POD 504. As a result, the other subprograms can control the QAM demodulation unit via the library 1201b.

Figure 14A:
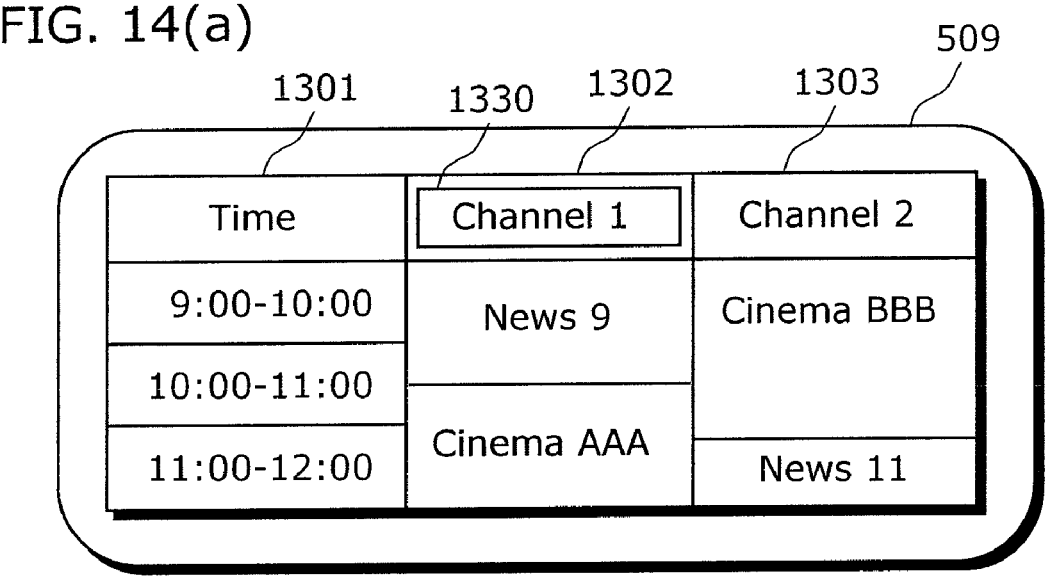
FIGS. 14(a) and (b) are diagrams showing an example of a screen-display of the display according to the present invention.
Figure 14B:
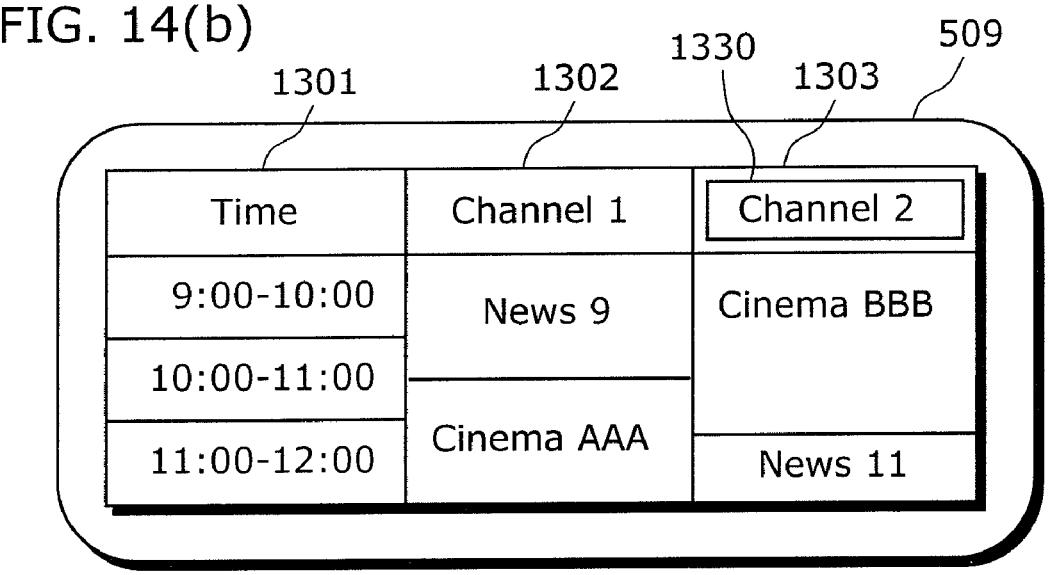

The EPG 1202 is made up of a TV show display unit 1202a for displaying a list of TV shows to the user as well as for accepting an input from the user, and a reproduction unit 1202b for selecting channels. Here, EPG is an abbreviation of Electric Program Guide. The EPG 1202 is activated by the kernel 1201a when power to the terminal apparatus 500 is turned on. Inside the activated EPG 1202, the TV show display unit 1202a waits for an input from the user via the input unit 513 of the terminal apparatus 500. Here, in the case where the input unit 513 is made up of the front panel illustrated in FIG. 12, when the user presses down the EPG button 1107 on the input unit 513, the CPU 514 is notified of the identifier of such EPG button. The TV show display unit 1202a of the EPG 1202, which is a subprogram running on the CPU 514, accepts this identifier and displays TV show information on the display 509. FIG. 14(a) and FIG. 14(b) show examples of a TV show table displayed on the display 509. Referring to FIG. 14A, the TV show information is displayed on the display 509 in a grid pattern. A column 1301 describes time information. A column 1302 describes a channel name "Channel 1" and TV shows to be broadcast during time periods corresponding to the respective times described in the column 1301. It is shown that a TV show "News 9" is broadcast from 9:00 to 10:30, and "Cinema AAA" is broadcast from 10:30 to 12:00 on "Channel 1". As in the case of the column 1302, a column 1303 also describes a channel name "Channel 2" and TV shows to be broadcast during time periods corresponding to the respective times described in the column 1301. A TV show "Cinema BBB" is broadcast from 9:00 to 11:00, and "News 11" is broadcast from 11:00 to 12:00. 1330 is a cursor. The cursor 1330 moves at the press of the left-cursor 1103 or the right-cursor 1104 on the front panel 1100. When the right-cursor 1104 is pressed down in the state illustrated in FIG. 14(a) the cursor 1330 moves towards the right as shown in FIG. 14(b). Meanwhile, when the left-cursor 1103 is pressed down in the state illustrated in FIG. 14(b), the cursor 1330 moves towards the left as shown in FIG. 14(a).

When the OK button 1105 on the front panel 1100 is pressed down in the state shown in FIG. 14(a), the TV show display unit 1202a notifies the reproduction unit 1202b of the identifier of "Channel 1". When the OK button 1105 on the front panel 1100 is pressed down in the state shown in FIG. 14(b), the TV show display unit 1202a notifies the reproduction unit 1202b of the identifier of "Channel 2".

Furthermore, the TV show display unit 1202a periodically stores TV show information to be displayed, from the head end 101 into the primary storage unit 511 via the POD 504. Generally, it takes time to obtain TV show information from the head end. However, it becomes possible to quickly display a TV show table by displaying the TV show information that is pre-stored in the primary storage unit 511 at the press of the EPG button 1107 of the input unit 513.

Figure 15:
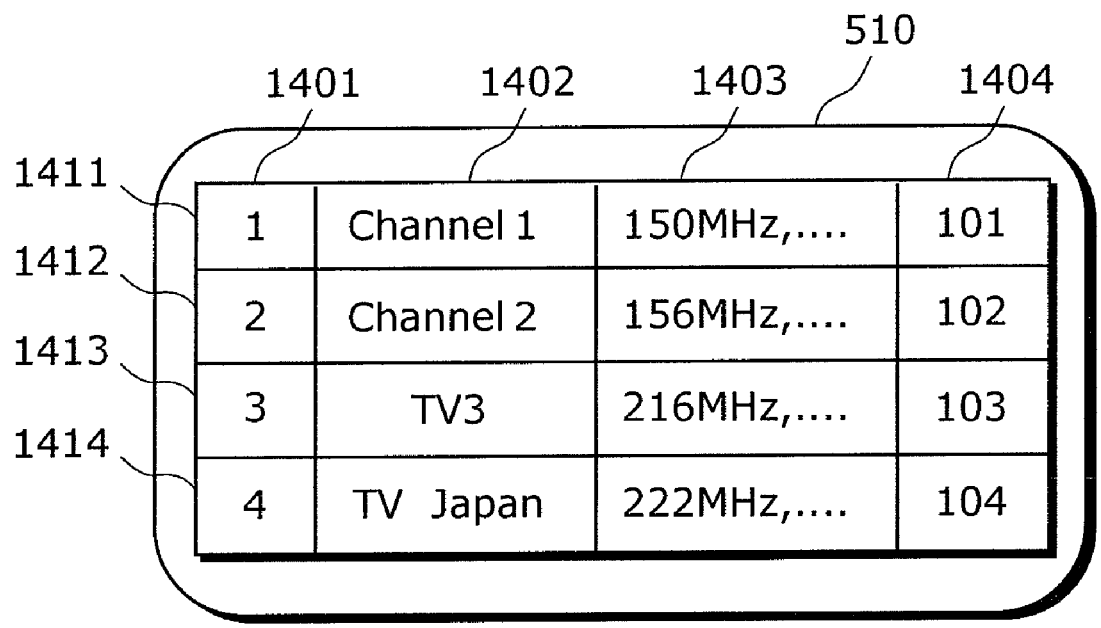
FIG. 15 is a diagram showing an example of information stored in the secondary storage unit according to the present invention.

The reproduction unit 1202b reproduces the channel using the received identifier of the channel. The relationship between channel identifiers and channels is pre-stored in the secondary storage unit 510 as channel information. FIG. 15 shows an example of the channel information stored in the secondary storage unit 510. The channel information is stored in tabular form. A column 1401 describes the identifiers of channels. A column 1402 describes channel names. A column 1403 describes tuning information. Here, the tuning information is represented by values to be provided to the QAM demodulation unit 501 such as frequency, transmission rate, and coding ratio. A column 1404 describes program numbers.

Program numbers are numbers used to identify PMTs stipulated by the MPEG-2 Standard. A description about PMT is given later. Each of rows 1411 to 1414 indicates a set of the identifier, channel name, and tuning information of each channel. The row 1411 describes a set that includes "1" as an identifier, "Channel 1" as a channel name, a frequency of "150 MHz" as tuning information, and "101" as a program number. The reproduction unit 1202b passes the identifier of the received channel directly to the service manager in order to reproduce the channel.

Figure 16A:
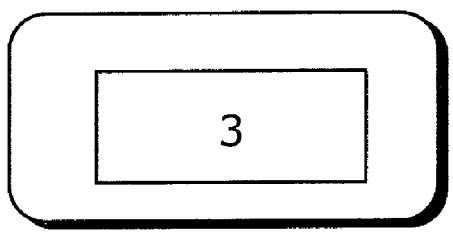
FIGS. 16(a), (b), and (c) are diagrams showing an example of information stored in the primary storage unit according to the present invention.
Figure 16B:
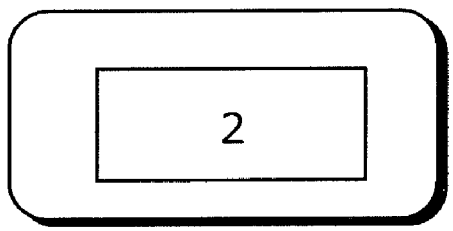
Figure 16C:
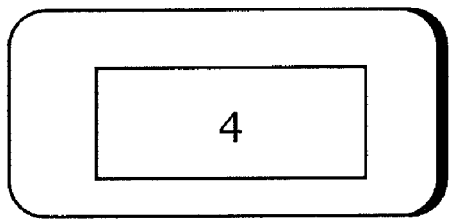

Moreover, when the user presses down the up-cursor 1101 and the down-cursor 1102 on the front panel 1100 while the reproduction is taking place, the reproduction unit 1202b receives a notification about such pressing from the input unit 513 via the CPU 514, and switches the channel being reproduced accordingly. First, the reproduction unit 1202b stores, in the primary storage unit 511, the identifier of the channel that is currently being reproduced. FIGS. 16(a), (b) and (c) show example identifiers of channels stored in the primary storage unit 511. FIG. 16(a) shows that an identifier "3" is stored, and by referring to FIG. 15, it is shown that a channel having the channel name "TV 3" is currently being reproduced. When the user presses down the up-cursor 1101 in a state illustrated in FIG. 16(a), the reproduction unit 1202b refers to the channel information shown in FIG. 15, and passes the identifier "2" of a channel having the channel name of "Channel 2" to the service manager in order to switch reproduction to the channel having the channel name of "Channel 2" which is the next lower channel from the channel currently being reproduced. At the same time, the reproduction unit 1202b rewrites the identifier stored in the primary storage unit 511 into the channel identifier "2". FIG. 16(b) shows the state in which the channel identifier has been rewritten. When the user presses down the down-cursor 1101 in a state illustrated in FIG. 16(a), the reproduction unit 1202b refers to the channel information shown in FIG. 15, and passes the identifier "4" of a channel having the channel name of "TV Japan" to the service manager in order to switch reproduction to the channel having the channel name of "TV Japan" which is the next higher channel from the channel currently being reproduced. At the same time, the reproduction unit 1202b rewrites the identifier into the channel identifier "4" stored in the primary storage unit 511. FIG. 16(c) shows the state in which the channel identifier has been rewritten.

The VM 1203 is a Java™ virtual machine that sequentially analyzes and executes programs written in the Java™ language. Programs written in the Java™ language are compiled into intermediate codes known as a byte code which are not dependent on hardware. The Java™ virtual machine is an interpreter that executes such byte code. Some Java™ virtual machines translate the byte code into an execution format which can be interpreted by the CPU 514 before passing it to the CPU 154 which executes it. The VM 1203 gets activated, with a Java™ program to be executed being specified by the kernel 1201a. In the present embodiment, the kernel 1201a specifies the service manager 1204 as a Java™ program to be executed. Details of the Java™ language are described in many publications such as "Java™ Language Specification" (ISBN 0-201-63451-1). Here, such details are omitted. Furthermore, the detailed operation of the Java™ virtual machine itself is described in many publications such as "Java™ Virtual Machine Specification" (ISBN 0-201-63451-X). Here, such details are omitted.

The service manager 1204, which is a Java™ program written in the Java™ language, is sequentially executed by the VM 1203. It is possible for the service manager 1204 to call and to be called by another subprogram not written in the Java™ language, through the JNI (Java™ Native Interface). The JNI is also described in many publications such as in the book "Java™ Native Interface" and so on. Here, such details are omitted.

The service manager 1204 accepts the identifier of the channel from the reproduction unit 1202b, through the JNI.

The service manager 1204 first passes the identifier of the channel to a Tuner 1205c in the library 1205 and requests for tuning. The Tuner 1205c refers to the channel information stored in the secondary storage unit 510, and obtains the tuning information. When the service manager 1204 passes the identifier "2" of the channel to the Tuner 1205c, the Tuner 1205c refers to the column 1412 shown in FIG. 15, and obtains the corresponding tuning information "156 MHz". The Tuner 1205c passes the tuning information to the QAM demodulation unit 501 via the library 1201b of the OS 1201. The QAM demodulation unit 501 demodulates the signal sent from the head end 101 according to the given tuning information, and passes the result to the POD 504.

The service manager 1204 requests a CA 1205b inside the library 1205 to perform descrambling. The CA 1205d provides the POD 504 with information required for descrambling, through the library 1201b in the OS 1201. On the basis of such provided information, the POD 504 descrambles the signal provided by the QAM demodulation unit 501, and passes the result to the TS decoder 505.

The service manager 1204 provides the identifier of the channel to a JMF 1205a inside the library 1205, and requests for the reproduction of the video and audio.

Figure 17:
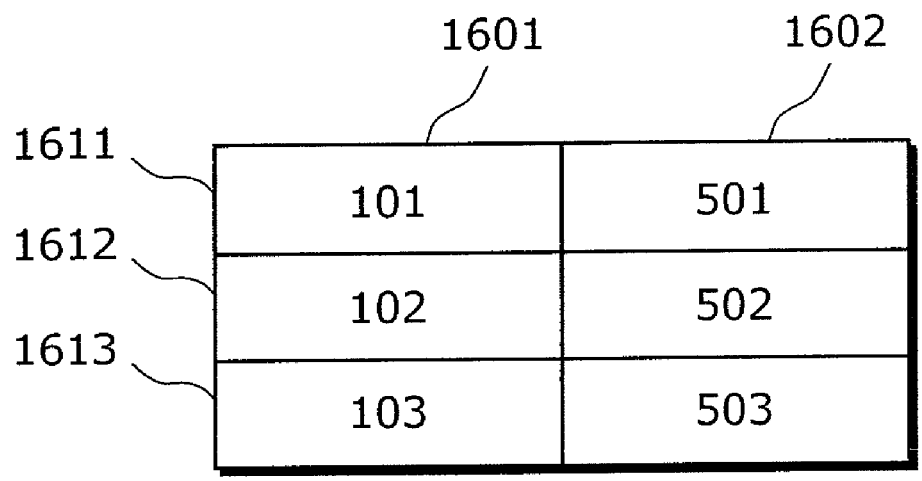
FIG. 17 is a schematic diagram showing details of a PAT stipulated by the MPEG-2 standard according to the present invention.
Figure 18:
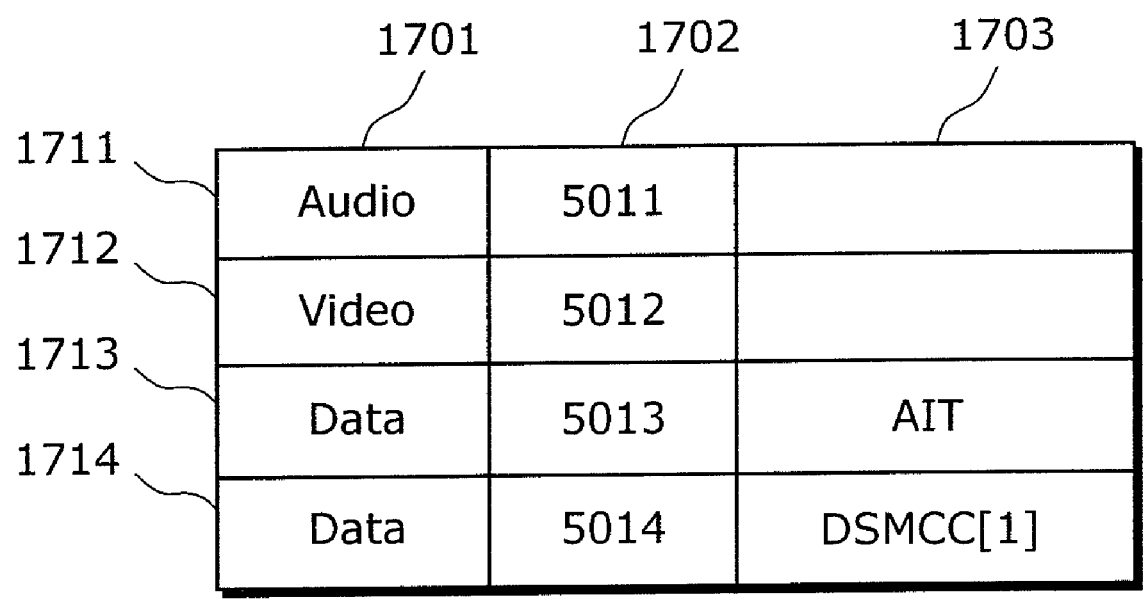
FIG. 18 is a schematic diagram showing details of a PMT stipulated by the MPEG-2 standard according to the present invention.

First, the JMF 1205a obtains, from a PAT and a PMT, packet IDs used to identify the video and audio to be reproduced. PAT and PMT are tables, stipulated by the MPEG-2 standard, that show the TV show line-up included in an MPEG-2 transport stream. PAT and PMT are embedded in the payloads in packets included in an MPEG-2 transport stream, and sent together with audio and video. Refer to the Specification for details. Here, only the outline shall be described. PAT, which is an abbreviation of Program Association Table, is stored and sent in packets having the packet ID "0". In order to obtain the PAT, the JMF 1205a indicates, to the TS decoder 505, the packet ID "0" and the CPU 514, through the library 1201b of the OS 1201. The TS decoder 505 performs filtering based on the packet ID "0" and, by passing the result to the CPU 514, the JMF 1205a collects the PAT packets. FIG. 17 schematically shows an example of the collected PAT information. A column 1601 describes program numbers. A column 1602 describes packet IDs. The packet IDs shown in the column 1602 are used to obtain the PMT. Each of rows 1611 to 1613 is a pair of the program number of a channel and a corresponding packet ID. Here, three channels are defined. The row 1611 defines a pair of the program number "101" and the packet ID "501". Now, when the channel identifier provided to the JMF 1205a is "2", the JMF 1205a refers to the column 1412 in FIG. 15, so as to obtain the corresponding program number "102", and then refers to the column 1612 in the PAT shown in FIG. 17, so as to obtain the packet ID "502" corresponding to the program number "102". PMT, which is an abbreviation of Program Map Table, is stored and sent in packets having the packet ID stipulated in the PAT. In order to obtain the PMT, the JMF 1205a indicates, to the TS decoder 505, the packet ID and the CPU 514, through the library 1201b of the OS 1201. Here, it is assumed that the packet ID specified is "502". The TS decoder 505 performs filtering based on the packet ID "502" and, by passing the result to the CPU 514, the JMF 1205a collects the PAT packets. FIG. 18 schematically shows an example of the collected PMT information. A column 1701 describes stream types. A column 1702 describes packet IDs. Information specified in the respective stream types is stored and sent in the payloads of packets having the packet IDs specified in the column 1702. A column 1703 describes additional information. Each of columns 1711 to 1714 is a pair of a packet ID and the type of information being transmitted, which is known as an elementary stream. The column 1711, which is a pair of the stream type "audio" and the packet ID "5011", indicates that audio data is stored in the payload of the packet having the packet ID "5011". The JMF 1205*a* obtains, from the PMT, the packet IDs of the video and audio to be reproduced. Referring to FIG. 18, the JMF 1205*a* obtains the audio packet ID "5011" from the row 1711, and the video packet ID "5012" from the row 1712.

Next, the JMF 1205*a* provides the TS decoder 505 with pairs of the obtained audio packet ID and the audio decoder 506 as an output destination as well as the video packet ID and the video decoder 508 as an output destination, via the library 1201*b* of the OS 1201. The TS decoder 505 performs filtering based on such provided packet IDs and the output destinations. Here, the packet having the packet ID "5011" is passed to the audio decoder 506 and the packet having the packet ID "5012" is passed to the video decoder 508. The audio decoder 506 performs digital-to-analog conversion on the provided packet, and reproduces audio through the speaker 507. The video decoder 508 performs digital-to-analog conversion on the provided packet, and reproduces video on the display 509.

Finally, the service manager 1204 provides the channel identifier to an AM 1205*b* in the library 1205, and requests for data broadcast reproduction. Here, data broadcast reproduction refers to extracting a Java™ program included in the MPEG-2 transport stream, and having it executed by the VM 1203. As a technique for embedding a Java™ program into an MPEG-2 transport stream, a method known as DSMCC, which is described in the MPEG specification ISO/IEC13818-6, is used. Here, detailed description of DSMCC shall be omitted. The DSMCC format stipulates a method of encoding a file system, which is made up of directories and files used by a computer, in packets within an MPEG-2 transport stream. Furthermore, information about the Java™ program to be executed is embedded and sent in packets in the MPEG-2 transport stream in a form referred to as AIT. AIT is an abbreviation of Application Information Table defined in the OCAP specification (formally known as OCAP 1.0 Profile OC-SP-OCAP 1.0-IF-I09-031121).

First, in order to obtain the AIT, the AM 1205*b* obtains the PAT and PMT as in the case of the JMF 1205*a*, so as to obtain the packet ID of the packet that stores the AIT. Now, when "2" is the provided channel identifier and the PAT shown in FIG. 17 and the PMT shown in FIG. 18 are being transmitted, the AM 1205*b* obtains the PMT shown in FIG. 18 according to the same procedure followed by the JMF 1205*a*. The AM 1205*b* extracts, from the PMT, the packet ID of the elementary stream whose stream type is "Data" and which has "AIT" as additional information. As shown in FIG. 18, the elementary stream in the row 1713 corresponds to such elementary stream, and therefore the AM 1205*b* obtains the packet ID "5013" from it.

Figures 19, 20:
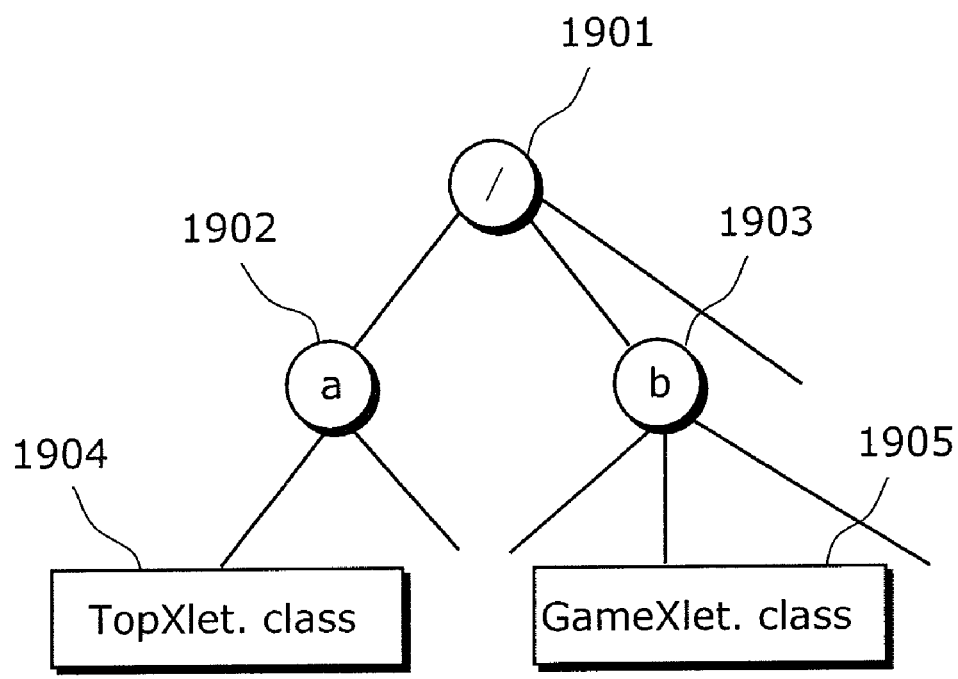
FIG. 19 is a schematic diagram showing details of an AIT stipulated in the OCAP specification according to the present invention.
FIG. 20 is a schematic diagram showing a file system sent using the DSMCC format according to the present invention.

The AM 1205*b* provides the packet ID of the AIT and the CPU 514 as an output destination to the TS decoder 505, through the library 1201*b* of the OS 1201. The TS decoder 505 performs filtering based on such provided packet ID, and passes the result to the CPU 514. As a result, the AM 1205*b* can collect the packets of AIT. FIG. 19 schematically shows an example of the collected AIT information. Column 1801 describes identifiers of Java™ programs. Column 1802 describes control information of Java™ programs. The control information includes "autostart", "present", and "kill". "autostart" means that the terminal apparatus 500 automatically executes the program promptly. "present" means that the program is not executed automatically. "kill" means that the program is to be terminated. A column 1803 describes DSMCC identifiers for extracting packet IDs that include Java™ programs in the DSMCC format. A column 1804 describes program names of the Java™ programs. Each of rows 1811 and 1812 is a set of information about a Java™ program. The Java™ program defined in the row 1811 is a set of an identifier "301", control information "autostart", a DSMCC identifier "1", and a program name "a/TopXlet". The Java™ program defined in the row 1812 is a set of an identifier "302", control information "present", a DSMCC identifier "1", and a program name "b/GameXlet". Here, these two Java™ programs have the same DSMCC identifier. This indicates that two Java™ programs are included in the file system which has been encoded according to the same DSMCC format. Here, only four items of information are stipulated for the respective Java™ programs, but more items of information are specified in actuality. Refer to the OCAP Specification (OCAP 1.0 Profile OC-SP-OCAP 1.0-IF-I09-031121) for details.

The AM 1205*b* finds the "autostart" Java™ program from the AIT, and extracts the corresponding DSMCC identifier and Java™ program name. Referring to FIG. 19, the AM 1205*b* extracts the Java™ program in the row 1811, and obtains the DSMCC identifier "1" and the Java™ program name "a/TopXlet". Next, the AM 1205*b* obtains, from the PMT, the packet ID of packets that store Java programs in the DSMCC format, using the DSMCC identifier obtained from the AIT. More specifically, the AM 1205*b* obtains, from the PMT, the packet ID included in the elementary stream whose stream type is "Data" and having a matching DSMCC identifier in the additional information.

Now, assuming that such DSMCC identifier is "1" and the PMT is that shown in FIG. 18, the elementary stream in the row 1714 matches, and the packet ID "5014" is to be extracted. The AM 1205*b* specifies the packet ID of packets in which data is embedded in the DSMCC format as well as the CPU 514 as an output destination, to the TS decoder 505 through the library 1201*b* of the OS 1201. Here, the packet ID "5014" is provided. The TS decoder 505 performs filtering based on the provided packet ID, and passes the result to the CPU 514. As a result, the AM 1205*b* can collect the required packets. The AM 1205*b* reconstructs the file system from the collected packets according to the DSMCC format, and stores the reconstructed file system into the primary storage unit 511. Extracting data such as the file system from packets in the MPEG-2 transport and storing the extracted data into storage units such as the primary storage unit 511 is hereinafter called download.

FIG. 20 shows an example of a downloaded file system. In the diagram, circles represent directories and squares represent files, where 1901 is a root directory, 1902 is a directory "a", 1903 is a directory "b", 1904 is a file "TopXlet.class", and 1905 is a file "GameXlet.class".

Subsequently, the AM 1205*b* passes, to the VM 1203, a Java™ program to be executed out of the file system downloaded into the primary storage unit 511. Now, assuming that the Java™ program name to be executed is "a/TopXlet", a file "a/TopXlet.class", resulting from the appendage of ".class" to the above Java™ program name, is the file to be executed. "/" is a delimiter between a directory and a file name, and as shown in FIG. 20, the file 1904 is a Java™ program to be executed. Next, the AM 1205b passes the file 1904 to the VM 1203.

The VM 1203 executes such Java™ program passed thereto.

Upon receiving the identifier of another channel, the service manager 1204 terminates the reproduction of the video and audio as well as the execution of the Java™ program which are being carried out through the respective libraries included in the library 1205, through each library included in the same library 1205, and then performs the reproduction of the video and audio as well as the execution of a Java™ program based on the newly received channel identifier.

The library 1205 is the assembly of plural Java™ libraries stored in the ROM 512. In the present embodiment, the library 1205, includes the JMF 1205a, the Tuner 1205c, the CA 1205d, the POD Lib 1205e, and so on.

Next the Java™ program downloading/storing and execution function shall be described.

The service manager 1204 can receive information from the head end 101 by communication with the head end 101 via the POD Lib 1205e included in the library 1205. This communication is implemented by the POD Lib 1205e using the QPSK demodulation unit 502, via the library 1201b of the OS 1201 and the POD 504.

The service manager 1204 receives, from the head end 101, the information of the Java™ program to be stored by the terminal apparatus 500 in the secondary storage unit 510, using this communication. This information is called XAIT. The XAIT information is sent between the head end 101 and the POD 504 in an arbitrary format. The present invention can be implemented regardless of the transmission format, as long as information required for XAIT information is included.

Figure 21:
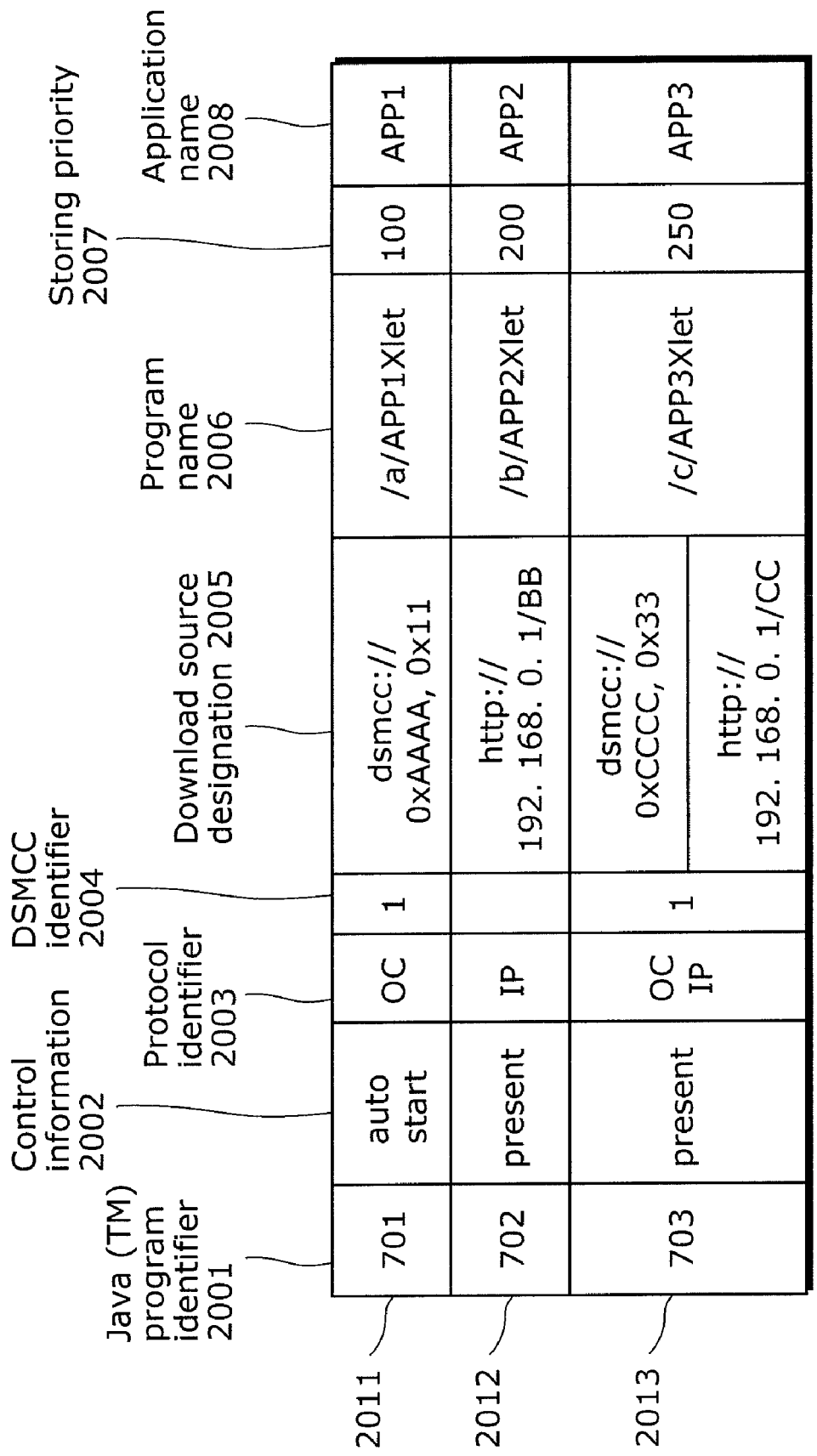
FIG. 21 is a schematic diagram showing details of the XAIT according to the present invention.

FIG. 21 shows a table that schematically shows an example of the XAIT information obtained from the head end 101. Column 2001 describes identifiers of Java™ programs. Column 2002 describes control information of Java™ programs. The control information includes "autostart" and "present". "autostart" means that the program is executed automatically when the terminal apparatus 500 is powered on, or when the XAIT information is updated, and "present" means that the program is not executed automatically. A column 2003 describes protocol identifiers. A protocol identifier indicates a protocol that can be used for performing the download of a program. Protocol identifiers include "OC (Object Carousel)", "IP", and so on. "OC" indicates that downloading can be performed from a file system encoded in the DSMCC format. Moreover, "IP" indicates that downloading of a program can be performed using a network. Furthermore, in the case where downloading from both "OC" and "IP" is possible, both may also be described. A column 2004 describes DSMCC identifiers for extracting packet IDs that include Java™ programs in the DSMCC format. As such, they are only present when "OC" is present in the protocol identifier in column 2003. A column 2005 describes the download source description of the protocols shown in column 2003. The download source designation corresponding to the "OC" designation in the protocol identifier 2003 designates the identifier of an elementary stream as well as an identifier which can uniquely identify the transport stream in which the file system encoded in the DSMCC format is embedded and the PMT (see FIG. 18) in such transport stream. Hereinafter, the identifier which can uniquely identify the transport stream and the PMT (see FIG. 18) in such transport stream shall be called a source ID, for the sake of simplification. Furthermore, the download source designation corresponding to the "IP" designation of the protocol identifier 2003 designates the server which provides the downloading of the program, the directory name where the program is stored, and so on. Note that there may be plural download source designations 2005 for the protocol identifier 2003. More-specifically, it is possible to designate "OC" in the protocol identifier 2003, and it is also possible to describe plural download source designations 2005 corresponding to such "OC". Furthermore, the same is true when the protocol identifier 2003 designates "IP". A column 2006 describes the program name of the Java™ programs. A column 2007 describes the storing priority of the Java™ programs. The storing priority is a value specified for individual Java™ programs described in the XAIT information, and is the priority for determining the Java™ program to be stored in the secondary storage unit 510, and data necessary in the execution of the Java™ program. A column 2008 describes the application name of the Java™ programs. The application name is a name with which the user identifies the Java™ programs. Rows 2011, 2012, and 2013 describe the set of information of the Java™ programs. The Java™ program defined in the column 2011 is a set of an identifier "701", control information "autostart", a protocol identifier "OC", a DSMCC identifier "1", a download source designation "dsmcc://0xAAAAx11", and a program name "a/APP1Xlet", a storing priority "100", and an application name "APP1". Here, although only eight items of information are stipulated for the respective Java™ programs, the present invention can also be implemented even when more information, or only a part of the information, is defined. Furthermore, although an example of the description of each information is shown, the present invention can also be implemented without following such description, as long as the details to be carried by each information can be shown.

Note that although an application name in column 2007 is for example a name used for identifying, for the user, the respective Java™ programs described in the XAIT information, the present invention can also be implemented even without application names, as long as there is enough information presented to the user to allow the user to identify the Java™ programs.

Figure 22:
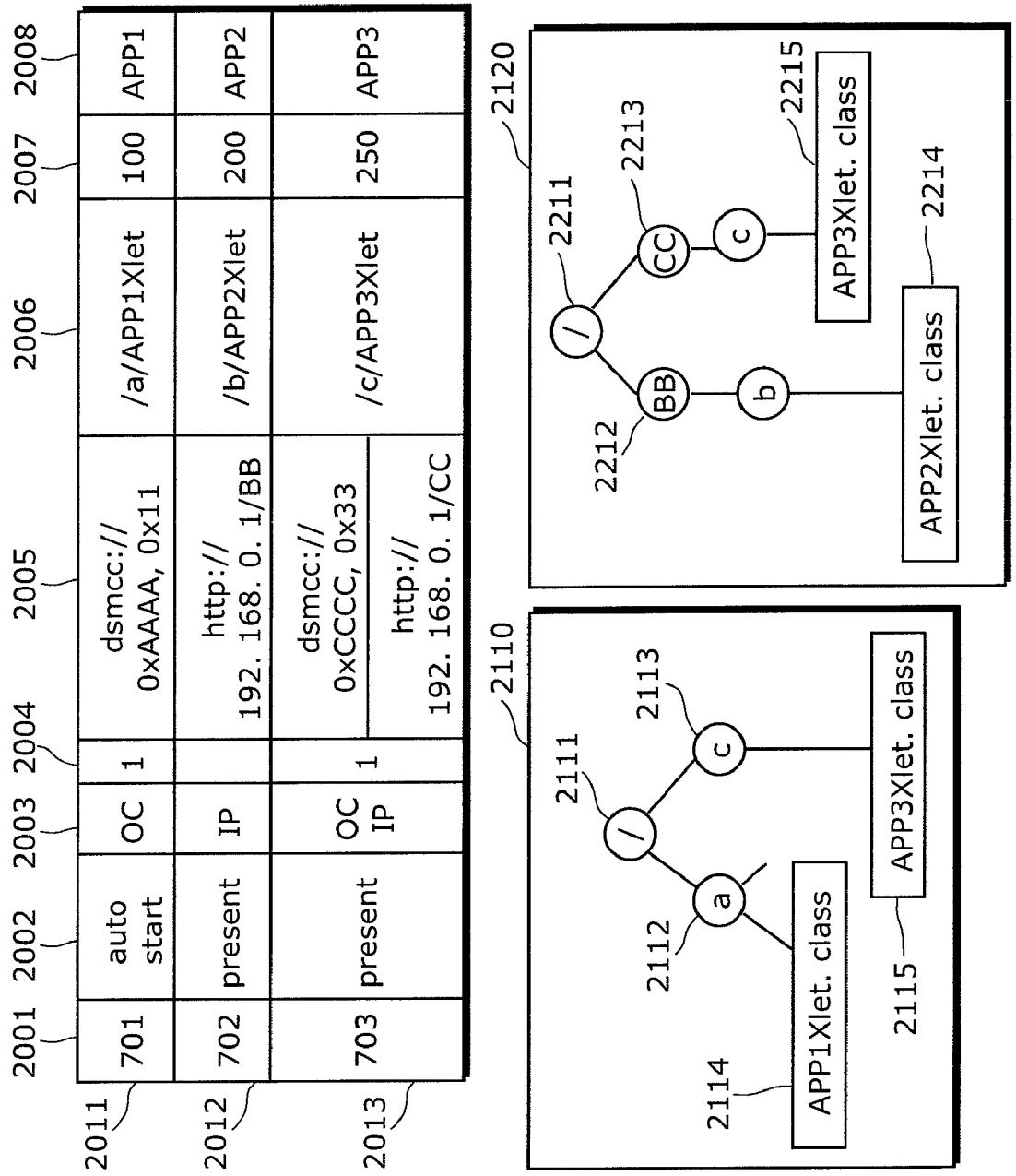
FIG. 22 is a schematic diagram showing a file system sent using the DSMCC format and a file system within a server providing downloading in a network method, according to the present invention.

FIG. 22 is a diagram schematically showing the relationship between a protocol identifier 2003 in FIG. 21 and a file system where the Java™ program serving as the download source is present. Elements in FIG. 22 that are the same as those in FIG. 21 are given the same numerical references and their description shall be omitted. 2110 indicates the file system, in the transport stream, encoded in the DSMCC format. Furthermore, 2120 indicates a file system, in the server providing the downloading of a program. The Java™ program defined in row 2011 only exists in the file system shown in 2110, since the protocol identifier shown in column 2003 is only "OC". Furthermore, the Java™ program defined in row 2012 only exists in the file system on the server shown in 2120, since the protocol identifier shown in column 2003 is only "IP". Furthermore, the Java™ program defined in row 2013 is present in both the file system shown in 2110 and the file system on the server shown in 2120, since both "OC" and "IP" are set in the protocol identifier 2003. As such, when program downloading is to be performed, it is possible to select from where the program shall be obtained from among these. The selection principle shall be described later. Note that although one each of OC or IP is set for the respective Java™ programs, it is also possible to have these in a plurality.

Next, the service manager passes the XAIT information to the AM 1205b in the library 1205, and requests program downloading and execution of the Java™ program described in the XAIT information, based on the protocol identifier 2003 and the download source designation 2005. Upon receiving the XAIT information, the AM 1205b refers to the protocol identifier 2003 and determines the download method. In the case where the download method determined by the AM 1205b is "OC", the file system is stored into the primary storage unit 511 from the MPEG transport stream in the same procedure as that for downloading a Java™ program from the AIT information. On the other hand, in the case of "IP", the program is downloaded from the server providing the downloading of the program, and stored in the primary storage unit 511, following the details in the download source designation 2005. Furthermore, the AM 1205b downloading the program can also build a file system to match the directory structure specified in the file name of the XAIT information, and stored the file system. More specifically, in the application defined in row 702, it is possible to create a b directory from the root directory as shown in the program name 2006, and store within it the downloaded program App2Xlet.class. Moreover, the download source 2005 shown in FIG. 21 and FIG. 22 shows and example of obtaining a program from an HTTP server using an HTTP protocol. As a specific example, the download source designation 2005 described in row 2012 in FIG. 21 is "http://192.168.0.1/BB". The "http" in the download source designation 2005 indicates use of an http protocol, "192.168.0.1" indicates the IP address of the HTTP server providing the downloading of the program, and "/BB" indicates the directory path to the program to be downloaded existing in inside the HTTP server. Note that a method of downloading from a network using an HTTP protocol or and HTTP server is described, obtainment through other methods is also possible. Subsequently, the file system stored in the primary storage unit 511 may be copied into the secondary storage unit 510. Note that downloading directly into the secondary storage unit 510, without passing through the primary storage unit 511, can also be implemented. Furthermore, it may also be processed in the primary storage unit without storing in the secondary storage unit 510. Note that although "OC" and "IP" are described here as protocol identifiers, obtaining from a "recording medium" or methods other than these are also possible.

Figure 23:
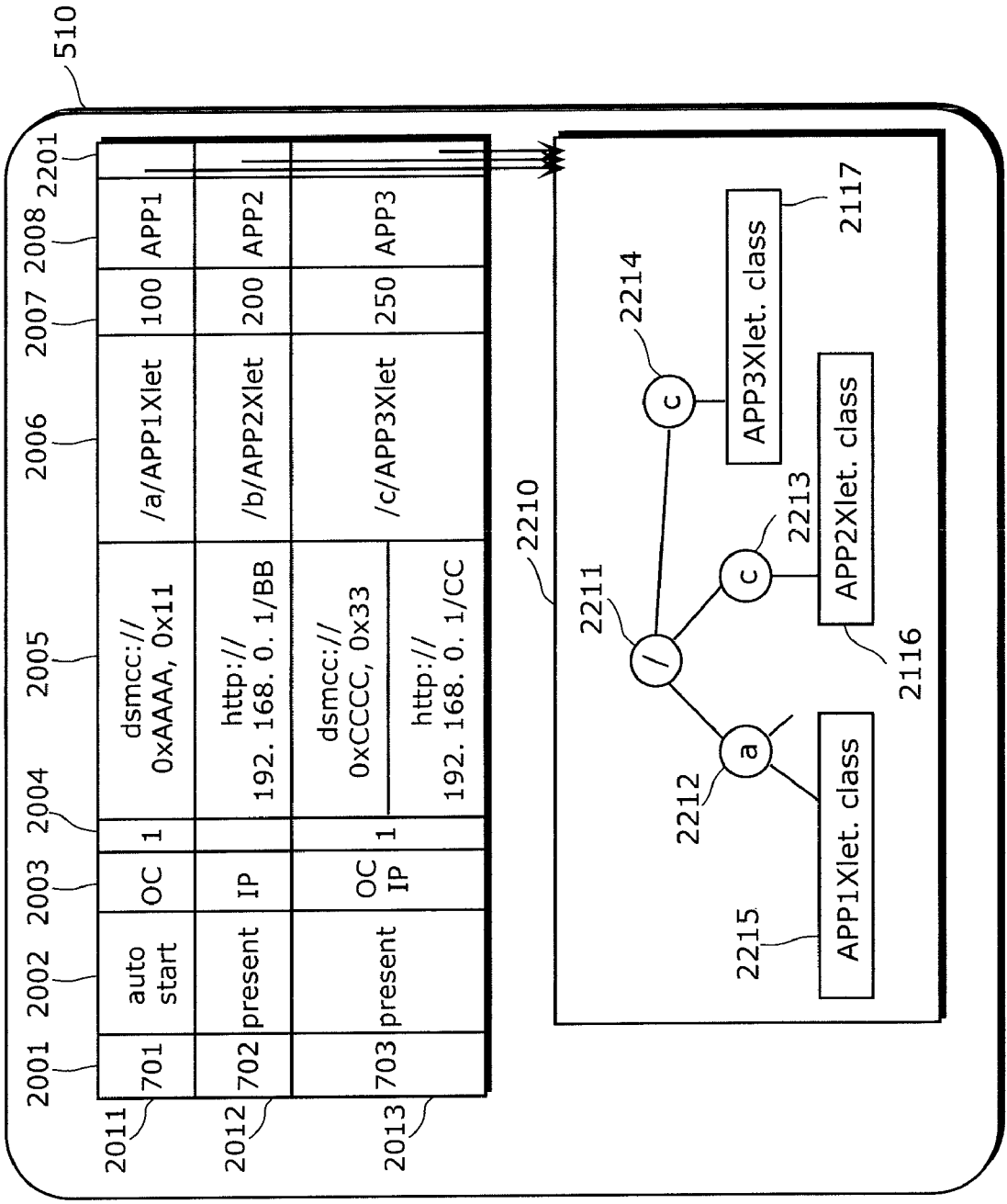
FIG. 23 is a diagram showing an example of information stored in the secondary storage unit according to the present invention.

Next, the AM 1205b stores the storage position of the downloaded or built-up file system in the secondary storage unit 510 in association with the XAIT information. FIG. 23 shows an example of XAIT information and a downloaded or built-up file system stored in association with each other in the secondary storage unit 510. In FIG. 23, elements that are the same as in FIG. 22 are given the same numerical references as in FIG. 22, and their description shall be omitted. A column 2201 stores the storage positions of downloaded or built-up file systems corresponding to each of the lava (™) programs. In the diagram, the storage positions are indicated by arrows. 2210 is a downloaded or built-up file system which holds inside a top directory 2211, a directory "a" 2212, a directory "b" 2213, a directory "c" 2214, a file "APP1Xlet.class" 2115, a file "APP2XIet.class" 2116, and a file "APP3XIet.class" 2117.

Although, here, the AM 1205b stores the XAIT information after storing the Java™ program, storing of the Java™ program prior to the storing of the XAIT information can also be implemented. Note that although the XAIT information is stored in the secondary storage unit 510, storing in the primary storage unit 511 can also be implemented. In the case of storing in the primary storage unit 511, the stored XAIT information is lost when the power is turned OFF.

Here, the file system is formed specifically from plural Java™ programs described in the XAIT information, and data necessary for the execution of the Java™ programs. Hereafter, the individual Java™ programs described in the XAIT information, and the data necessary for the execution of the Java™ programs shall be called application. In addition, downloading of an application to the secondary storage unit 510 or the primary storage unit 511 shall be referred to hereafter as store. Further still, a region in the secondary storage unit 510 or the primary storage unit 511 for storing an application shall be referred to as a store region. Furthermore, execution of a Java™ program making up an application by the VM 1203 shall be referred to as execution of an application.

Figure 24:
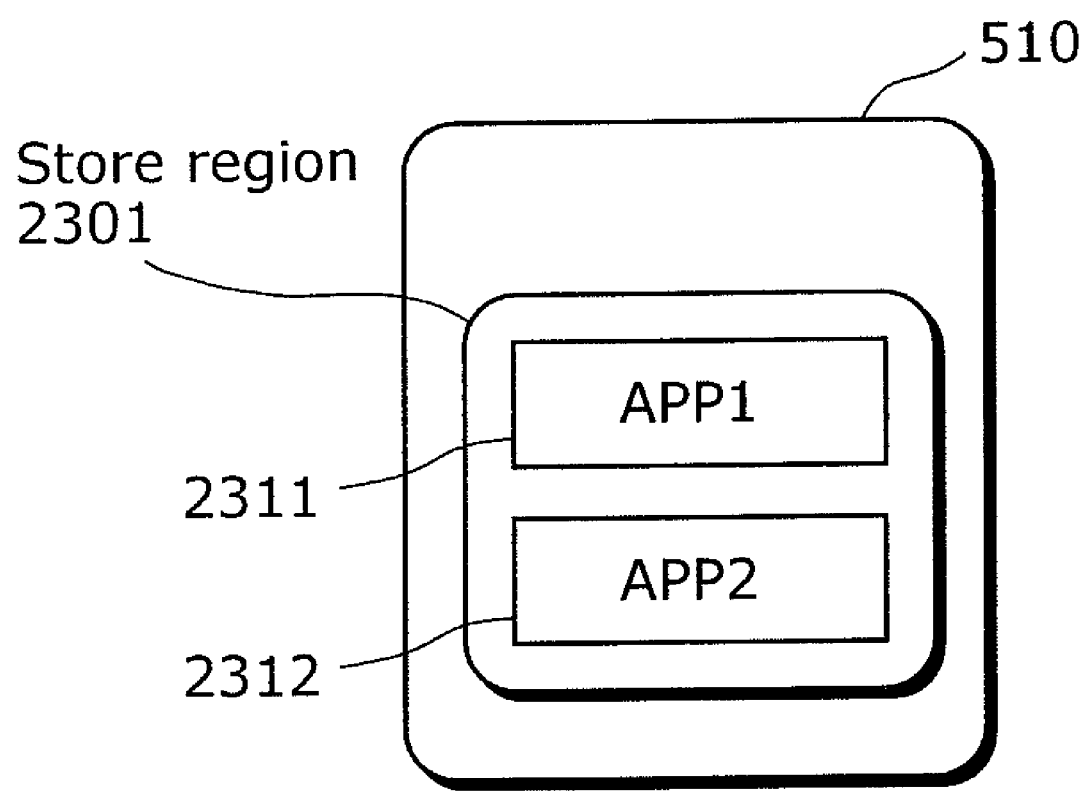
FIG. 24 is a diagram showing an example of the appearance of the application described in XAIT information being stored in an application store region according to the present invention.

FIG. 24 is an example showing the storage, in an application store region 2301, of an application described in the XAIT information. In FIG. 24, the application store region 2301 stores an application 2311 having an application name "APP1", and an application 2312 having an application name APP2.

Next, the AM 1205b refers to the XAIT information stored in the primary storage unit 511 or the secondary storage unit 510, and passes, to the VM 1203, the Java™ program of the application specified with "autostart" from among applications downloaded into the primary storage unit 511 or applications stored in the store region 2301 of the secondary storage unit 510. Referring to FIG. 23, the Java™ program "a/APP1Xlet" of the application "APP1" defined in row 2011 is passed on to the VM 1203. Now, assuming that the Java™ program name of the application to be executed is "a/APP1Xlet", a file "a/APP1Xlet.class", resulting from the appendage of ".class" to such Java™ program name, is the file to be executed. The VM 1203 executes the Java™ program of the application passed to it. Hereafter, the passing of the Java™ program from the AM 1205 to the VM1203 shall be referred to as an application activation instruction to the VM 1203.

Here, in the case where an already-stored application exists among the applications described in the XAIT information at the point when the AM 1205b receives the XAIT information, the storing of the already-stored application can be omitted since downloading or storage of the application is not necessary.

Accordingly, by storing an application beforehand in the store region 2301, the period of time, from the point where the AM 1250b receives the XAIT information to when the application activation instruction to the VM 1203 is given, can be reduced. Note that the storing priority 2007 can be used for whether the storing of an application is to be performed or not. As an example, storing is to be performed when the storing priority is 11 or higher, and storing is not to be performed when below 11. Such judgment criteria need not be 11, as long as it can be understood whether or not storing of the application is to be performed. Furthermore, information other than the storing priority 2007 may also be provided.

Figure 25:
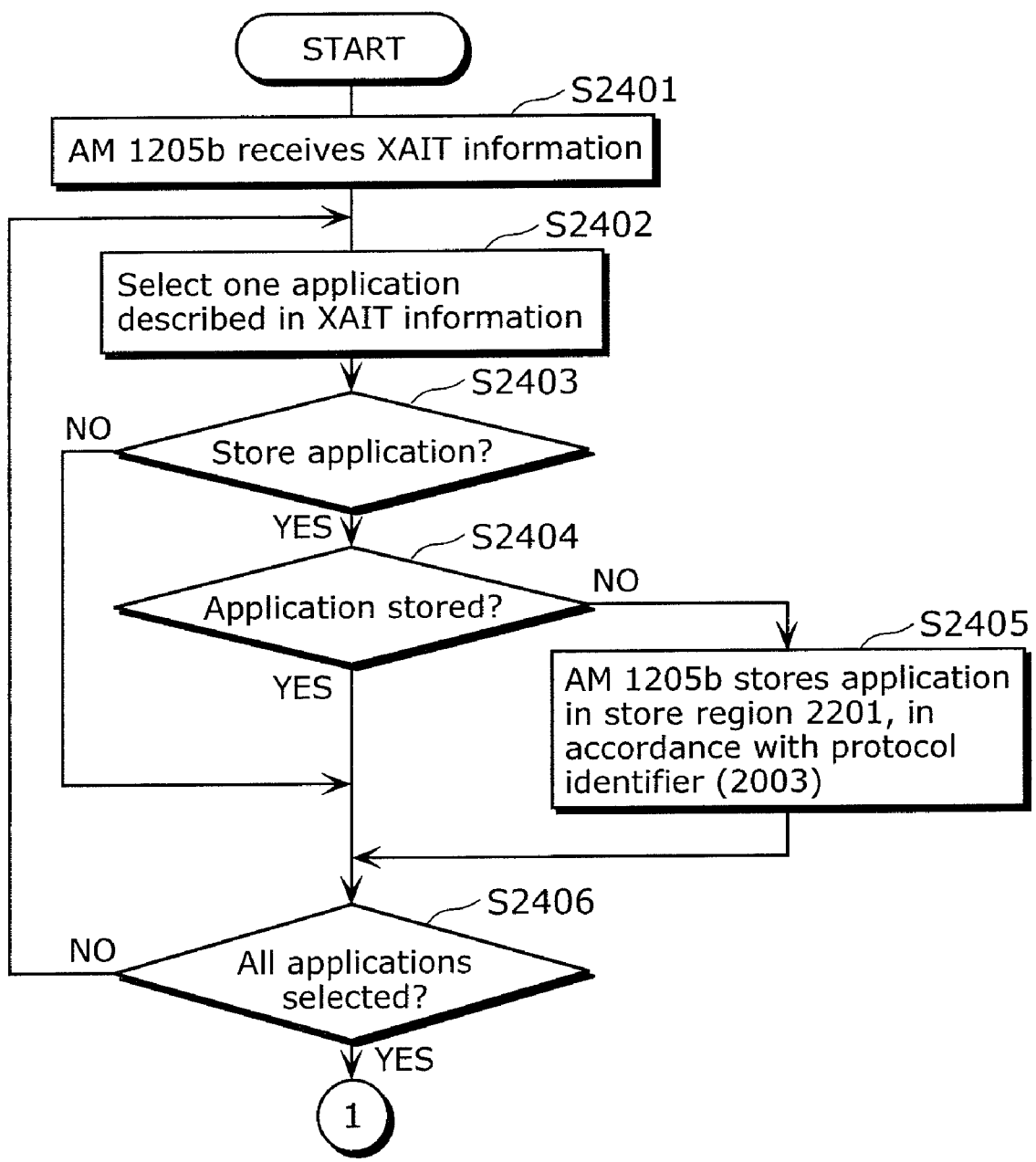
FIG. 25 is a part of an example of the operation from the point where the AM receives XAIT information until the application activation instruction is given to the VM in the first embodiment, and is a flowchart showing the store processing portion.
Figure 26:
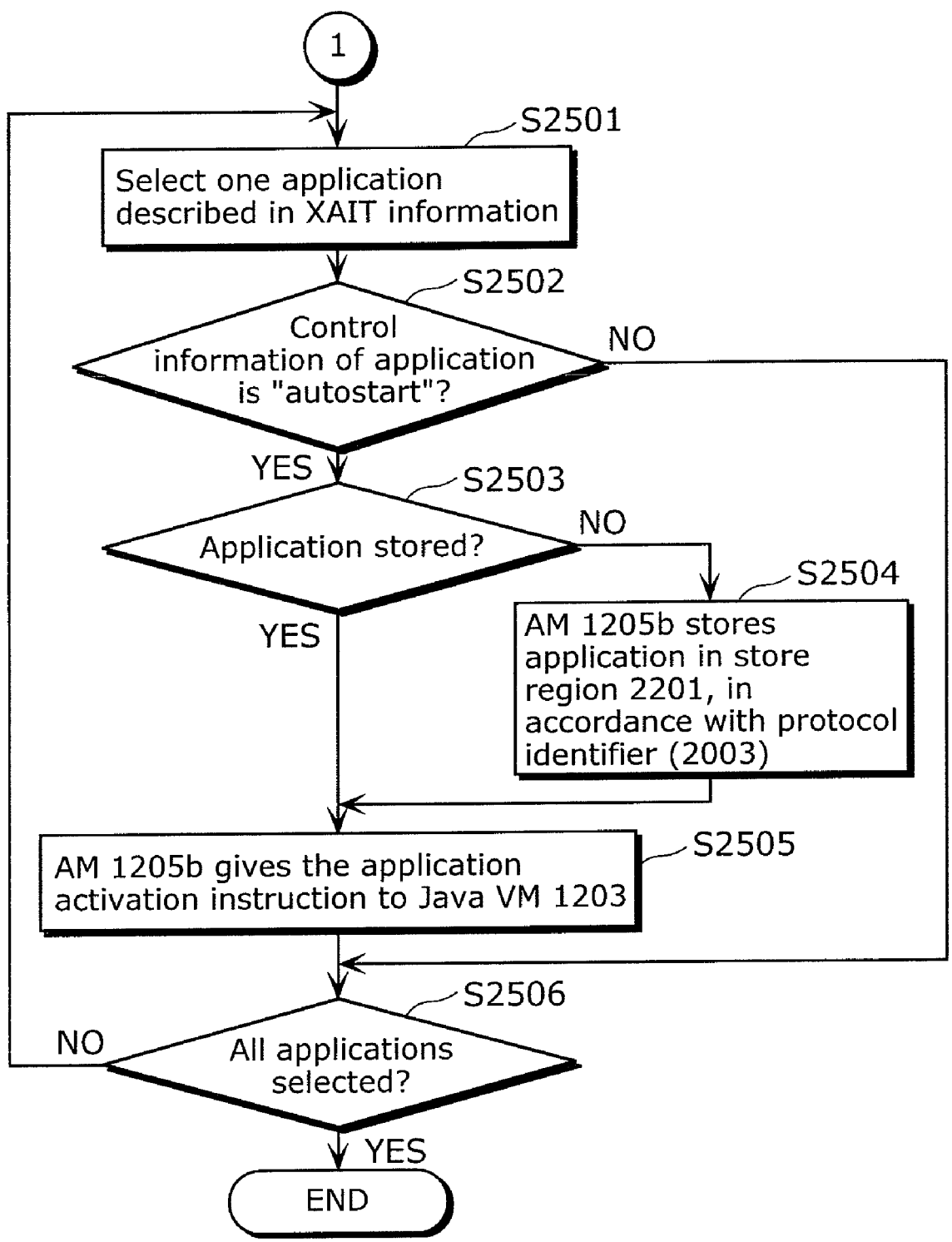
FIG. 26 is a part of an example of the operation from the point where the AM receives XAIT information until the application activation instruction is given to the VM in the first embodiment, and is a flowchart showing the application activation portion.

FIG. 25 and FIG. 26 are flowcharts showing an example of the operation from the point where the AM1250b receives the XAIT information until the giving of the application activation instruction to the VM 1203. FIG. 25 is a flowchart portion from the receiving of the XAIT information to the completion of the storing process, and FIG. 26 is a flowchart during the activation of the application after the storing process. Referring to FIG. 25, upon receiving the XAIT information (S2401), the AM 1205b selects an application that has not yet been selected from among the applications described in the XAIT information. Here, the AM 1205b refers to the storing priority 2007 and, following the above-described judgment criteria, judges whether or not to store the application (S2403). At this time, when the application is to be stored (YES in S2403), the AM 1205b judges whether or not the application selected in S2402 is already stored (S2404). When not stored (NO in S2404), the AM 1205b determines the protocol described in the protocol identifier 2003 and the download source from the download source designation 2005, and downloads and stores the application (S2405). Note that in the case of downloading from the DSMCC, the DSMCC identifier 2004 is also referred to. When it is judged in S2403 not to store the application (NO in S2403), or when the application is already stored in S2404 (YES in S2404), or when performing the processing in S2405, the AM 1205b judges whether or not all the applications described in the XAIT information are selected (S2406) and, when not all of the applications described in the XAIT information have been selected yet (NO in S2406), repeats the processing from S2402. When it is judged in S2406 that all the applications described in the XAIT information have been selected, the AM 1205b then performs the activation of the application, according to FIG. 26. The AM 1205b again sequentially selects the applications described in the XAIT information, one at a time, starting from an application that has not yet been selected. Next, the AM 1205b judges whether or not the control information 2002 of the selected application is "autostart" (S2502) and, when the control information of the selected application is "autostart" (YES in S2502), the AM 1205b judges whether or not the application is stored (S2503). When the application is to be stored (NO in S2503), the AM 1205b determines the protocol described in the protocol identifier 2003 and the download source from the download source designation 2005, and downloads and stores the application (S2504). Note that in the case of downloading from the DSMCC, the DSMCC identifier 2004 is also referred to.

Next, the AM 1205b gives the application activation instruction to the VM 1203 (S2505). Subsequently, the AM 1205b judges whether or not all the applications described in the XAIT information have been selected (S2506) and, when not all of the applications described in the XAIT information have been selected yet (NO in S2506), repeats the processing from S2501. When it is judged in S2506 that all the applications described in the XAIT information have been selected (YES in S2506), the process is ended.

In this manner, the process, from the receiving of the XAIT information, to the storing and activation instruction of the application, is advanced, and the process is ended when all the applications described in the XAIT information are already selected. Although FIG. 25 and FIG. 26 show separate procedures for the processing of the storing and activation instruction of the application, they may also be processed within one repetition.

Note that although it is described here that the AM 1205b sends an activation instruction for the application to the VM 1203b after downloading the application or completing storage of the application in the store region, it is also possible for the AM 1205b to send the application activation instruction to the VM 1203b before downloading the application or storing it in the store region. It is assumed that activation instruction here is implemented by the AM 1205b passing the program name of the application to the executed to the VM 1203. In this case, after receiving the application activation instruction from the AM 1205b, the VM 1203 either downloads or reads the application from the primary storage unit 511 or the store region, and executes it.

Figure 27:
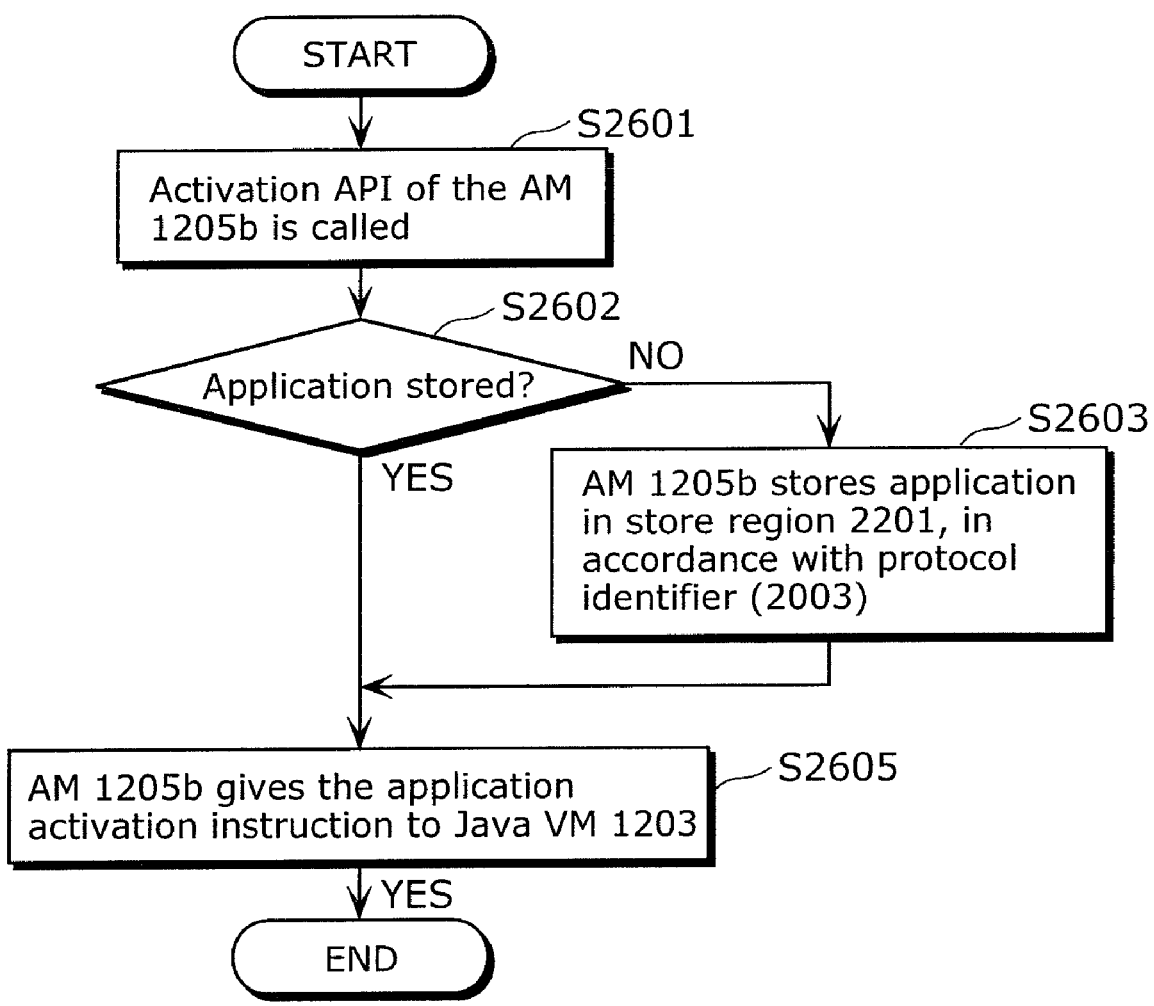
FIG. 27 is a flowchart showing an example of the operation up to when the application activation instruction is given according to the calling of the application activation API of the AM in the first embodiment.

The activation of the application occurs not only when XAIT information is received as shown in FIG. 25 and FIG. 26. The AM 1205b provides, to a currently-executed application having a special privilege, an API which enables the handling of the life cycle, such as activation and termination, of other applications. As such, a currently-executed application having a special privilege can specify information of an application to be activated, and request the activation of the application to the AM 1205b by using such API. FIG. 27 shows the flowchart for this.

Figure 28A:
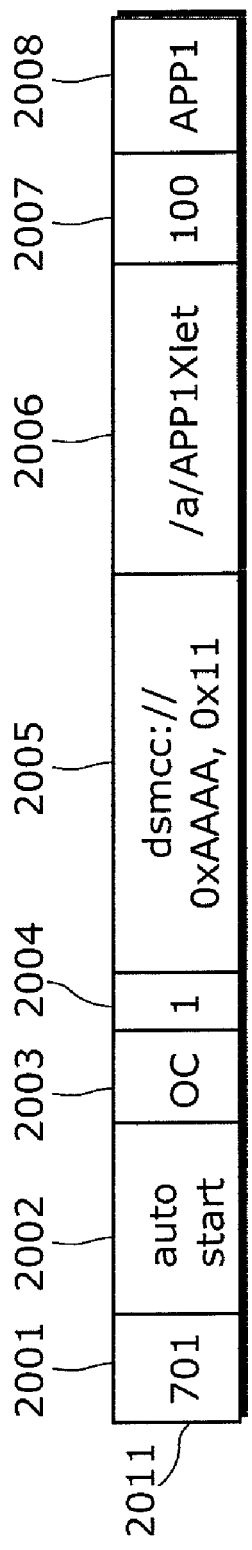
FIGS. 28(a) and (b) are diagrams showing and example of the appearance of an application stored in a store region in accordance with the XAIT information, in the first embodiment.
Figure 28B:
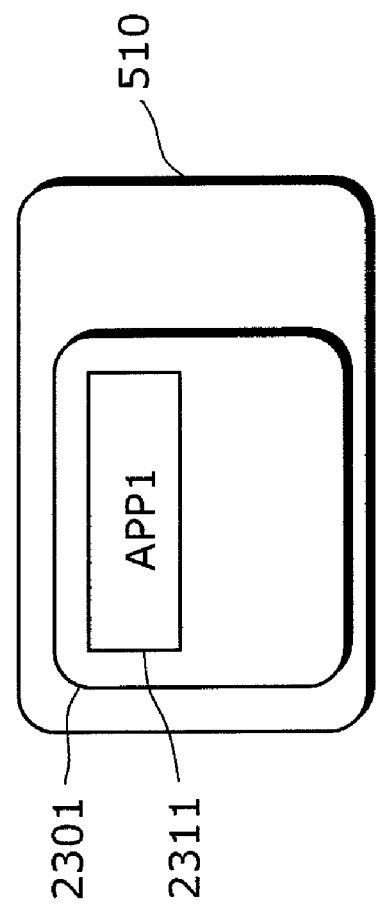
Figures 29A, 29B:
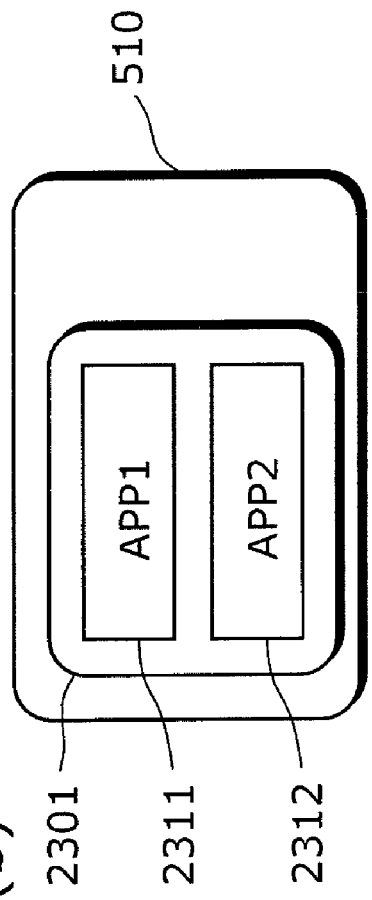
FIGS. 29(a) and (b) are diagrams showing and example of the appearance of an application stored in a store region in accordance with the XAIT information, in the first embodiment.

The currently-executed application having a special privilege specifies the information of the application to be activated, and calls the API, provided by the AM 1205b, for performing the activation of the application (S2601). At this time, the AM 1205b checks whether or not the application to be activated is already stored (S2602). Here, when the application is not stored (NO in S2602), the AM 1205b determines the protocol described in the protocol identifier 2003 and the download source from the download source designation 2005, and downloads and stores the application (S2603). Next, the AM 1205 gives the application activation instruction to the VM 1203 (S2505), and the process is ended. Since the AM 1205b performs the processes in FIG. 25 and FIG. 26 upon receiving the XAIT information, the application to be stored in the store region 2301 is updated, following the updating of the XAIT information. Referring to FIG. 28 and FIG. 29, there are cases where, following the updating of the XAIT information, the application stored in the store region 2301 is updated. FIG. 28(*a*) shows XAIT information of application "APP1" defined in row 2011, and FIG. 28(*b*) shows the store region 2301 when the XAIT information is received and the processes in FIG. 25 and FIG. 26 are concluded. Since one application "APP1" defined in row 2011 is present in the XAIT information in FIG. 28(*a*), one "APP1" 2311 is stored in the store region 2301 in FIG. 28(*b*). Next, FIG. 29(*b*) shows the appearance of the store region 2301 in the case where the XAIT information in FIG. 29(*a*) is received when the store region 2301 is in the state in FIG. 28(*b*), and the processes in FIG. 25 and FIG. 26 are concluded. FIG. 29(*a*) shows the XAIT information describing the "APP1" defined in row 2011 and an application "APP2" defined in row 2012. When the AM 1205b receives the XAIT information in FIG. 29(*a*), two applications, namely, an application "APP1" 2311 defined in row 2011 and an application "APP2" 2312 defined in row 2012, are stored in the store region 2301 as in FIG. 29(*b*).

Next, the determination of the download source required during the store function of an application described in XAIT information, and message notification to the user performed by the AM 1205b that has received the XAIT information, which are the main function of the present invention, shall be explained. More specifically, this concerns the processes in S2405 and S2504 in FIG. 25 and FIG. 26, respectively, which are shown as flowcharts when the XAIT information is received, and S2603 in FIG. 27 which is shown as a flowchart of when the application activation API of the AM 1205b is called by the application having a special privilege.

Figure 30:
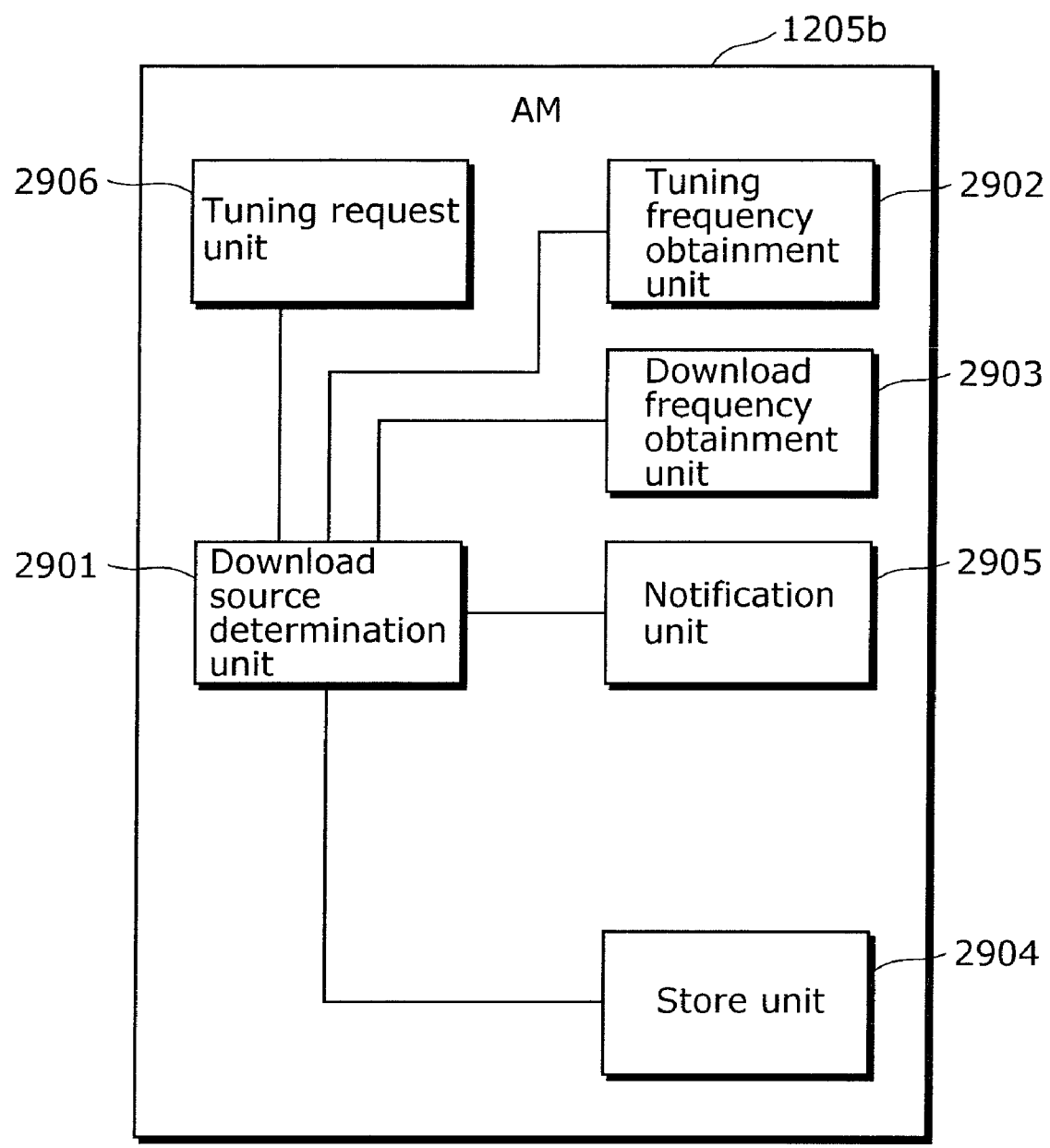
FIG. 30 is a diagram showing the configuration of the AM in the first embodiment.

FIG. 30 is a diagram showing, among the components of the AM 1205b, only the constituent elements which determine the download source during the storing process. Since the other constituent elements are not directly related to the present invention, their description shall be omitted.

The AM 1205b includes a download source determination unit 2901, a tuning frequency obtainment unit 2902, a download frequency obtainment unit 2903, a store unit 2904, a notification unit 2905, and a tuning request unit 2906. Moreover, in the present embodiment, the case is assumed in which the selected application exists as at least one file system encoded in the DSMCC format. More specifically, the case is assumed in which OC is designated in the protocol identifier 2003 of the selected application, and at least one download source designation 2005 corresponding to the protocol identifier 2003 "OC" is stated in the download source designation 2005.

The download source determination unit 2901 determines the download source of a program. As such, the download source determination unit 2901 receives the protocol identifier 2003 of the XAIT information, and the information of the download source designation 2005. Here, the download source determination unit 2901 judges what sort of protocol identifier 2003 is carried by the selected application. To determine the download source, the download source determination unit 2901 obtains the current tuning information from the tuning frequency obtainment unit 2902, and obtains the frequency required to download the application, from the download frequency obtainment unit 2903. Although frequency is described here, since the description is made to represent information necessary for tuning, the modulation method and internal code rate which are other information necessary for tuning may also be processed together. Hereinafter, the same is true for all description concerning frequency. The download source determination unit 2901 obtains, from the tuning frequency obtainment unit 2902, the tuner use situation and the frequency being tuned to by the respective tuners that are in use. Furthermore, the present invention can be applied even regardless of the number of tuners, with the problem being whether or not the tuner to be used exists. Furthermore, the present invention can be implemented even when a plurality of download sources from the OC are designated in the download source designation 2005. In other words, the download source determination unit 2901 refers to the XAIT information and, when OC is present in the protocol identifier 2003 of the currently selected application, the download source determination unit 2901 obtains all the source IDs from the download source designation 2005 and passes these to the download frequency obtainment unit 2903, and then receives, from the download frequency obtainment unit 2903, all the frequencies on which the transport streams, in which the channels transmitted by the PMT indicated by such source ID exist, flow. Subsequently, the download source is determined through comparison with the current tuning information. Furthermore, after determining the download source, the download source determination unit 2901 gives a notification instruction to the notification unit 2905, a tuning request instruction to the tuning request unit 2906, and a store instruction for the application to the store unit 2904. Note that the source ID of the application to be tuned to and the tuner to be used are specified in the tuning request instruction to the tuning request unit 2906. At this time, when the terminal apparatus can use plural tuners for the downloading of the program, the following example of a priority is considered for the determination of the policy for which tuner to use by the download source determination unit 2901. These may be used independently, or in a combination of a plurality.

1) When a there is a tuner that is not being used, use such tuner preferentially.

2) When a user is viewing plural TV shows in one screen as in the case of Picture-In-Picture, there are instances where each TV show is transmitted on different frequencies. At such a time, the user is using plural tuners and, when such tuners are to be used, it is possible to preferentially process the service being viewed on the large screen, and use the tuner which is tuning onto the TV show running on the small screen, which has a smaller impact on the user, in order to minimize the impact on the user. Of course, the opposite is also possible.

3) When the user is carrying out recording and viewing at the same time, it is possible to preferentially process the recording, and use the tuner tuning onto the TV show being viewed. The opposite is also possible.

4) When a TV show purchased by the user and a free TV show are selected by the user through PPV (Pay Per View) and the like, it is possible to preferentially process the TV show purchased by the user, and use the tuner tuning on to the free TV show. The opposite is also possible.

Moreover, although it is assumed that the determination of the tuner to be used is performed by the download source determination unit 2901 here, as long as the priority for selecting the tuner follows these policies, it is not necessary that the present process is performed by the download source determination unit 2901. For example, it is also possible to have the download source determination unit 2901 performing only the specification of the source ID to the tuning request unit 2906, and to have the selection of the tuner to be used performed within the tuning request unit 2906. Furthermore, it is possible to have the download source determination unit 2901 and the tuning request unit 2906 only specifying the source ID, with a tuner library 1205c determining the tuner to be used.

Furthermore, it is also possible to receive a notification from the store unit after storing is completed, and notify the tuning request unit 2906 in order to re-set the tuning to the frequency prior to the downloading of the application.

The tuning frequency obtainment unit 2902 notifies the download source determination unit 2901 of the tuner use situation, and the frequency being tuned to by the respective tuners that are in use. Here the tuning frequency obtainment unit 2902 implements the obtainment of the tuner use situation and the frequency being tuned to by the respective tuners that are in use, by obtaining information managed by the tuner library 1205c for giving a tuning request to a tuner. Note that although an example for obtaining from the information managed by the tuner library 1205c is shown, implementation using other methods is also possible as long as tuner use situation and the frequency being tuned to by the respective tuners that are in use can be obtained. In the case where there are plural tuners, all the frequencies currently being tuned to are obtained and the results are notified by an array. Note that although notification is carried out in an array here, other notification methods are also possible since the present invention has no dependency on the notification method. Furthermore, instead of directly notifying the value of the frequency, an identifier that can be interpreted by the download source determination unit 2901 and the tuning frequency obtainment unit 2902 is acceptable. Furthermore, although the tuning frequency obtainment unit is described here as being a part of the AM 1205b, it is also possible for it to exist as a part of the tuner library 1205c; with the tuner library 1205c and the download source determination unit 2901 communicating with each other.

The download frequency obtainment unit 2903 notifies the frequency required for downloading the application, by receiving a source ID from the download source determination unit 2901, obtaining frequency information from the source ID, and notifying the download source determination unit 2901. Here, instead of directly notifying the value of the frequency, an identifier that can be interpreted by the download source determination unit 2901 and the download frequency obtainment unit 2903 is acceptable. In the download source determination unit 2901, there is a need to perform conversion from the source ID to the frequency. In order to obtain the frequency from the source ID, there is a need to obtain, from an In-band transport stream or the OOB, SI (Service information) information called SVCT which holds a table of hypothetical channels, based on NIT and a source ID which transmit information required for tuning such as frequency information. Furthermore, SI information called LVCT which holds additional information may also be obtained in addition to the SVCT. The technique for obtaining frequencies from the source ID is commonly known technology, and Cable Television SCTE 65 can be referred to for details. Furthermore, although description is carried out here under the presumption of implementation under the OCAP specification, the relationship of the source ID and the frequency can be solved using another method. Furthermore, although the tuning frequency obtainment unit is described here as being a part of the AM 1205*b*, it is also possible for it to exist as a part of a dedicated module handling SI information; with the dedicated module handling SI information and the download source determination unit 2901 communicating with each other.

The store unit 2904 downloads the application from the download source determined by the download source determination unit 2901, and stores the downloaded application.

The notification unit 2905 notifies the user of the downloading of the application, in accordance with the determination result of the download source determination unit 2901. Here, the application download notification to the user by the notification unit 2905 is implemented by the notification unit 2905 sending the download notification information to be displayed on the screen to the CPU 514 of the terminal apparatus 500, and a dialogue display program included in the library 1201*b* of the OS 1201 displaying the download notification on the display 509. Here, it is assumed that a dialogue is removed from the display 509, for example, after a predetermined time.

Following the tuning request specified by the download source determination unit 2901, The tuning request unit 2906 tunes on to the transport stream on which the specified application flows, using the specified tuner.

Furthermore, although the tuning request unit 2906 is described here as being a part of the AM 1205*b*, it is also possible to have an implementation in which the tuning request unit 2906 exists as a part of the tuner library 1205*c*; with the tuner library 1205*c* and the download source determination unit 2901 communicating with each other.

Figure 31:
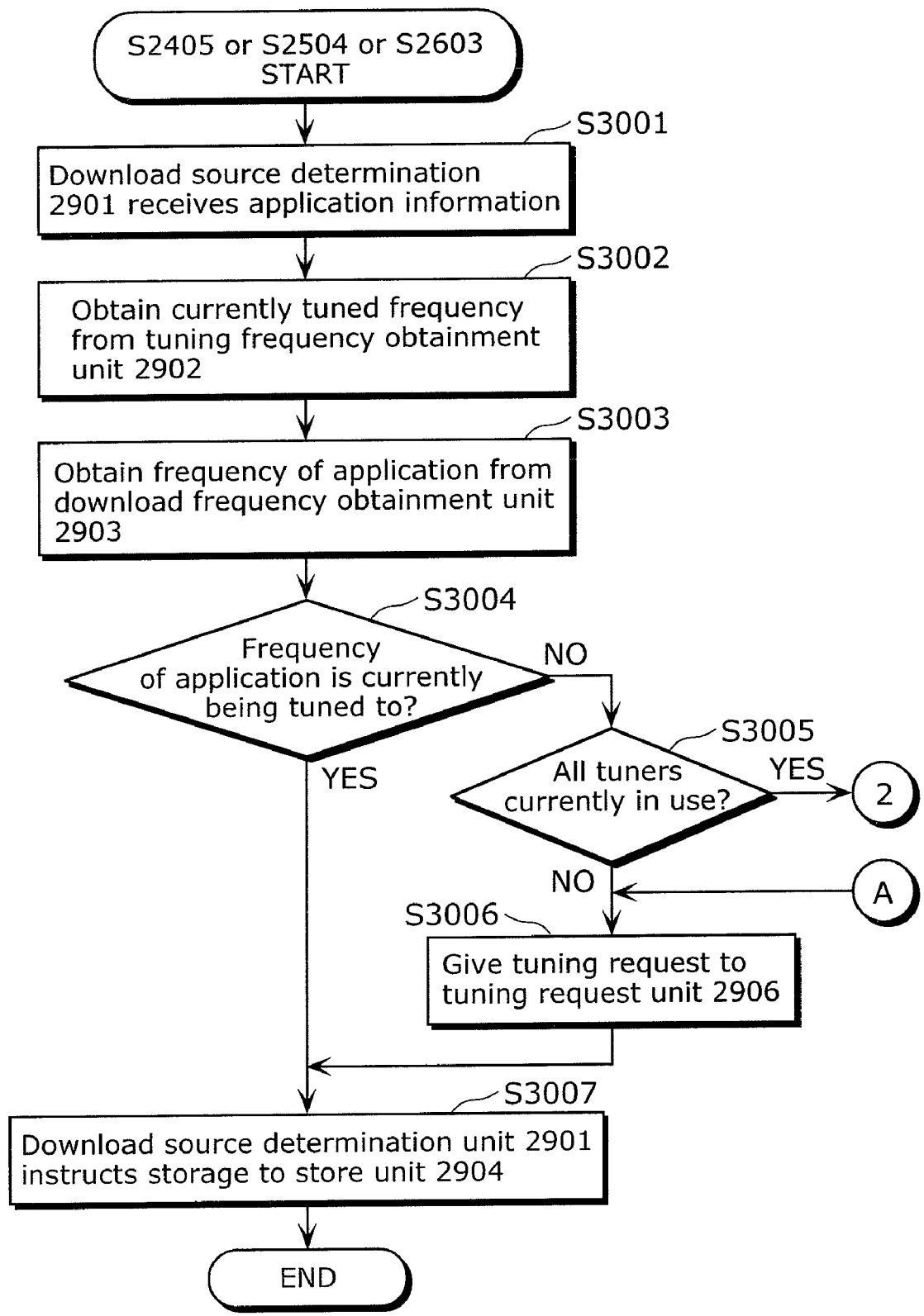
FIG. 31 is a flowchart showing an example of the operation of storing a specified application, in the first embodiment.
Figure 32:
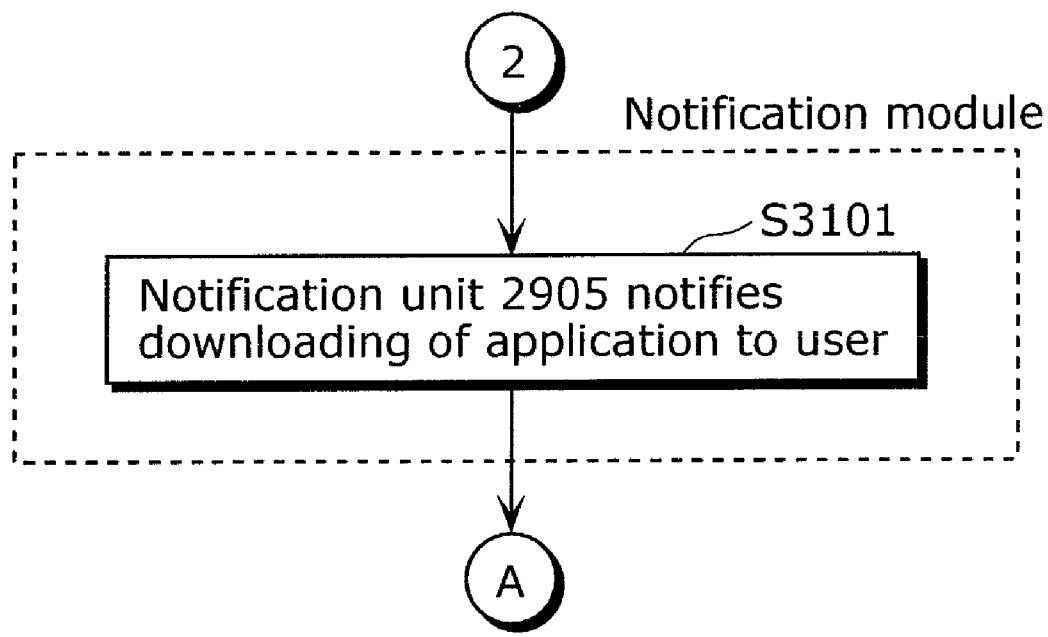
FIG. 32 is a part of FIG. 31 and is a flowchart showing an example of the operation of storing a specified application, in the first embodiment.

FIG. 31 and FIG. 32 are flowcharts showing an example of the application storing process by the AM 1205*b* which has received XAIT information in the present embodiment. In particular, they are flowcharts showing an example of the storing operation by the AM 1205*b* in the case where there is a need to download from a frequency that is different from the frequency currently being tuned to, when an application described in the XAIT information is downloaded from a file system encoded using the DSMCC format and stored in a store region 2201.

Figure 33:
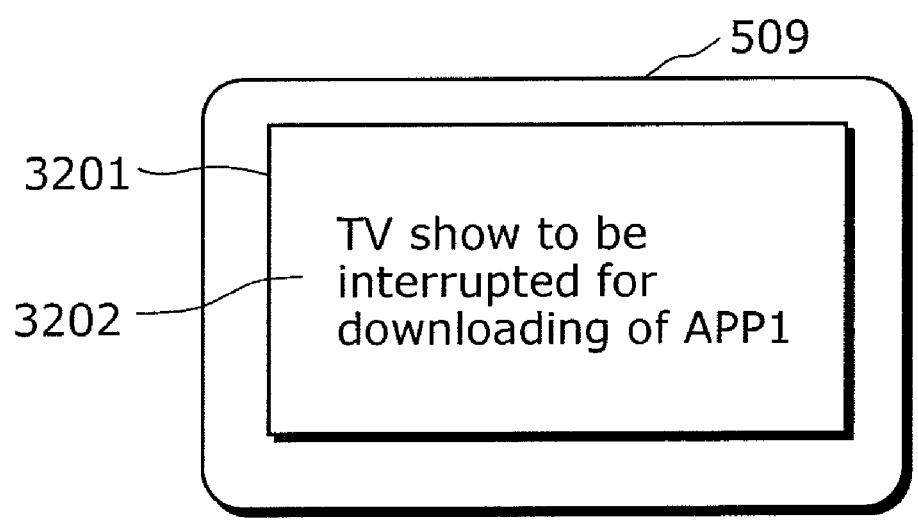
FIG. 33 is a diagram showing an example of the download notification displayed on the display 509 by a dialogue display program following the application download notification to the user by the notification unit, in the first embodiment.

Referring to FIG. 31 and FIG. 33, the download source determination unit 2901 receives the XAIT information of the selected application (S3001). At this time, it is confirmed that OC is present in the protocol identifier 2003 of the selected application. Next, the download source determination unit 2901 obtains, from the tuning frequency obtainment unit 2902, the frequency currently being tuned to (S3002). At this time, when there is a plurality of tuners, all the frequencies currently being tuned to are obtained. Next, the download source determination unit 2901 obtains the frequency of the application, from the download frequency obtainment unit 2903 (S3003). The download source determination unit 2901 judges whether or not downloading of the application can be performed without changing the present tuning, by comparing the currently-tuned frequency obtained in S3002 with the frequency of the application obtained in S3003. At this time, when the frequency for downloading the application is the currently-tuned frequency (NO in S3004), the download source determination unit 2901 inquires about the tuner use situation from the tuning frequency obtainment unit 2902 (S3005). At this time, when all the tuners are in use (YES in S3005), the download source determination unit 2901 instructs the notification unit 2905 for a message notification conveying that the current viewing or recording will be interrupted due to downloading. Subsequently, the notification unit 2905 notifies the user that the application will be downloaded (S3101 in FIG. 32). Note that, as a notification module, the processing in S3101 in FIG. 32 shall be referred to hereinafter when the same processing is performed. Here, the application download notification to the user by the notification unit 2905 is implemented by the notification unit 2905 sending the download notification information to be displayed on the screen to the CPU 514 of the terminal apparatus 500, and a dialogue display program included in the library 1201*b* of the OS 1201 displaying a download notification as that shown in FIG. 33, on the display 509. 3201 is a dialogue box which carries the display elements of a message 3202. Note that the character string of the message 3202 is not limited to the character string in FIG. 33 and may be an other character string as long as it is a method that can provide information necessary to notify the user of the downloading of the application. Moreover, the format of the message 3202 is not limited to a character string, and other formats are also possible. Still further, the display elements in the dialogue box 3201 is not limited to the display elements in FIG. 33, and other display elements are also possible as long as it is able to notify the user that downloading will be performed, or that the current viewing or recording will be interrupted, or both subjects. Next, after the message notification to the user and when not all of the tuners are in use (in other words, there is a tuner that is not being used (NO in S3005)), the download source determination unit 2901 gives a tuning request for the frequency on which downloading of the application can be performed, to the tuning request unit 2906 (S3006). Upon receiving such request, the tuning request unit 2906 starts tuning. Then, the download source determination unit 2901 instructs the store unit 2904 to download and store the application. Upon receiving such instruction, the store unit 2904 performs the downloading and storing of the specified application. Note that, after completion of the storing, the store unit may return to the execution of the download source determination unit 2901 which is the call source and, at the time of completion, may also inform such fact to the download source determination unit through the notification of a message. Furthermore, whether or not the storing was successful may also be notified depending on the return value of the call. In this manner, the storing of the specified application is performed and ended.

Figure 34:
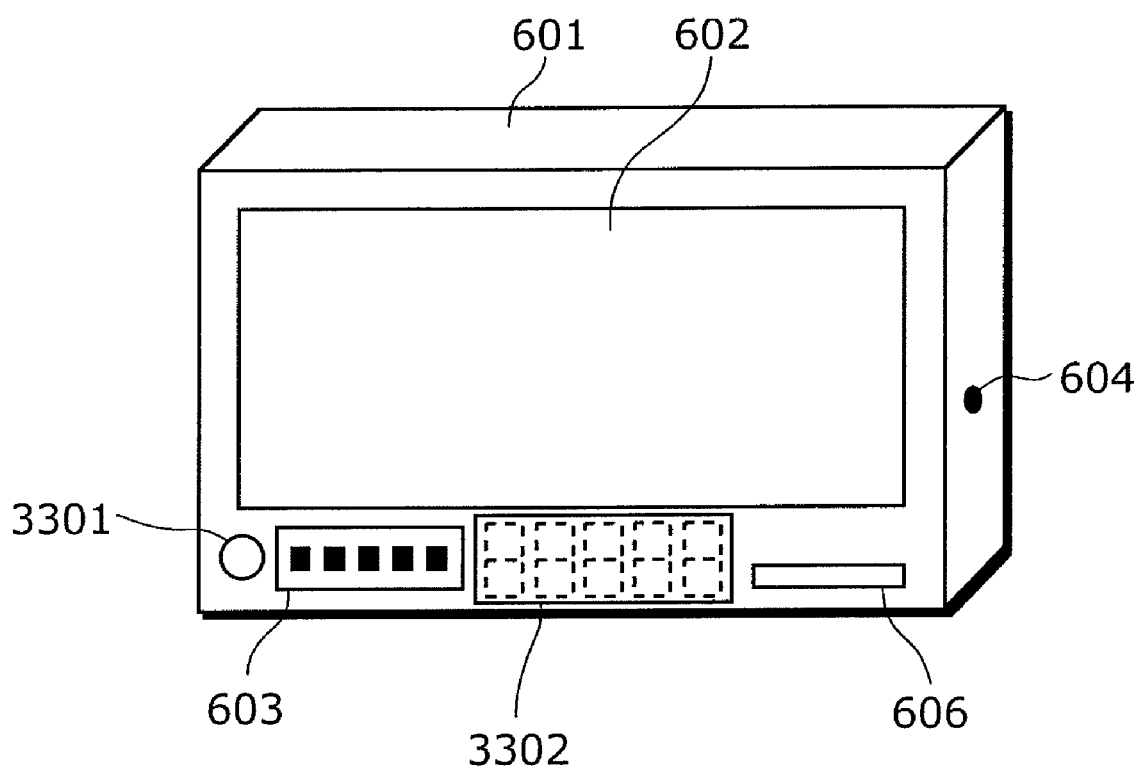
FIG. 34 is a diagram showing an example of the implementation of the download notification to the user by the notification unit, in the first embodiment.

Here, the application download notification to the user by the notification unit 2905 is implemented by having the notification unit 2905 send the download notification information to be displayed on the screen to the CPU 514 of the terminal apparatus 500, and having a dialogue display program included in the library 1201*b* of the OS 1201 display the download notification on the display 509. However, the application download notification to the user by the notification unit 2905 may be implemented through other methods, such as by displaying the download notification on the liquid crystal screen of a remote control or, with reference to FIG. 34, by displaying the download notification on a 7-segment LED 3302 in the main body of the terminal apparatus or by lighting-up a lamp 3301 in the terminal apparatus main body, as long as the method allows the user to detect the downloading of the application. In FIG. 34, elements that are the same as in FIG. 7 are given the same numerical references as in FIG. 7, and their description shall be omitted.

Furthermore, here, when downloading of the application, the notification unit 2905 may notify the user of the progress of the downloading, and the display of a message such as "loading" may also be carried out, and switching to an other video/audio is also possible. The video/audio displayed at this time may be one that is stored inside the terminal apparatus, and may also be video/audio that is present in the transport stream on which downloading of the application is being performed. Further, it is also possible to notify the user of the TV show in the transport stream on which the downloading of the application is being performed, and to switch to the video/audio of the TV show selected by the user.

Furthermore, in the present embodiment, the receiving of the XAIT information by the AM 1205b occurs when power to the terminal apparatus 500 is turned on, or when the XAIT information is updated. In other words, in the present embodiment, the receiving of the XAIT information by the AM 1205b covers the receiving of XAIT information by the AM 1205b when power to the terminal apparatus 500 is turned on, as well as the receiving of XAIT information by the AM 1205b when the XAIT information is updated after the terminal apparatus is activated. However, the updating of the XAIT information does not only refer to updating as the XAIT information sent from the head end 101 per se, and the present invention can be implemented even with other methods such as the updating of the XAIT information by the AM 1205b and by an application, and can also be applied in the subsequent embodiments.

Here, such updating of XAIT information by an application is implemented by having the AM 1205b provide an API for performing the updating of XAIT information to the application having a special privilege. The API for performing the updating of XAIT information includes an API which enable the registration of XAIT information that is newly created by the application having a special privilege, and an API which enable the modification of XAIT information which the AM 1205b has already stored in the primary storage or secondary storage.

Such API for performing the updating of XAIT information is implemented with commonly known techniques. For example, the API for registering XAIT information is defined as a registerUnboundApp method in the org.ocap.application.AppManagerProxy class, in an Annex G OCAP 1.0 Application API of the OCAP specification (OCAP 1.0 Profile OC-SP-OCAP 1.0-IF-I09-031121). When the application having a special privilege uses the API for registering XAIT information registration, and registration of new XAIT information (registration of XAIT information that is newly created by the application having a special privilege) is performed, the AM 1205b receives such XAIT information which is registered by the application having a special privilege, as an XAIT information update.

By applying the first embodiment in such manner, it is possible to notify the user of the termination of a service such as video/audio that the user is currently viewing or recording, in the case where an application is to be downloaded from a frequency other than the frequency currently being tuned to. Accordingly, it is possible to prevent unexpected disabling of viewing or recording.

(Second Embodiment)

Figure 35:
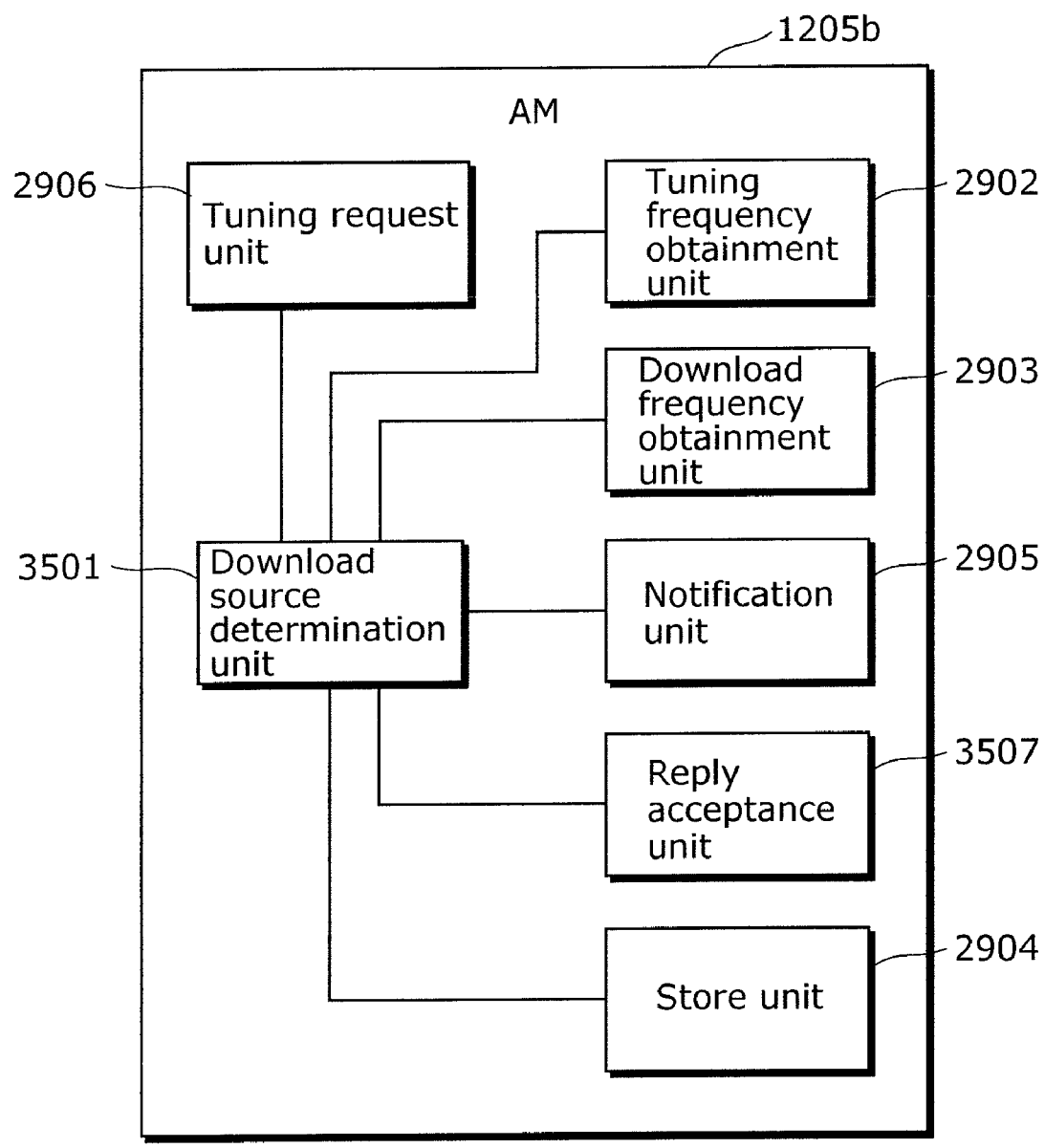
FIG. 35 is a diagram showing the configuration of the AM in the second embodiment.

In the first embodiment, although the notification unit 2905 notifies the user of the interruption of the current viewing or recording due to the downloading of an application in the case where the downloading source determination unit 2901 determines the download source of the application, no judgment is made as to whether or not there is confirmation by the user. For this reason, in the present embodiment, a reply acceptance unit (3507 in FIG. 35) which accepts a reply from a user is provided in addition to that in the first embodiment. With reference to FIG. 35, elements having the same reference number as in FIG. 30 have the same function in FIG. 30, and thus their description shall be omitted in the present embodiment. Moreover, in the present embodiment, as in the first embodiment, the case where the selected application exists as at least one file system encoded in the DSMCC format is assumed. More specifically, the case is assumed in which OC is designated in the protocol identifier 2003 of the selected application, and at least one download source designation corresponding to the protocol identifier 2003 "OC" is stated in the download source designation 2005. In addition to the functions of the download source determination unit 2901, a download source determination unit 3501 gives a reply acceptance instruction to the reply acceptance unit 3507, and receives a reply from the user. The download source determination unit 3501 is characterized in giving an instruction for a tuning request to the tuning request unit 2906, and a store instruction to the store unit 2904, after receiving such user reply.

After receiving the reply acceptance instruction from the download source determination unit 3501, the reply acceptance unit 3507 waits for a reply from the user and, after receiving a reply from the user, notifies the download source determination unit 3501 of the user's reply. Note that it is also possible to have a course of action in which a time limit for waiting for a reply from the user is determined beforehand and, when there is no reply from the user even after the passing of the time limit, the reply acceptance unit 3507 awaiting the user's reply performs self-judgment. The reply acceptance unit 3507 is implemented by the user pressing down a plus key or an OK key assigned in a remote control, according to a screen-display displayed by the notification unit 2905.

Figure 36:
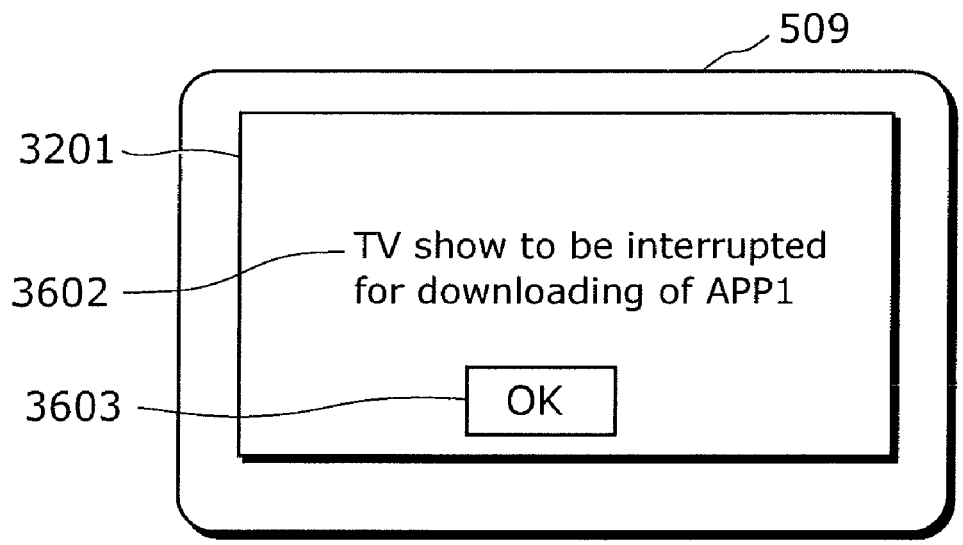
FIG. 36 is a diagram showing an example of the implementation of the download notification to the user by the notification unit, in the second embodiment.
Figure 37:
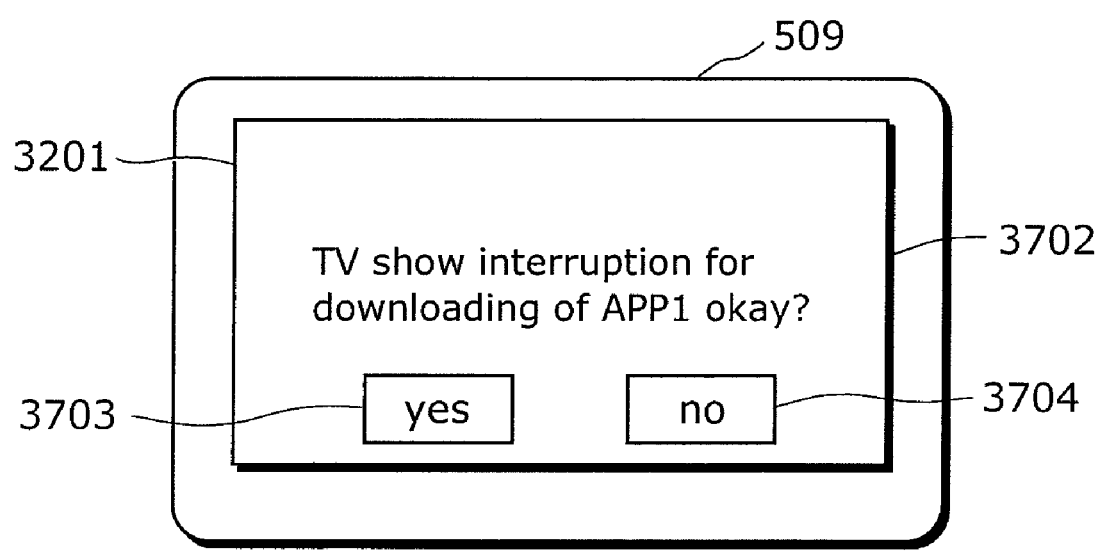
FIG. 37 is a diagram showing an example of the implementation of the download notification to the user by the notification unit, in the second embodiment.

FIG. 36 and FIG. 37 show an example of the screen-display displayed by the notification unit. In FIG. 36, an OK button 3603 is added to FIG. 33 shown in the first embodiment. In addition, in FIG. 37, a Yes-button and a No-button are added to FIG. 33 shown in the first embodiment. At this time, the message-details to be notified to the user are not limited to that in 3602 and 3702, as long as it is a message notifying the user that the viewing or recording will be interrupted. Furthermore, the message need not be a text display, and an other representation may be used. Furthermore, the character strings within the buttons 3603, 3703, and 3704 need not be limited to such details. Further still, FIG. 33, FIG. 36, and FIG. 37 may have other display elements as long as the downloading of an application and the interruption of viewing or recording is notified and the CPU 514 is able to recognize that the user has selected the confirmation of the download notification.

Figure 38:
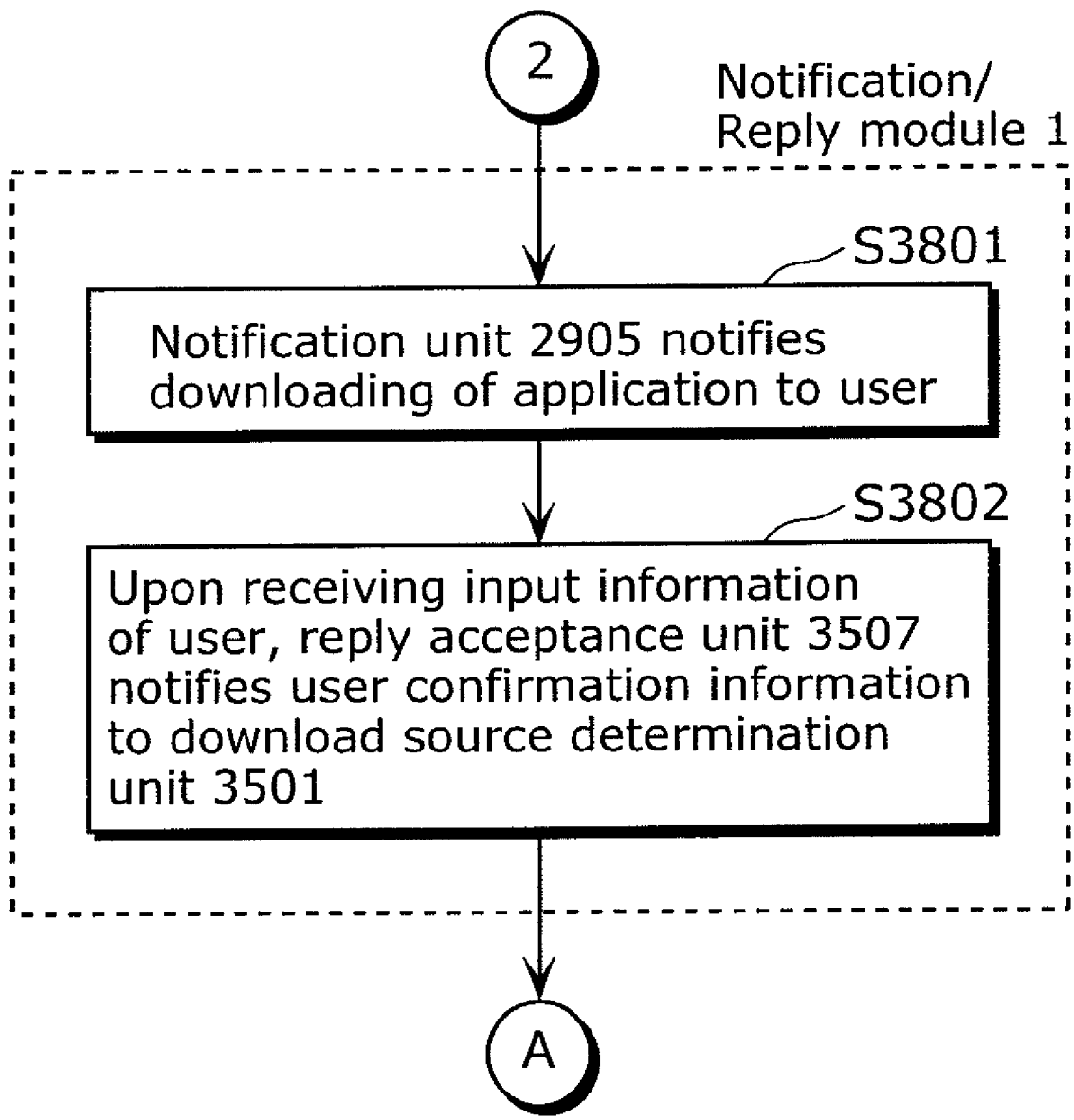
FIG. 38 is a part of FIG. 31 and is a flowchart showing an example of the operation of storing a specified application, in the second embodiment.

FIG. 38 is a flowchart showing an example of the application storing operation in the present embodiment in the case where only the user's approval is received as in FIG. 36.

Moreover, FIG. 38 shows a replacement for FIG. 32 which is a part of the flowchart in FIG. 31 shown in the first embodiment. Since the process in FIG. 31 is the same as in the first embodiment, description shall be omitted. When in the judgment as to whether or not all tuners are in use (S3005) in FIG. 31, all tuners are in use, with reference to FIG. 38, the download source determination unit 3501 instructs the notification unit 2905 to notify that an application will be downloaded and the current viewing or recording will be interrupted, and the notification unit notifies such message to the user according to the instruction from the download source determination unit 3501 (S3801). Subsequently, the download source determination unit 3501 instructs the reply acceptance unit 3507 to wait for the user's reply. Receiving such instruction, the reply acceptance unit 3507 waits for input information from the user and, upon accepting the input information, notifies user confirmation information to the download source determination unit 3501 (S3802). Note that, hereafter, the processing in S3801 and S3802 in FIG. 38, shall be referred to, as a notification/reply module 1, when an identical processing is performed. Receiving such notification, the download source determination unit 3501 instructs the tuning request unit 2906 to tune onto the frequency of the transport stream on which the application to be downloaded is flowing, and subsequently downloading of the application is performed by sending an application download and store request to the store unit 2904.

Figure 39:
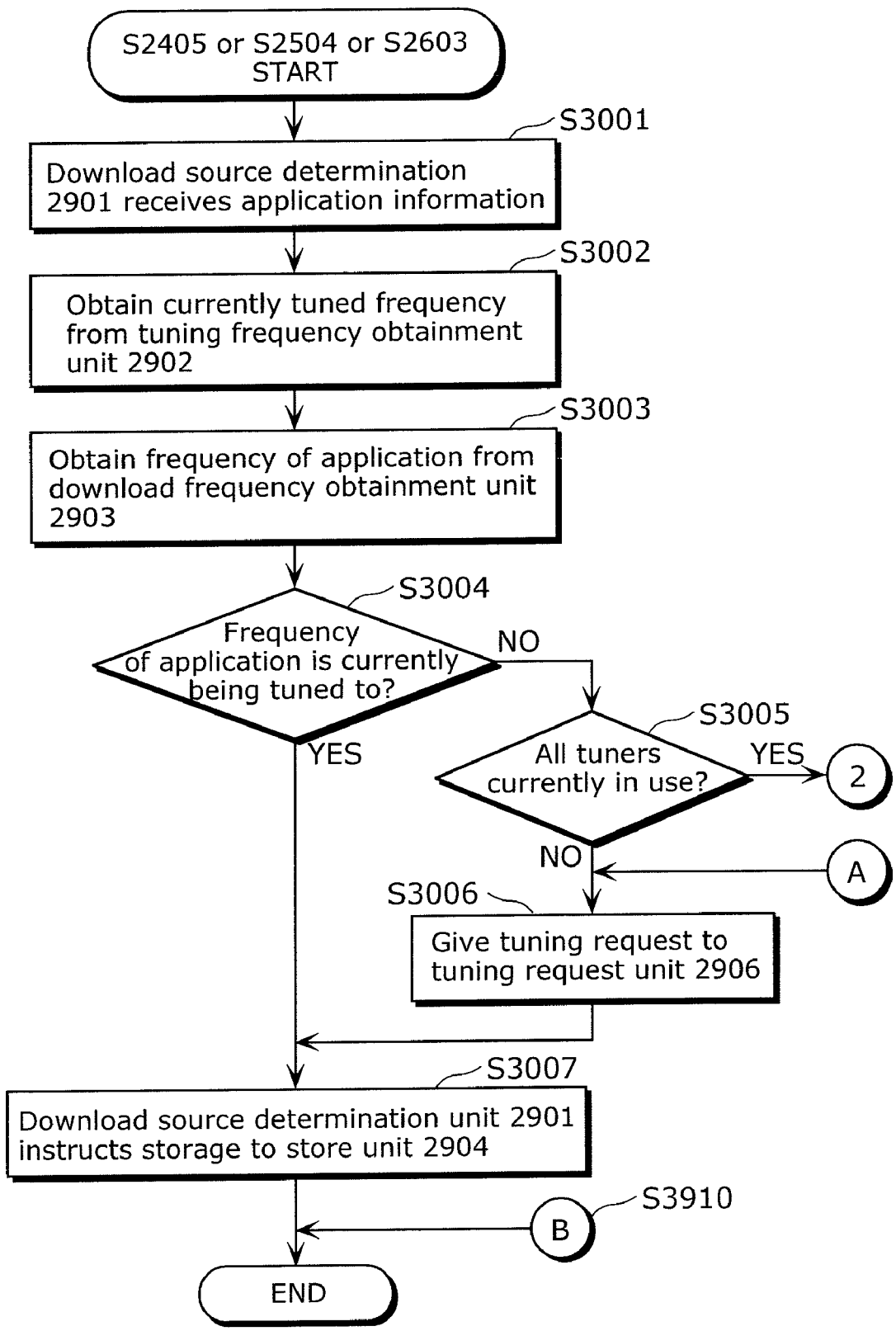
FIG. 39 is a flowchart showing an example of the operation of storing a specified application, in the second embodiment.
Figure 40:
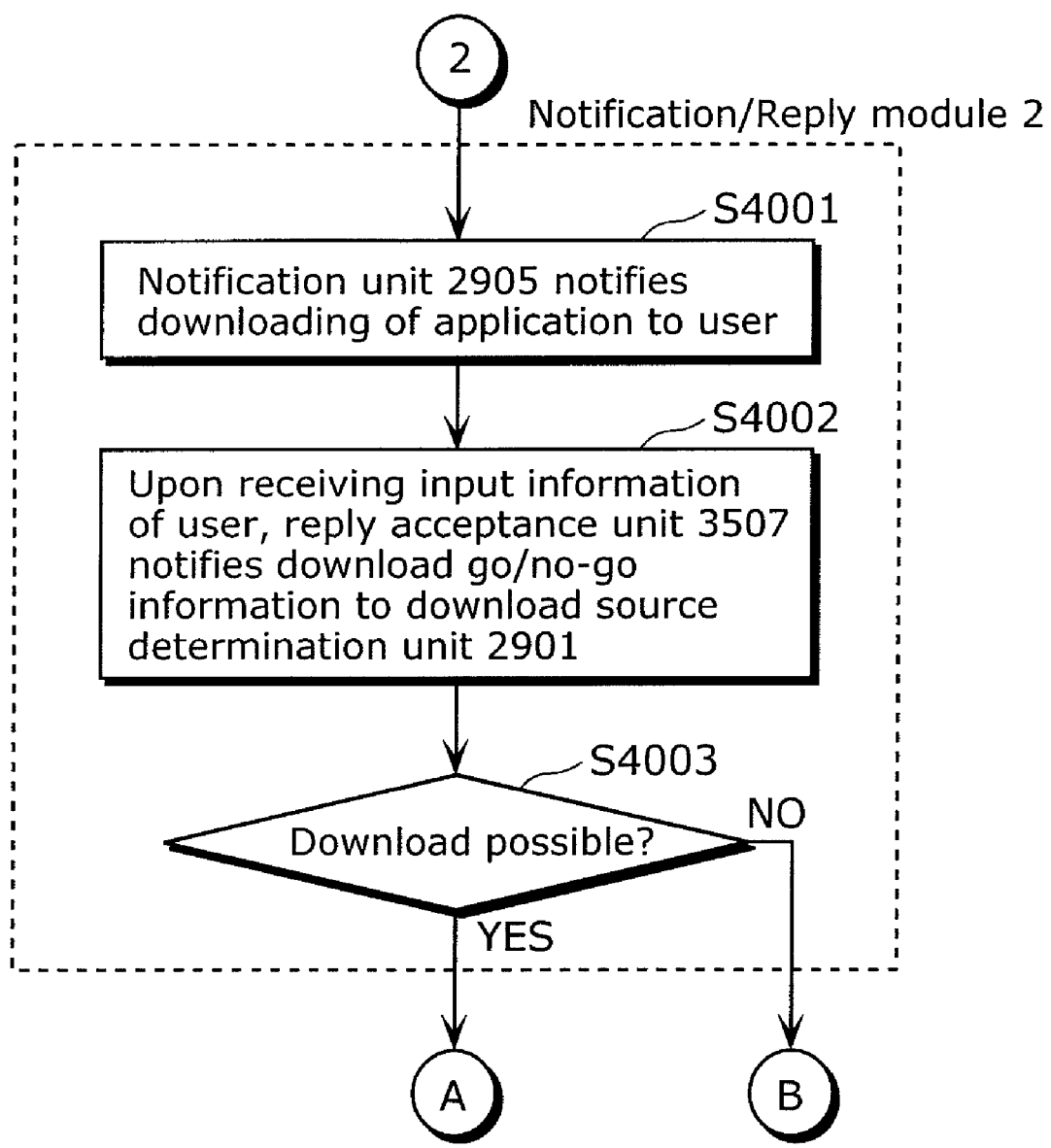
FIG. 40 is a part of FIG. 39 and is a flowchart showing an example of the operation of storing a specified application, in the second embodiment.

Next, FIG. 39 and FIG. 40 are flowcharts showing an example of the application storing operation in the case where the user's approval or rejection is received as in FIG. 37.

First, in addition to the steps in FIG. 31, FIG. 39 adds S3910 indicating a return of the process from FIG. 40, in order to respond to a rejection reply from the user. As such, since FIG. 39 shows the same process as FIG. 31, description shall be omitted. Consequently, when in the judgment as to whether or not all tuners are in use (S3005) in FIG. 39, all tuners are in use (YES in S3005), with reference to FIG. 40, the download source determination unit 3501 instructs the notification unit 2905 to notify that an application will be downloaded and the current viewing or recording will be interrupted, and the notification unit notifies such message (S4001). Subsequently, the download source determination unit 3501 instructs the reply acceptance unit 3507 to wait for the user's reply. Receiving such instruction, the reply acceptance unit 3507 waits for input information from the user and, upon accepting the input information, notifies user confirmation information to the download source determination unit 3501 (S4002). Receiving such notification, the download source determination unit 3501 takes into consideration whether the reply of the user is an allowance or a rejection (S4003). In the case of allowance (YES in S4003), download can be performed, and thus the process returns to a processing A in FIG. 39. In the case of rejection (NO in S4003), downloading cannot be performed, and thus the process returns to a processing B in FIG. 39. Returning to the processing A, the download source determination unit 3501 instructs the tuning request unit 2906 to tune onto the frequency of the transport stream on which the application to be downloaded is flowing, and subsequently downloading of the application is performed by sending an application download and store request to the store unit 2904. Furthermore, upon returning to the processing B, since downloading cannot be performed, the process is ended as such. Note that, hereafter, the processing in S4001 and S4003 in FIG. 40, shall be referred to, as a notification/reply module 2, when an identical processing is performed.

Note that it is also possible to have a course of action in which a time limit for waiting for a reply from the user is determined beforehand and, when there is no reply from the user even after the passing of the time limit, the reply acceptance unit 3507 awaiting the user's reply performs self-judgment.

In such manner, according to the second embodiment, by notifying the user of the interruption of the current viewing or recording by the user in the downloading of an application and receiving the reply of the user, it becomes possible for the user to know about the downloading and, at the same time, the user is also able to reject such downloading. With this, the viewing or recording by the user can be continued.

(Third Embodiment)

In the second embodiment, by accepting the reply from the user, the user is able to reject the downloading of the application. However, when rejection is performed, the user cannot know when the next downloading will occur. Furthermore, since an inquiry as to whether or not downloading will be performed is displayed every time the terminal apparatus receives an application download request, there is a possibility for the inquiry window to interrupt the viewing or recording by the user. Consequently, the present embodiment is characterized in including a timer setting unit (4108 in FIG. 41) so that, when the user rejects the downloading of the application, the user is able to set the time for performing downloading. In this manner, through the setting of the download time by the user, it is possible to set a time in which the user is not viewing or recording, and thus interruption of the viewing or recording by the user can be prevented.

Figure 41:
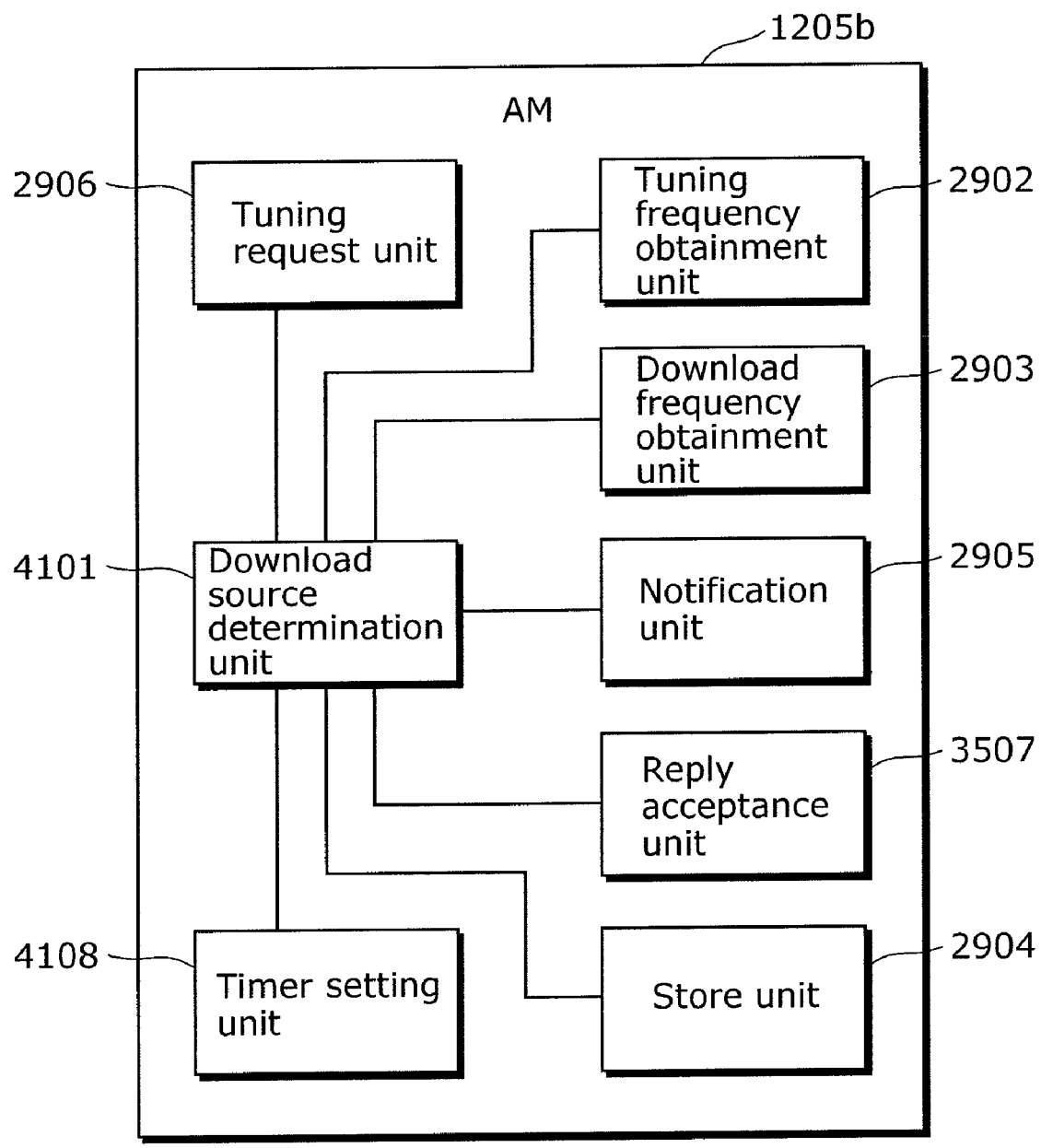
FIG. 41 is a diagram showing the configuration of the AM in the third embodiment.

With reference to FIG. 41, elements having the same reference number as in FIG. 30 or FIG. 35 have the same function in FIG. 30 and FIG. 35, and thus their description shall be omitted in the present embodiment.

A timer setting unit 4108 measures a set-time specified by a download source determination unit 4101. Then, after the set-time passes, notification of the passing of the set-time to the download source determination unit 4101 is performed.

In addition to the functions of the download source determination unit 3501, the download source determination unit 4101 instructs the notification unit 2905 for a notification message to the user regarding the timer setting. Upon receiving a result, the download source determination unit 4101 instructs the set-time to the timer setting unit 4108. Furthermore, the download source determination unit 4101 receives the timer setting unit 4108's notification of the passing of the set-time, and instructs the tuning to the tuning request unit 2906, and gives a store instruction to the store unit 2904. Moreover, upon receiving the notification of the passing of the set-time from the timer setting unit 4108, a message notification to the user may be performed again via the notification unit 2905. Further still, it is also possible to have a course of action in which a user's reply to the message displayed by the message notification unit 2905 is received from the reply acceptance unit, and processing is performed. Furthermore, although it is assumed here that the user is able to set the time, it is also possible that a default set-time is held in the download source determination unit 4101 and, when the user rejects downloading, the default set-time is instructed to the timer setting unit 4108 without making an inquiry to the user for a set-time.

Moreover, in the present embodiment, as in the first and second embodiments, the case where the selected application exists as at least one file system encoded in the DSMCC format is assumed. More specifically, the case is assumed in which OC is designated in the protocol identifier 2003 of the selected application, and at least one download source designation corresponding to the protocol identifier 2003 "OC" is stated in the download source designation 2005.

Figure 42:
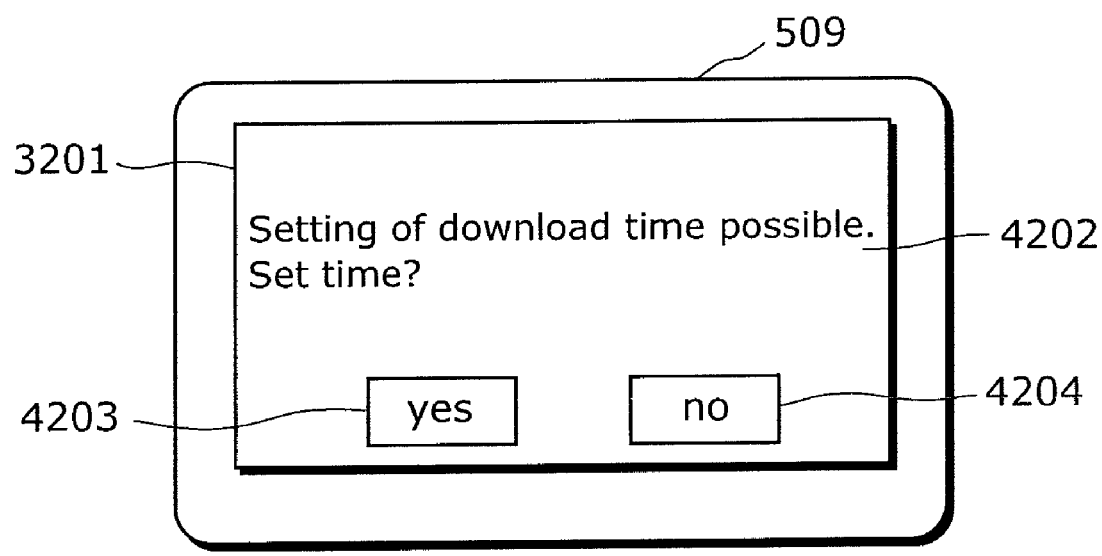
FIG. 42 is a diagram showing an example of the implementation of the download notification to the user by the notification unit, in the third embodiment.
Figure 43:
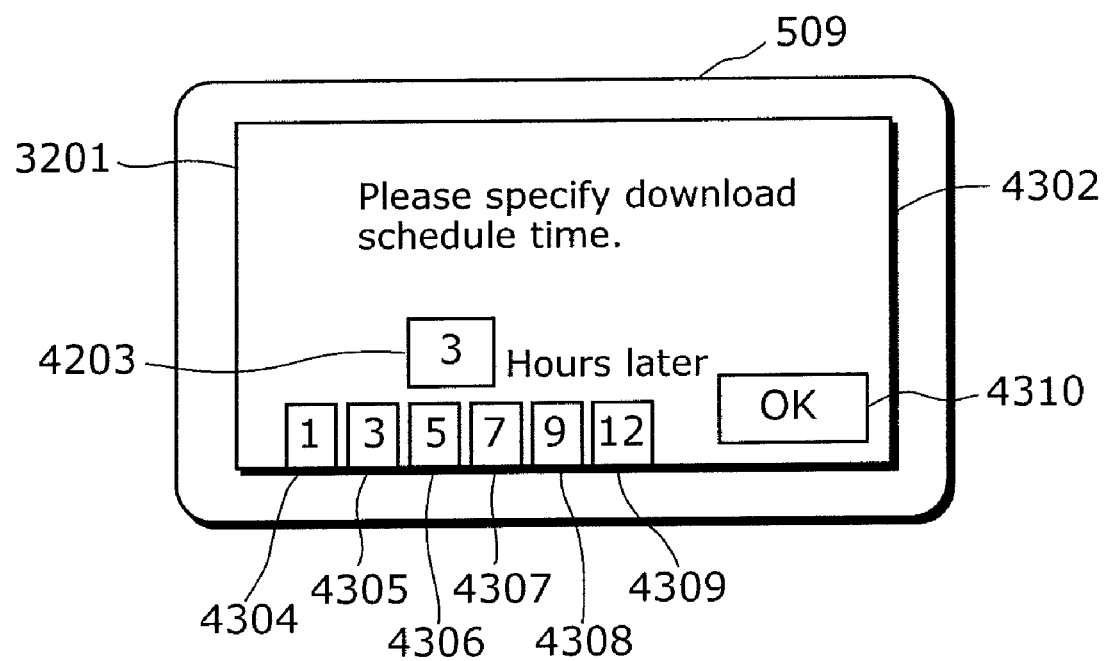
FIG. 43 is a diagram showing an example of the implementation of the download notification to the user by the notification unit, in the third embodiment.

FIG. 42 and FIG. 43 show an example of the screen-display displayed by the notification unit. In FIG. 42, the user is notified as to whether or not timer setting is to be performed, after the pressing down of the No-button 3704 in FIG. 37 shown in the second embodiment. For this reason, in FIG. 42, a message 4202 inquiring, to the user, whether or not to set the time for performing downloading, a Yes-button 4203, and a No-button 4204 are included. Note that, here, since it is sufficient to at least be able to notify that the time for performing downloading can be set, it is not necessary to limit the format to that in FIG. 42. Furthermore, the message that the time for performing downloading can be set, shown in FIG. 42, may also be omitted.

Next, FIG. 43 shows an example of a screen-display to the user, prompting the specification of a set-time for the downloading. For this reason, FIG. 43 includes: a message 4302, to the user, prompting the setting of a download time; buttons 4304 to 4309 for specifying the set-time; and an OK button 4310 which notifies input completion. Furthermore, the message-details to be notified to the user are not limited to that in 4302, as long as it is a message, to the user, prompting the setting of the downloading time. Moreover, although time specification is performed here by selecting the buttons 4304 to 4309, it is also possible to directly input numbers from a remote control, and the inputting format may be of any method, as long as the time specified by the user can be recognized. Furthermore, it is also possible to add a process to detect whether or not there is an error in the input, and prompt a re-input from the user. Further still, although FIG. 43 only shows an hour-specification, the details of the set-time such as the date, hours, minutes, need not be limited to the screen-display displayed by the notification unit shown as an example here in FIG. 43, as long as the timing for downloading which is specified by the user can be recognized. Furthermore, for FIG. 42 and FIG. 43, the message need not be a text display, and may be presented using other representations. In addition, the character strings within the respective buttons in FIG. 42 and FIG. 43 are not limited to such details. In other words, as long as the user is able to specify the set-time for the downloading, other representations are possible in FIG. 43.

Figure 44:
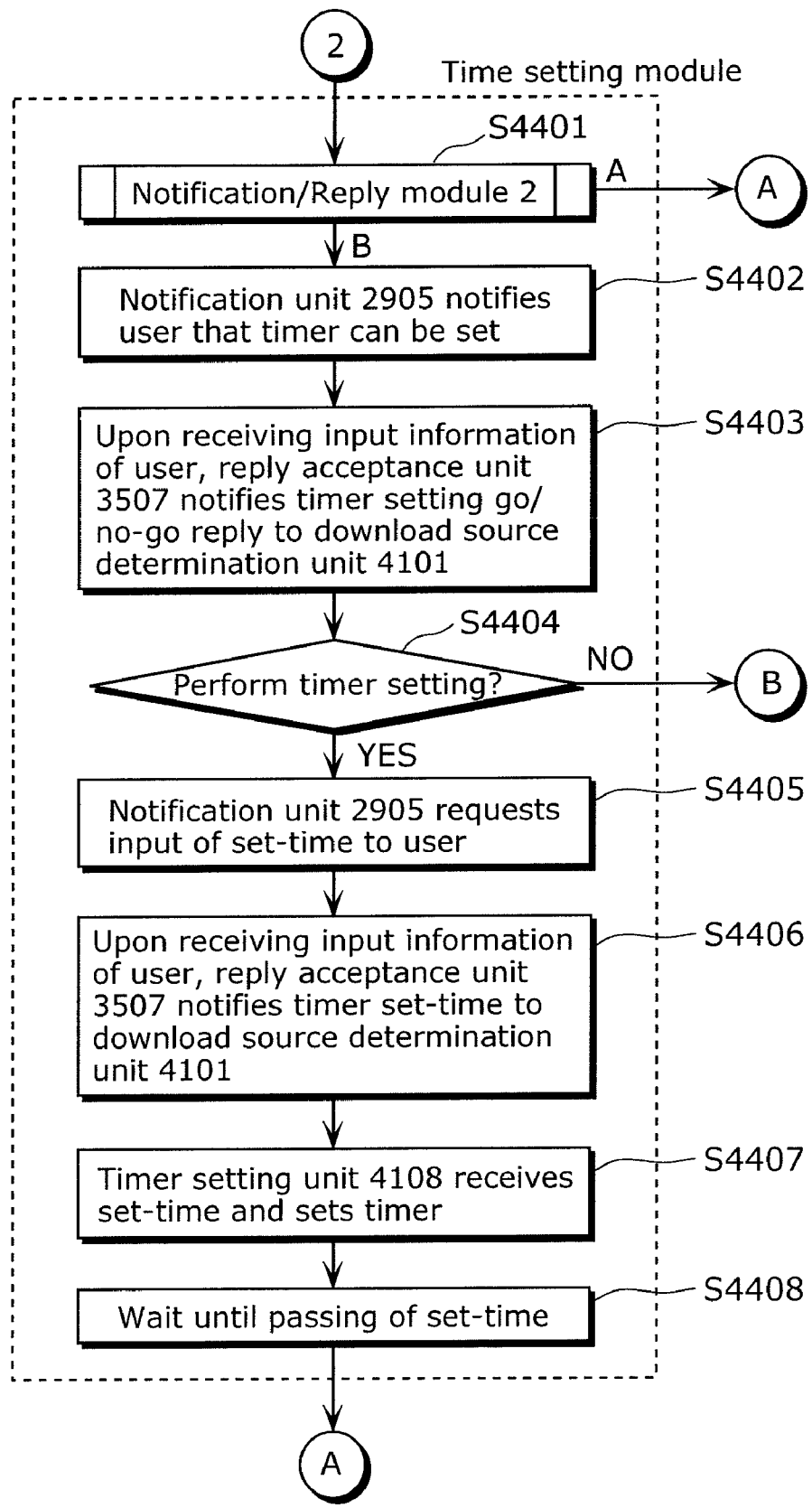
FIG. 44 is a part of FIG. 39 and is a flowchart showing an example of the operation of storing a specified application, in the third embodiment.

FIG. 44 is a flowchart showing an example of the operation for the setting of the downloading set-time by the user in the present embodiment. Note that FIG. 44 shows a replacement for FIG. 40 which is a part of the flowchart in FIG. 39 shown in the second embodiment. Since the process in FIG. 39 is the same as in the second embodiment, description shall be omitted. When in the judgment as to whether or not all the tuners are in use (S3005) in FIG. 39, all of the tuners are in use, with reference to FIG. 44, the processes in the notification/reply module 2 is performed, and an inquiry to the user as to whether or not downloading is to be performed is carried out (S4401). When the result is A, downloading is performed since downloading is approved by the user (description is omitted here as details have been discussed previously). On the other hand, when the result is B, the user rejects the downloading and so the download source determination unit 4101 instructs the notification unit 2905 to notify that the time for downloading the application can be set, and the notification unit 2905 notifies such message (S4402).

Subsequently, the download source determination unit 4101 instructs the reply acceptance unit 3507 to wait for the user's reply. Receiving such instruction, the reply acceptance unit 3507 waits for input information from the user and, upon accepting the input information, notifies user's time setting yes/no reply to the download source determination unit 4101 (S4403). The download source determination unit 4101 judges whether or not to perform timer setting, according to this notification (S4404). When timer setting is not to be performed (NO in S4404), the process returns to B in FIG. 39 and the process is ended. On the other hand, when the timer setting is to be performed (YES in S4404), the download source determination unit 4101 instructs the notification unit 2905 to notify a message for the inputting of the set-time for downloading the application, and the notification unit 2905 notifies such message to the user (S4405). Subsequently, the download source determination unit 4101 instructs the reply acceptance unit 3507 to wait for the user's reply. Receiving such instruction, the reply acceptance unit 3507 waits for input information from the user and, upon accepting the input information, notifies user's timer set-time to the download source determination unit 4101 (S4406). Then, the download source determination unit 4101 notifies the set-time to the timer setting unit 4108, and the timer setting unit 4108 sets the received time (S4407). The timer setting unit 4108 waits until the set-time passes (S4408). When the time passes, the process returns to A in FIG. 39, and downloading is performed. At this time, it is possible to return to the processing in S 4401 in order to once again inquire whether or not downloading is to be performed. Note that in the case of omitting the process of inquiring, to the user, whether or not the downloading set-time is to be set as shown in FIG. 42, this can be executed by omitting S4402, S4404, and S4403 in FIG. 44.

In this manner, according to the third embodiment, when the user rejects the downloading of an application, a set-time for downloading can be specified.

(Fourth Embodiment)

In the third embodiment, the reply from the user is accepted and, when the user rejects the downloading of the application, it was possible for the user to specify a set-time for which downloading was possible.

Figure 45:
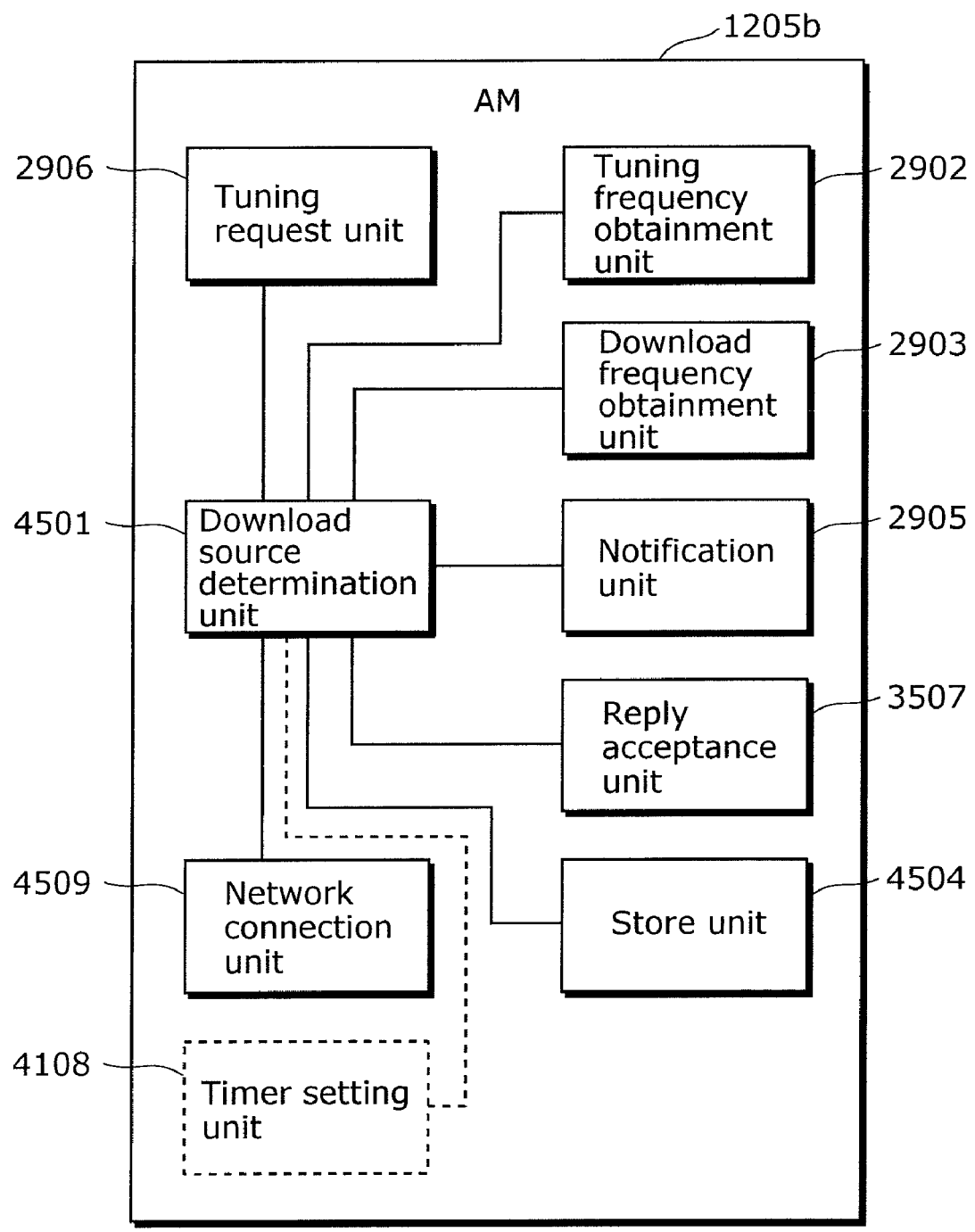
FIG. 45 is a diagram showing the configuration of the AM in the fourth embodiment.

With reference to FIG. 45, elements having the same reference number as in FIG. 30 or FIG. 35 have the same function in FIG. 30 and FIG. 35, and thus their description shall be omitted in the present embodiment. Moreover, in the present embodiment, the case where the selected application exists as a file system encoded in the DSMCC format, and also exists in the server providing the downloading of a program, is assumed. More specifically, the case is assumed in which both OC and IP are designated in the protocol identifier 2003 of the selected application, and at least one download source designation corresponding to the protocol identifier 2003 "OC" as well as at least one download source designation corresponding to the protocol identifier 2003 "IP" is stated in the download source designation 2005.

A download source determination unit 4501 has, in addition to the functions of the download source determination unit 3501, a function for inquiring, to a network connection unit 4509, whether or not a network connection can be used, and receiving the reply. Furthermore, the download source determination unit 4501 sets, to the network connection unit 4509, a download source designation 2005 which designates the connection destination of the network, receives the downloaded application, and sends a store request to a store unit 4504. Moreover, although the function of having a function for inquiring, to a network connection unit 4509, whether or not a network connection can be used, and receiving the reply is considered in order to prevent the occurrence of an error when downloading is performed, it is not necessarily a required function.

In response to the inquiry as to whether or not the network connection can be used, from the download source determination unit 4501, the network connection unit 4509 checks whether or not the network connection can be used at present, and notifies the download source determination unit 4501. Furthermore, upon receiving the download source designation 2005 designating the connection destination of the network, from the download source determination unit 4501, the network connection unit 4509 connects to the designated server and downloads a file. Then, the network connection unit 4509 passes the downloaded application to the download source determination unit 4501. Alternatively, the downloaded application may be passed directly to the store unit 4504.

The store unit 4504 has a function for storing an application specified by the download source determination unit 4501 or the network connection unit 4509.

Figure 46:
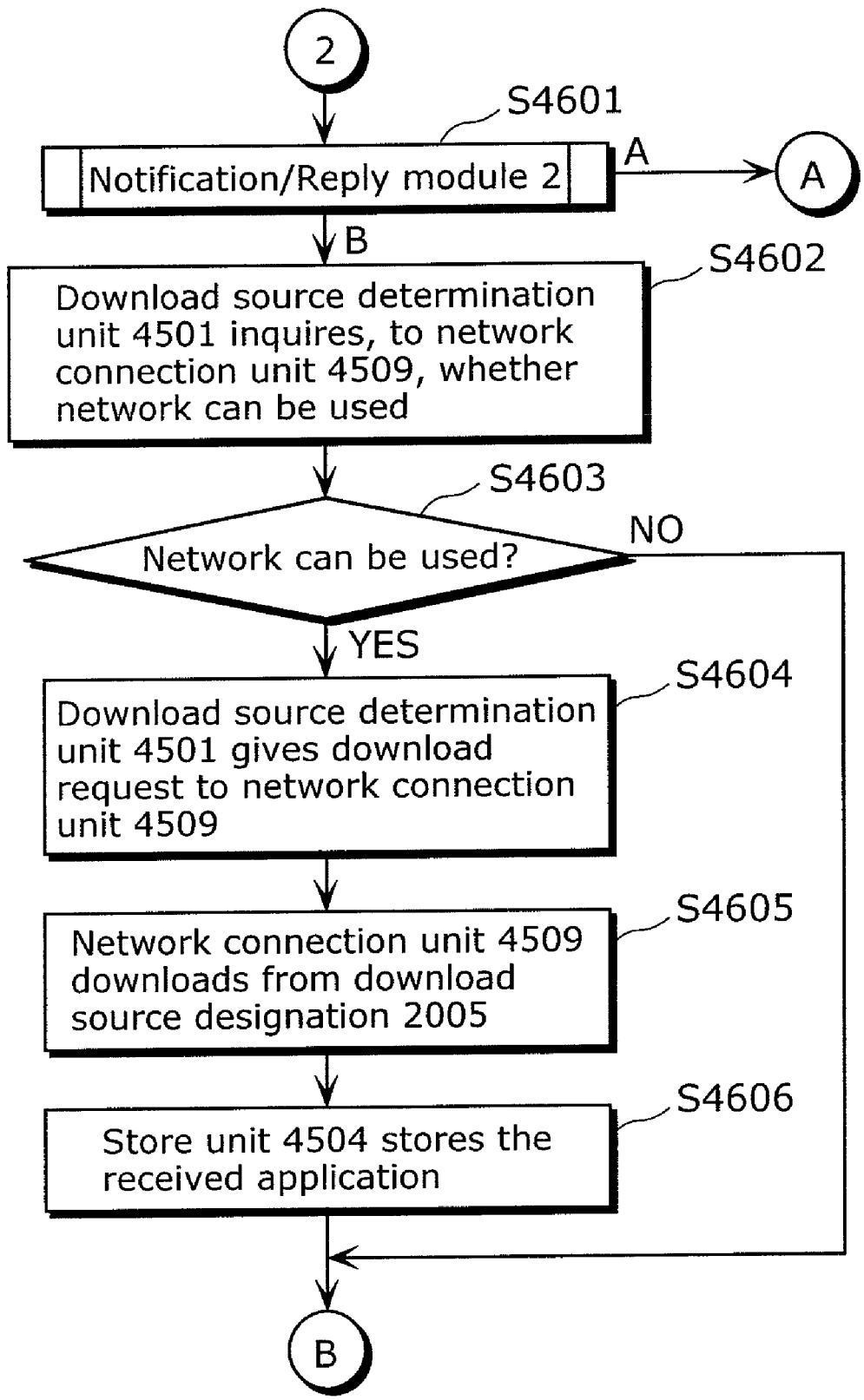
FIG. 46 is a part of FIG. 39 and is a flowchart showing an example of the operation of storing a specified application, in the fourth embodiment.

FIG. 46 is a flowchart showing an example of the operation for downloading an application from the network in the present embodiment. Note that FIG. 46 shows a replacement for FIG. 40 which is a part of the flowchart in FIG. 39 shown in the second embodiment. Since the process in FIG. 39 is the same as in the second embodiment, description shall be omitted. When in the judgment as to whether or not all the tuners are in use (S3005) in FIG. 39, all of the tuners are in use, with reference to FIG. 46, the processes in the notification/reply module 2 is performed (S4601), and an inquiry to the user as to whether or not downloading is to be performed is carried out (S4602). When the result is A, downloading is performed since downloading is approved by the user (description is omitted here as details have been discussed previously). On the other hand, when the result is B, since the user has rejected the downloading, the download source determination unit 4501 inquires, to the network connection unit 4509, whether or not the network connection can be used (S4602). Taking into consideration the judgment as to whether or not the network can be used (S4603) received from the network connection unit 4509, the download source determination unit 4501 stops the process when use is not possible (NO in S4603). Alternatively, it is also possible to notify the user that the network cannot be used. Alternatively, it is also possible to allow the process to move to S4402 in FIG. 44 in the third embodiment so as to enable the setting of the download timer at the time when viewing or recording by the viewer ends. On the other hand, when the network can be used (YES in S4603), the download source determination unit 4501 passes a download source designation 2005 to the network connection unit 4509, and gives an instruction for the download request (S4604). Then, receiving such instruction, the network connection unit 4509 performs the downloading of the application from the download source designation 2005. Then, the network connection unit 4509 passes the downloaded application to the download source determination unit 4501. The download source determination unit 4501 instructs the storing of the application to the store unit 4504. The store unit 4504 stores the received application (S4606). Note that the network connection unit 4509 may pass the downloaded application directly to the store unit 4504.

Figure 47:
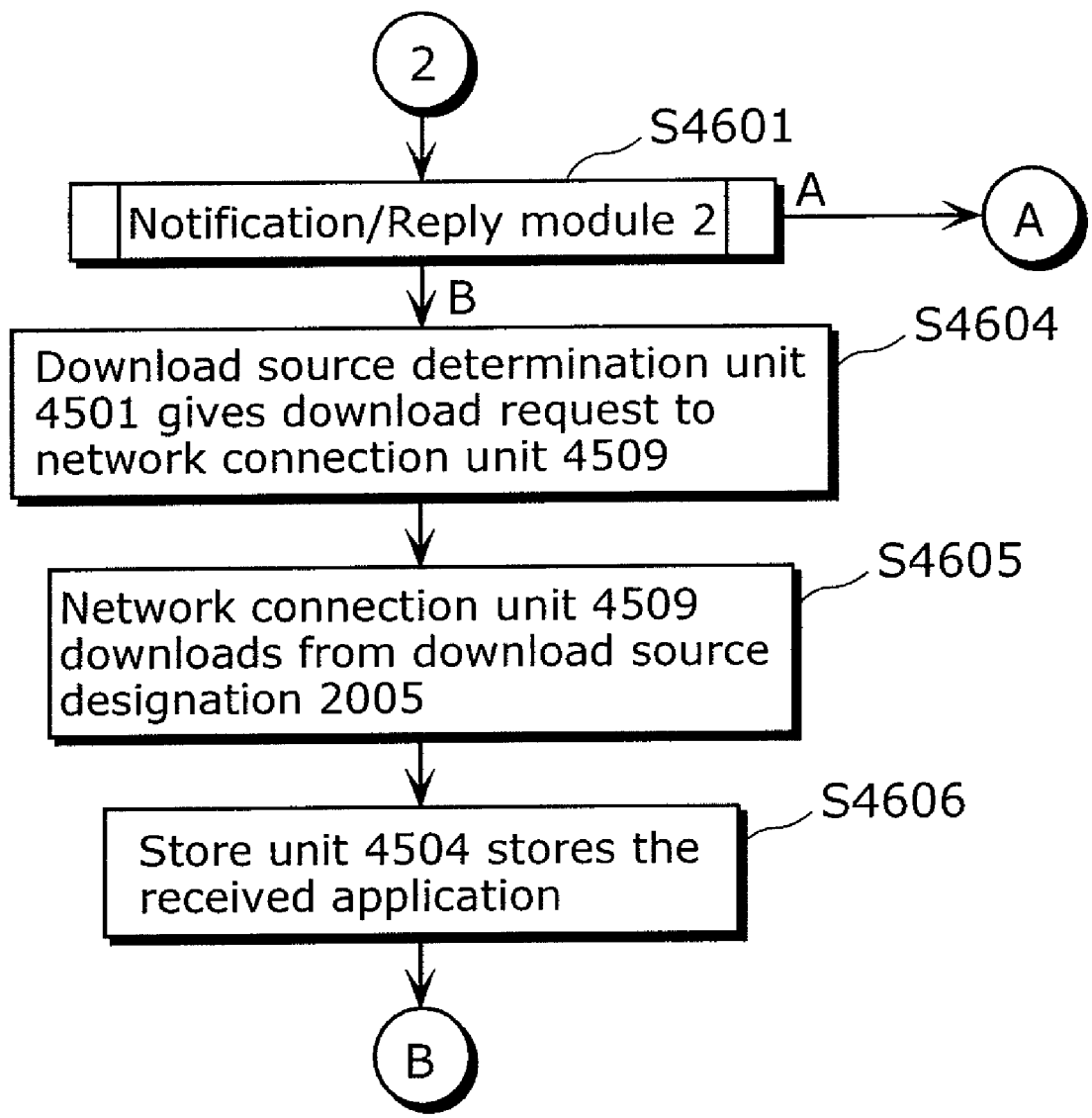
FIG. 47 is a part of FIG. 39 and is a flowchart showing an example of the operation of storing a specified application, in the fourth embodiment.

Moreover, since the processing in S4602 and S4603 of inquiring beforehand whether or not the network can be used is not necessarily a required process, it is also possible not to perform the processing in S4602 and S4603 as in FIG. 47.

In such manner, according to the fourth embodiment, when the user rejects the tuning necessary for downloading from a file system encoded in the DSMCC format, downloading from a network can be performed.

(Fifth Embodiment)

In the fourth embodiment, downloading from the network is possible when the user rejects the downloading of the application. In the present embodiment, the user is able to select the downloading method. Moreover, in the present embodiment, the case where the selected application exists as a file system encoded in the DSMCC format, and also exists in the server providing the downloading of a program, as in the fourth embodiment, is assumed. More specifically, the case is assumed in which both OC and IP are designated in the protocol identifier 2003 of the selected application, and at least one download source designation corresponding to the protocol identifier 2003 "OC" as well as at least one download source designation corresponding to the protocol identifier 2003 "IP" is stated in the download source designation 2005.

As constituent elements in the present embodiment, in addition to the download source determination unit 4501 in FIG. 45, the download source determination unit 4501 instructs the notification unit 2905 to notify a message which prompts the selection between a network and a tuner to the user, as a downloading method, and instructs the reply acceptance unit 3507 to receive a reply to the message. Then, following the downloading method selected by the user which is notified from the reply acceptance unit 3506, the download source determination unit 4501 carries out the setting to perform the downloading. More specifically, when the tuner is selected, the same function is applied as in the first to third embodiments up to this point; when the network is selected, downloading from the network is performed. Note that although the network and tuner are described here as examples for the downloading method notified to the user, the method need not be limited to these as long as it is a method through which the downloading of a program or the obtainment of a program is possible. Furthermore, the downloading method to be notified to the user may be part or all of the protocol identifier 2003.

Figure 48:
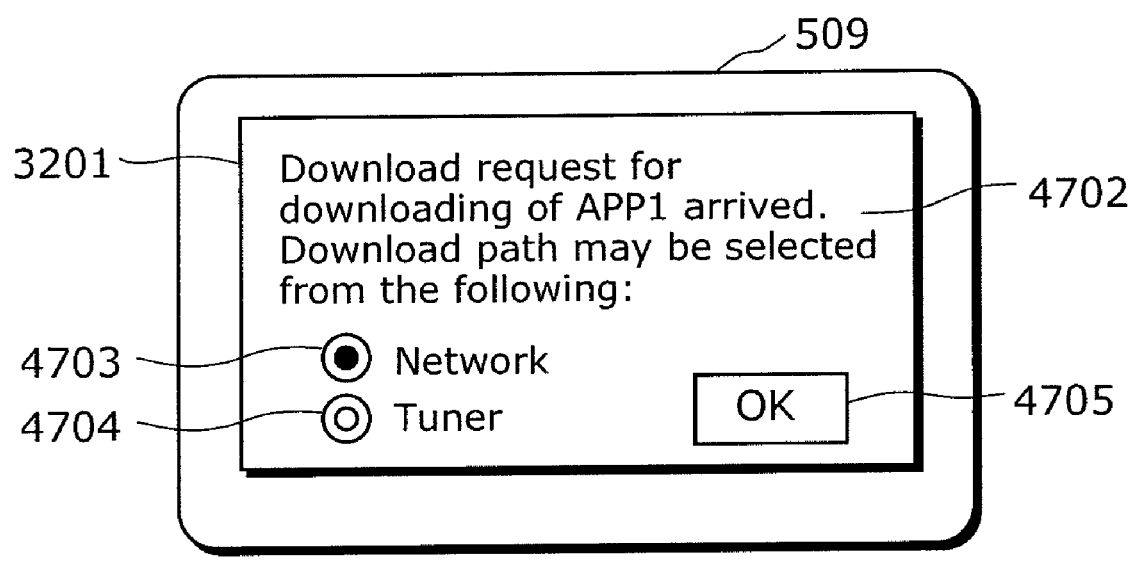
FIG. 48 is a diagram showing an example of the implementation of the download notification to the user by the notification unit, in the fifth embodiment.

FIG. 48 shows an example of the screen-display displayed by the notification unit. FIG. 4802 includes a message 4702, to the user, prompting the selection of the downloading method, buttons (4703 and 4704) for selecting between the network and the tuner, and a button 4705 for notifying the completion of the selection by the user. Note that, at this time, the details of the message to the user, the format and display details of the buttons need not be as those in the format in FIG. 48. In other words, as long as the user is able to specify the download source, other representations are possible in FIG. 48.

Figure 49:
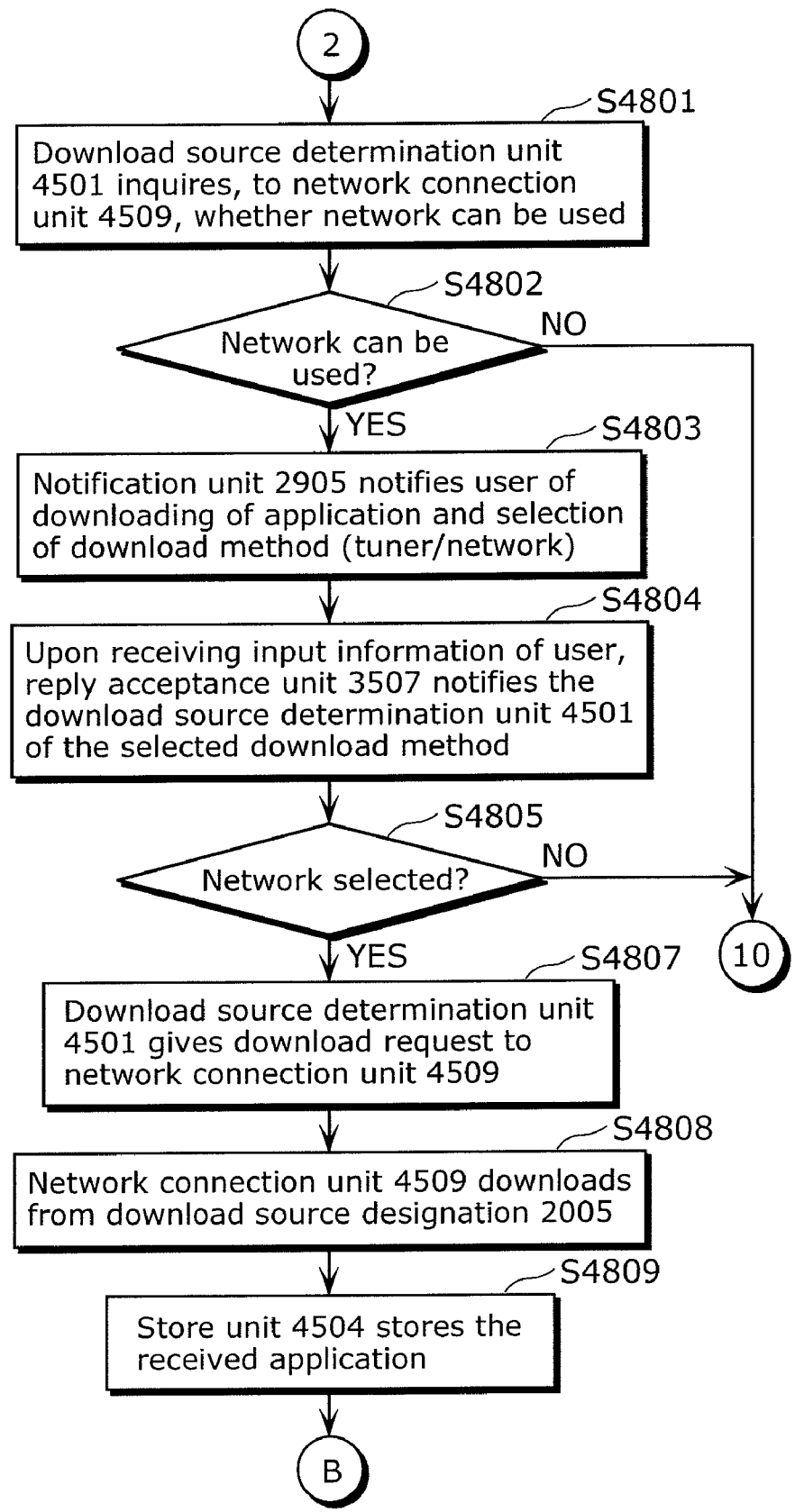
FIG. 49 is a part of FIG. 39 and is a flowchart showing an example of the operation of storing a specified application, in the fifth embodiment.
Figure 50:
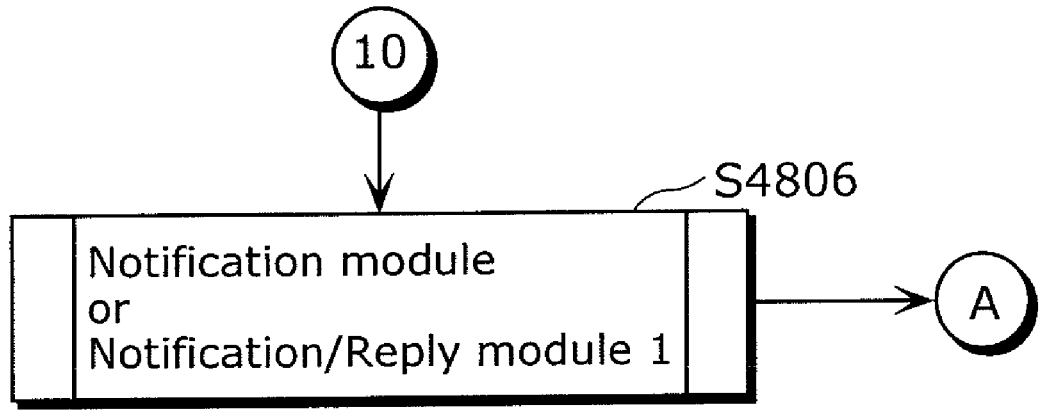
FIG. 50 is a part of FIG. 49 and is a flowchart showing an example of the operation of storing a specified application, in the fifth embodiment.

FIG. 49 is a flowchart showing an example of the operation for the setting of the download source by the user in the present embodiment. Note that, here, the case is shown where the selection of the download source is prompted to the user, after the No-button 3704 in FIG. 37 shown in the second embodiment. As such, FIG. 49 shows a replacement for FIG. 40 which is a part of the flowchart in FIG. 39 shown in the second embodiment. Since the process in FIG. 39 is the same as in the second embodiment, description shall be omitted. When in the judgment as to whether or not all the tuners are in use (S3005) in FIG. 39, all of the tuners are in use, with reference to FIG. 49, the download source determination unit 4501 inquires whether or not the network can be used, to the network connection unit 4509(S4801). Taking into consideration the judgment as to whether or not the network can be used (S4802) received from the network connection unit 4509, the download source determination unit 4501 performs the notification module or the notification/reply module 1 shown in FIG. 50, or the notification/reply module 2 or the time setting module shown in FIG. 51 when use is not possible (NO in S4802), and performs downloading with the use of a tuner (S4806 in FIG. 50 or S4806 in FIG. 51).

On the other hand, when the network can be used (YES in S4802), the download source determination unit 4501 instructs the notification unit 2905 to notify that it is possible to select the application downloading method, and the notification unit 2905 notifies such message (S4803). Subsequently, the download source determination unit 4501 instructs the reply acceptance unit 3507 to wait for the user's reply. Receiving such instruction, the reply acceptance unit 3507 waits for input information from the user and, upon accepting the input information, notifies the selected downloading method to the download source determination unit 4501 (S4804). The download source determination unit 4501 judges whether or not the received downloading method is the network (S4805) and, when the user has selected downloading from the network (NO in S4805), executes any of the notification module or the notification/reply module 1 shown in FIG. 50, or the notification/reply module 2 or the time setting module shown in FIG. 51, and performs downloading with the use of a tuner (S4806 in FIG. 50 or S4806 in FIG. 51). On the other hand, when the network is selected (YES in S4805), the download source determination unit 4501 passes a download source designation 2005 to the network connection unit 4509, and gives an instruction for the download request (S4807). Then, receiving such instruction, the network connection unit 4509 performs the downloading of the application from the download source designation 2005 (S4808). Then, the network connection unit 4509 passes the downloaded application to the download source determination unit 4501. The download source determination unit 4501 instructs the storing of the application to the store unit 4504. The store unit 4504 stores the received application (S4806). Note that the network connection unit 4509 may pass the downloaded application directly to the store unit 4504.

Note that, when notifying the downloading method to the user, it is also possible to present a forecast time or download speed for when the program is downloaded using the network, and for when downloading from a file system encoded in the DSMCC format. Furthermore, in the case where the tuner is used, it is also possible to notify that the current viewing or recording will be interrupted.

Note that although a method is shown here in which the user can select whether to download from the network or to download from the tuner, when all the tuners are in use, it is also possible to assume a method in which the user can select the download source regardless of whether or not all the tuners are in use. More specifically, although processing has been performed with FIG. 49 as a part of FIG. 39, it is also possible to assume a method in which the process is started from S4801 in FIG. 49 and, instead of proceeding to processing 10, the process in FIG. 39 is started.

By using the present embodiment, it becomes possible for the user to select the downloading method.

(Sixth Embodiment)

In the fifth embodiment, the user is able to select the downloading method for the application. The present embodiment describes a method in which downloading from the network is preferentially processed when the user rejects the downloading from the tuner. Moreover, in the present embodiment, the case where the selected application exists as a file system encoded in the DSMCC format, and also exists in the server providing the downloading of a program, as in the fourth and fifth embodiment, is assumed. More specifically, the case is assumed in which both OC and IP are designated in the protocol identifier 2003 of the selected application, and at least one download source designation corresponding to the protocol identifier 2003 "OC" as well as at least one download source designation corresponding to the protocol identifier 2003 "IP" is stated in the download source designation 2005.

Figure 52:
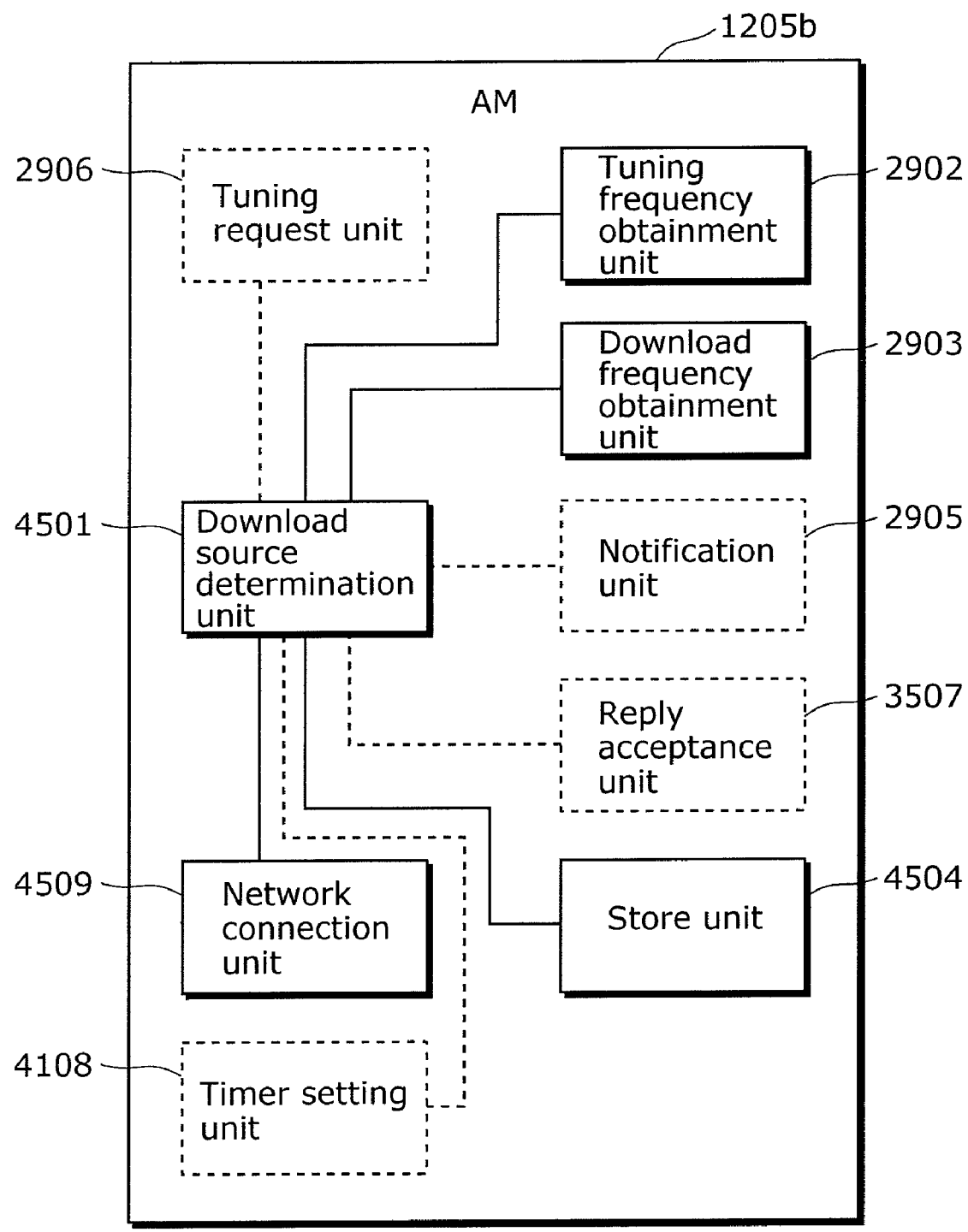
FIG. 52 is a diagram showing the configuration of the AM in the fifth embodiment.

FIG. 52 shows the constituent elements in the present embodiment. Note that since the notification unit 2905, the reply acceptance unit 3507, and the tuning request unit 2906 are not mandatory elements in the present embodiment, they are shown with dotted lines. Furthermore, since it is possible to apply the constituent elements in the embodiments described thus far, description of the respective elements in FIG. 52 shall be omitted.

Figure 53:
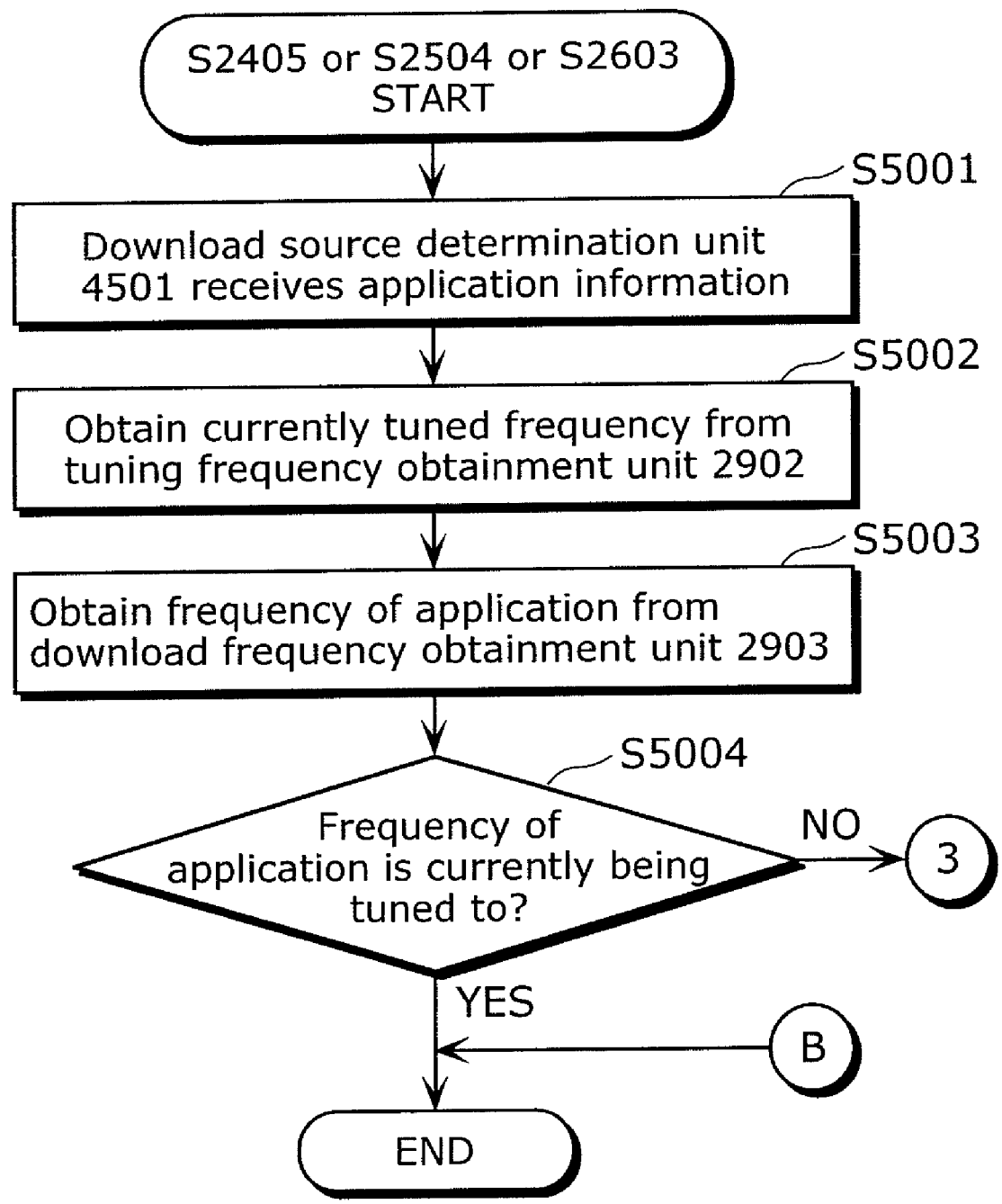
FIG. 53 is a flowchart showing an example of the operation of storing a specified application, in the sixth embodiment.
Figure 54:
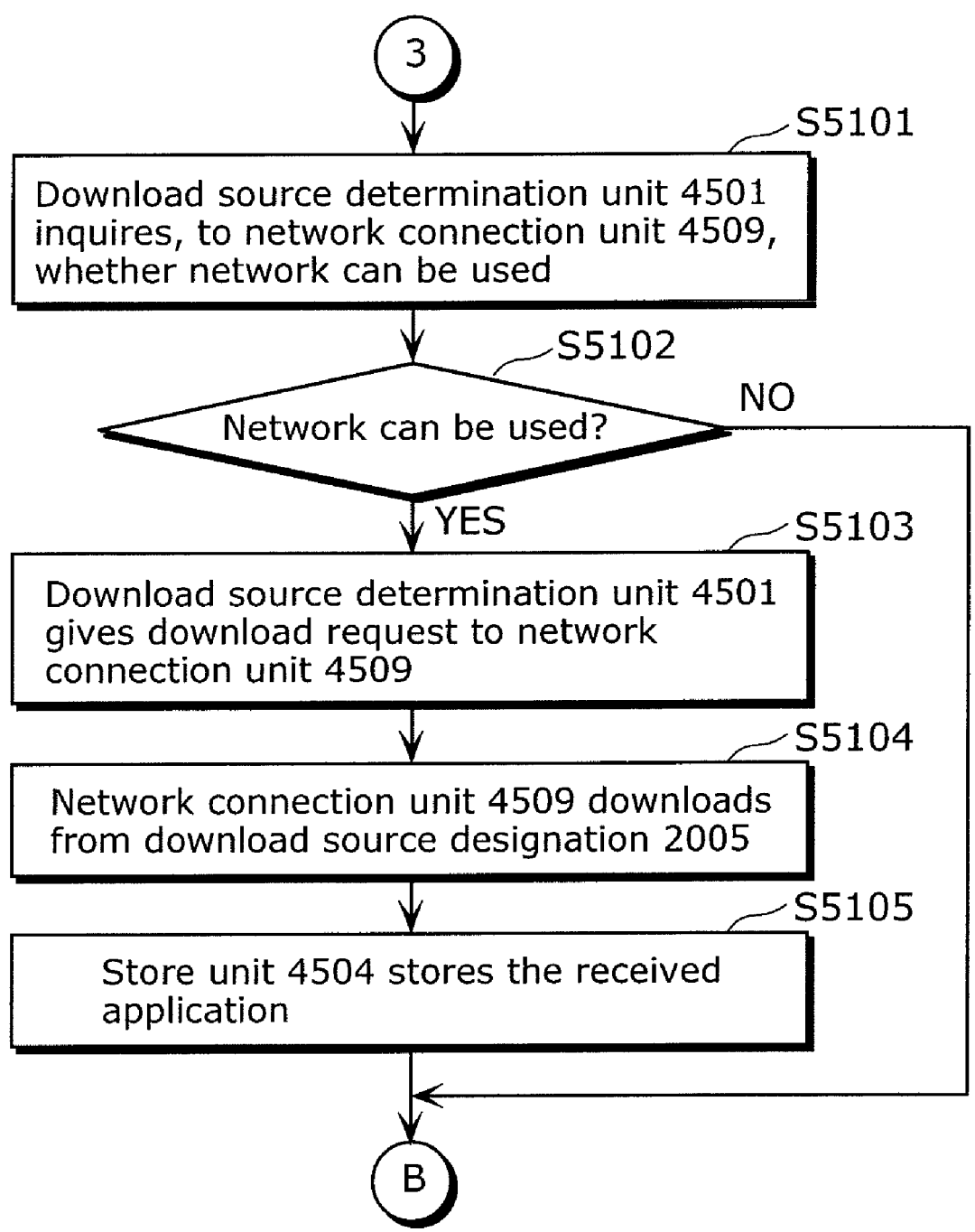
FIG. 54 is a part of FIG. 53 and is a flowchart showing an example of the operation of storing a specified application, in the sixth embodiment.
Figure 55:
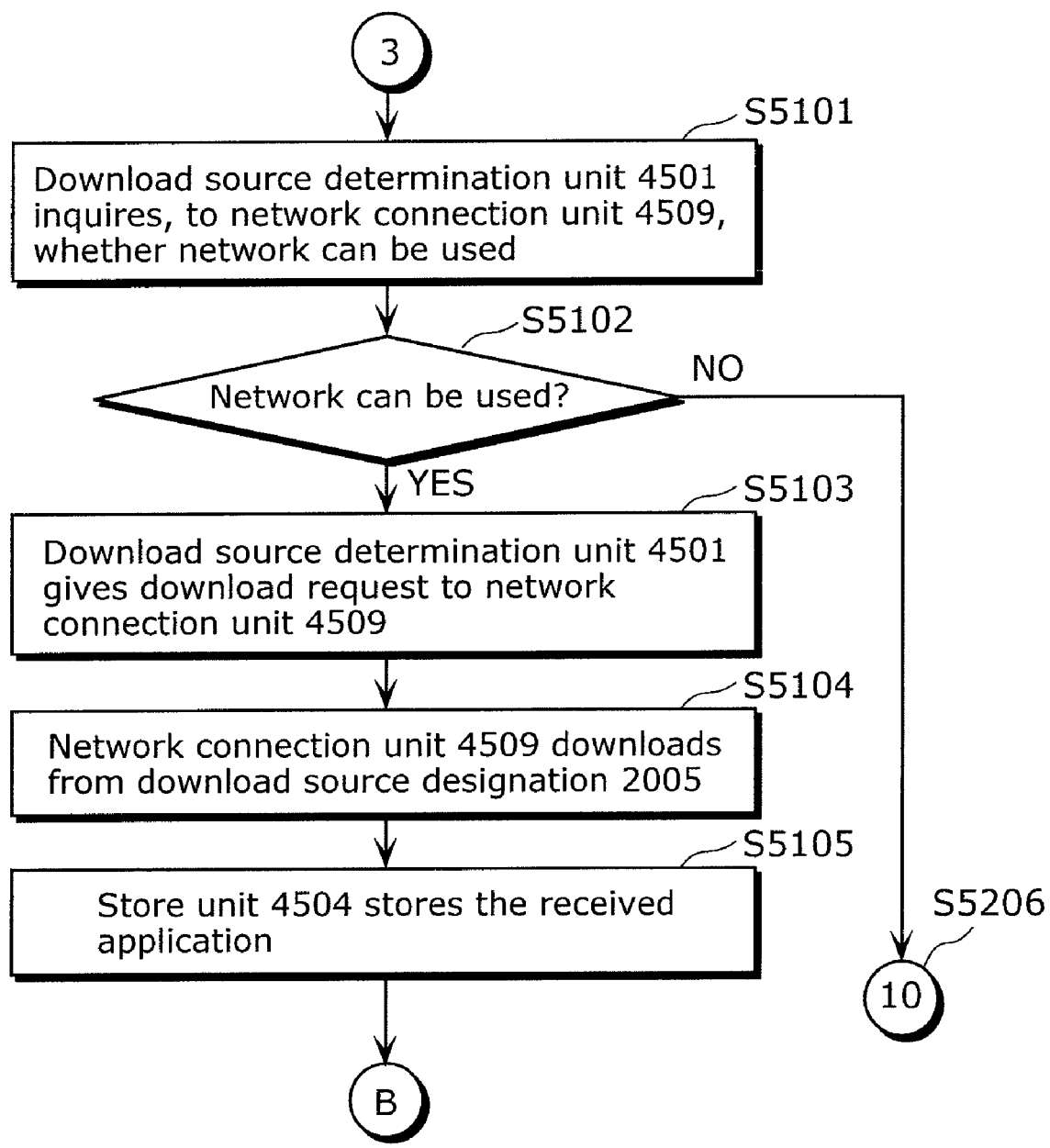
FIG. 55 is a part of FIG. 53 and is a flowchart showing an example of the operation of storing a specified application, in the sixth embodiment.

FIG. 53 and FIG. 54 are flowcharts showing an example of the operation in which downloading from the network is preferentially processed when the user rejects the downloading from the tuner. With reference to FIG. 53, the description of S5001 to S5004 shall be omitted as they are the same processes as in FIG. 31 and FIG. 39. Consequently, when the frequency of the application in S5004 is not currently tuned to (NO in S5004), with reference to FIG. 54, the download source determination unit 4501 inquires whether or not the network can be used, to the network connection unit 4509 (S5101). Receiving the result, the download source determination unit 4501 returns to the processing B in FIG. 53 and ends the process when, based on the judgment as to whether or not the network can be used (S5102), the network cannot be used (NO in S5102). On the other hand, when the network can be used (YES in S5102), the processing in S5103 to S5105 are performed. Here, since the processing in S5103 to S51051 are the same as in S4604 to S4606 in FIG. 46, their description shall be omitted. Note that although here description is made regarding a method which immediately downloads from the network, when the result of the judgment as to whether the frequency of the current application is being tuned to (S5004) is NO in FIG. 53, it is also possible here to have a setting where it is judged whether or not all the tuners are in use, and the process proceeds to the processing in FIG. 54 only when all the tuners are in use. Further still, it is described that the downloading is terminated when the network cannot be used in the judgment in S5102. As such, when the network cannot be used, it is also possible, when necessary, to add the notification unit 2905, the reply acceptance unit 3507, and the tuning request unit 2906 of FIG. 52, and execute any of the notification module or the notification/reply module 1 shown in FIG. 50, or the notification/reply module 2 or the time setting module shown in FIG. 51 as in S5206 in FIG. 55, and perform downloading with the use of a tuner (S4806 in FIG. 50 or S4806 in FIG. 51). By using the present embodiment, it becomes possible to preferentially process downloading from the network, when a tuner is needed.

(Seventh Embodiment)

The sixth embodiment describes a method in which the tuning for the on-going viewing or recording by the user is taken into consideration, and downloading is performed from the network when tuning is necessary. In the present embodiment, a method of downloading from the network at all times when there is an IP designation in the protocol identifier 2003, without considering the current tuning information and the frequency of the application to be downloaded. As such, the present embodiment assumes the case where the selected application exists in the server providing the downloading of a program. More specifically, the case is assumed in which IP is designated in the protocol identifier 2003 of the selected application, and at least one download source designation corresponding to the protocol identifier 2003 "IP" is stated in the download source designation 2005.

Figure 56:
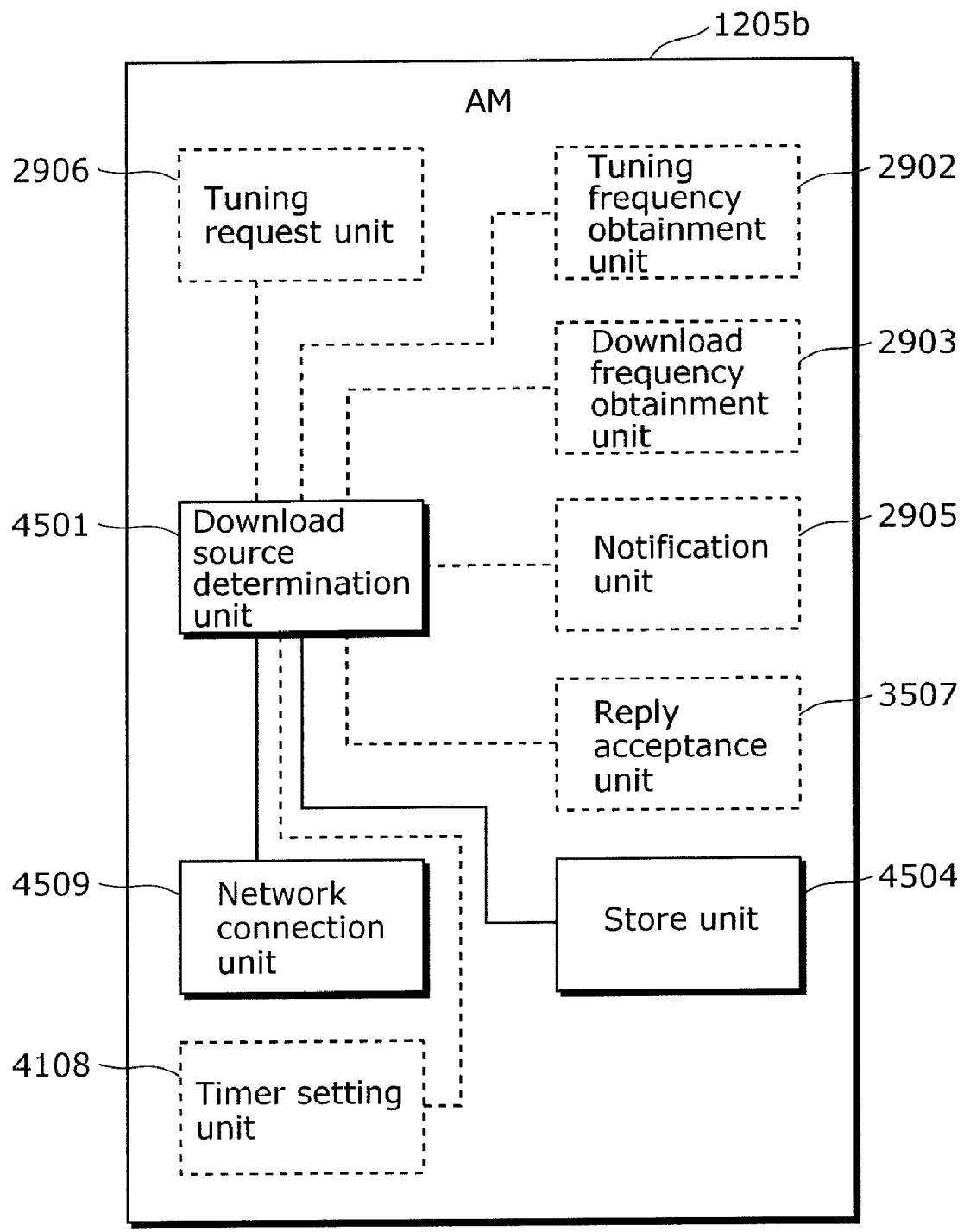
FIG. 56 is a diagram showing the configuration of the AM in the sixth embodiment.

FIG. 56 shows the constituent elements in the present embodiment. Since it is possible to apply the constituent elements in the embodiments described thus far, description of the respective elements in FIG. 56 shall be omitted. Furthermore, elements shown with dotted lines are not mandatory elements.

Figure 57:
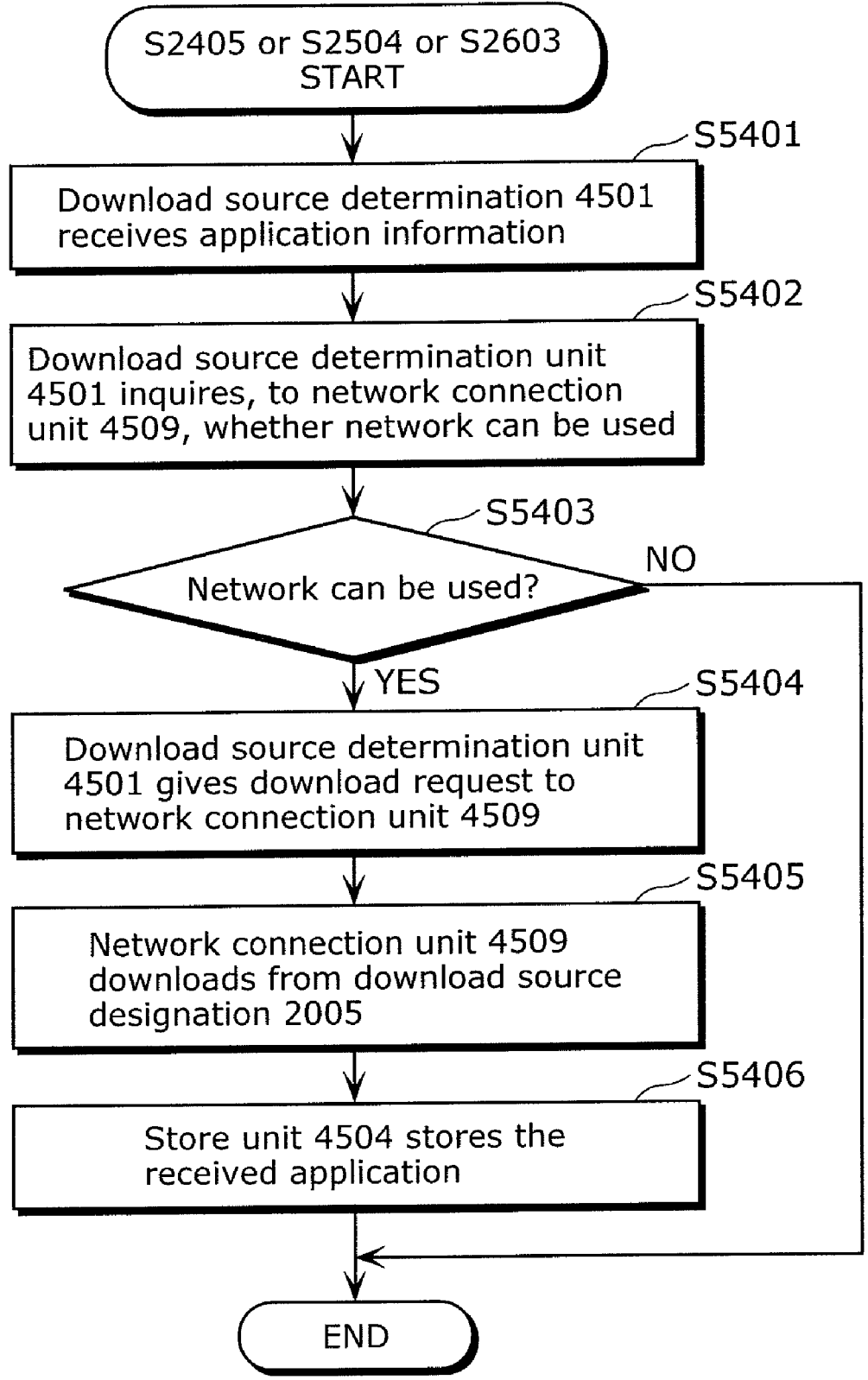
FIG. 57 is a flowchart showing an example of the operation of storing a specified application, in the seventh embodiment.

FIG. 54 is flowcharts showing an example of the operation in which network downloading is preferentially processed when downloading from an IP is present in the download source of the application. With reference to FIG. 57, the download source determination unit 4501 accepts application information (S5401). The application information includes the protocol identifier 2003 and the download source designation 2005 of the selected application. At this time the download source determination unit confirms that IP is present in the protocol identifier 2003. Next, the download source determination unit 4501 inquires, to the network connection unit 4509, whether or not the network can be used (S5402). The download source determination unit 4501 judges whether or not the network can be used (S5403) and, when use is not possible (NO in S5403), ends the process. On the other hand, when the network can be used (YES in S5403), the download source determination unit 4501 specifies the download source designation 2005, and gives a download request to the network connection unit 4509 (S5404). The network connection unit 4509 performs the downloading from the specified download source designation 2005 (S5405). Then, the network connection unit 4509 passes the downloaded application to the download source determination unit 4501, and the download source determination unit 4501 instructs the storing of the application to the store unit 4504, and the store unit 4504 carries out the storing.

Figure 51:
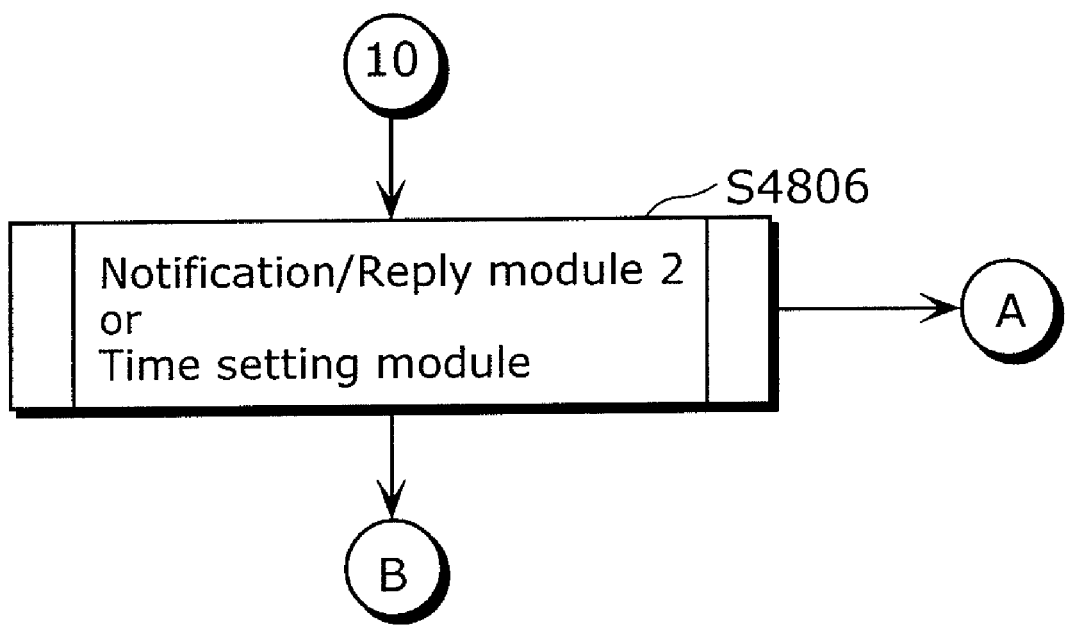
FIG. 51 is a part of FIG. 49 and is a flowchart showing an example of the operation of storing a specified application, in the fifth embodiment.
Figure 58:
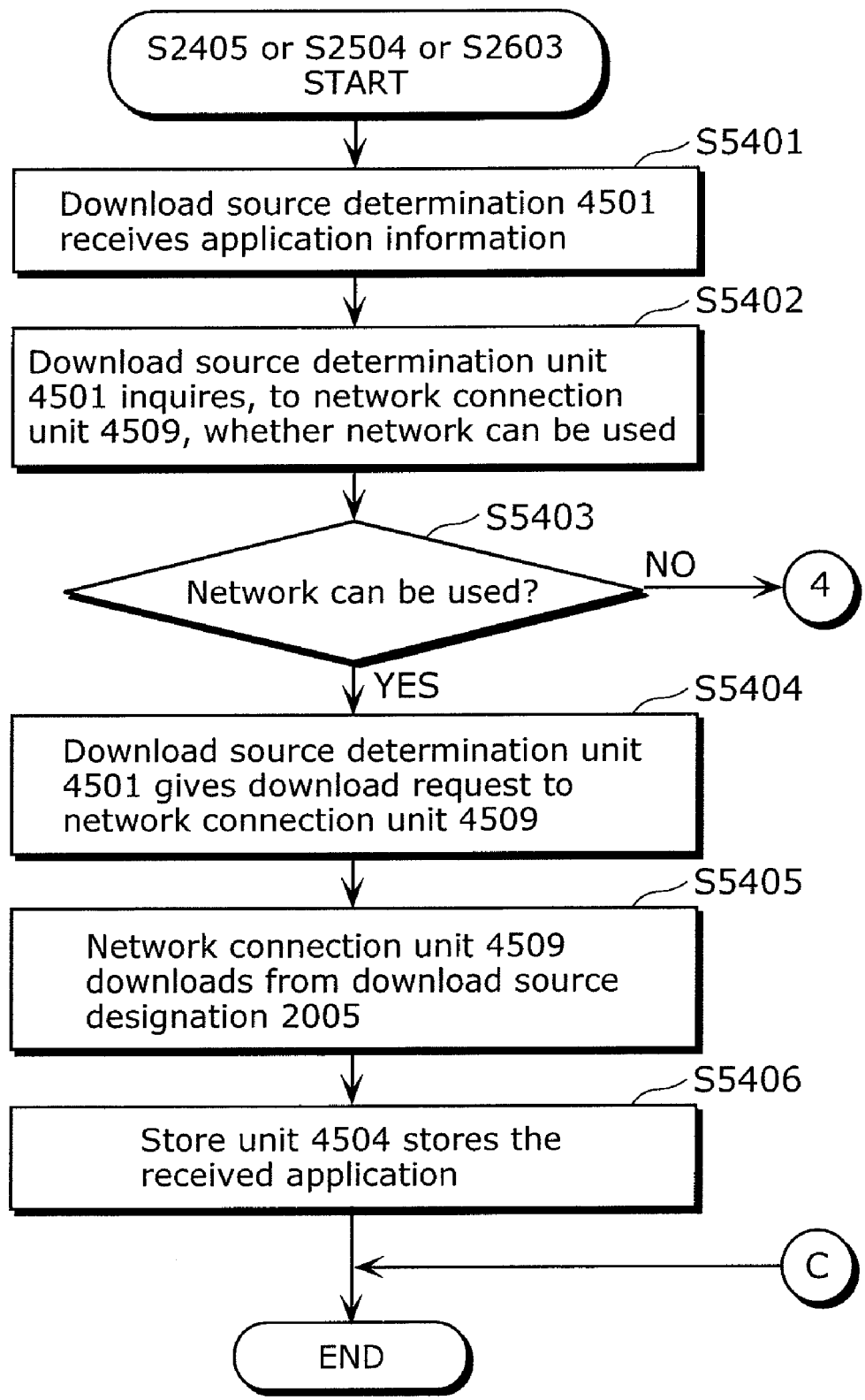
FIG. 58 is a flowchart showing an example of the operation of storing a specified application, in the seventh embodiment.
Figure 59:
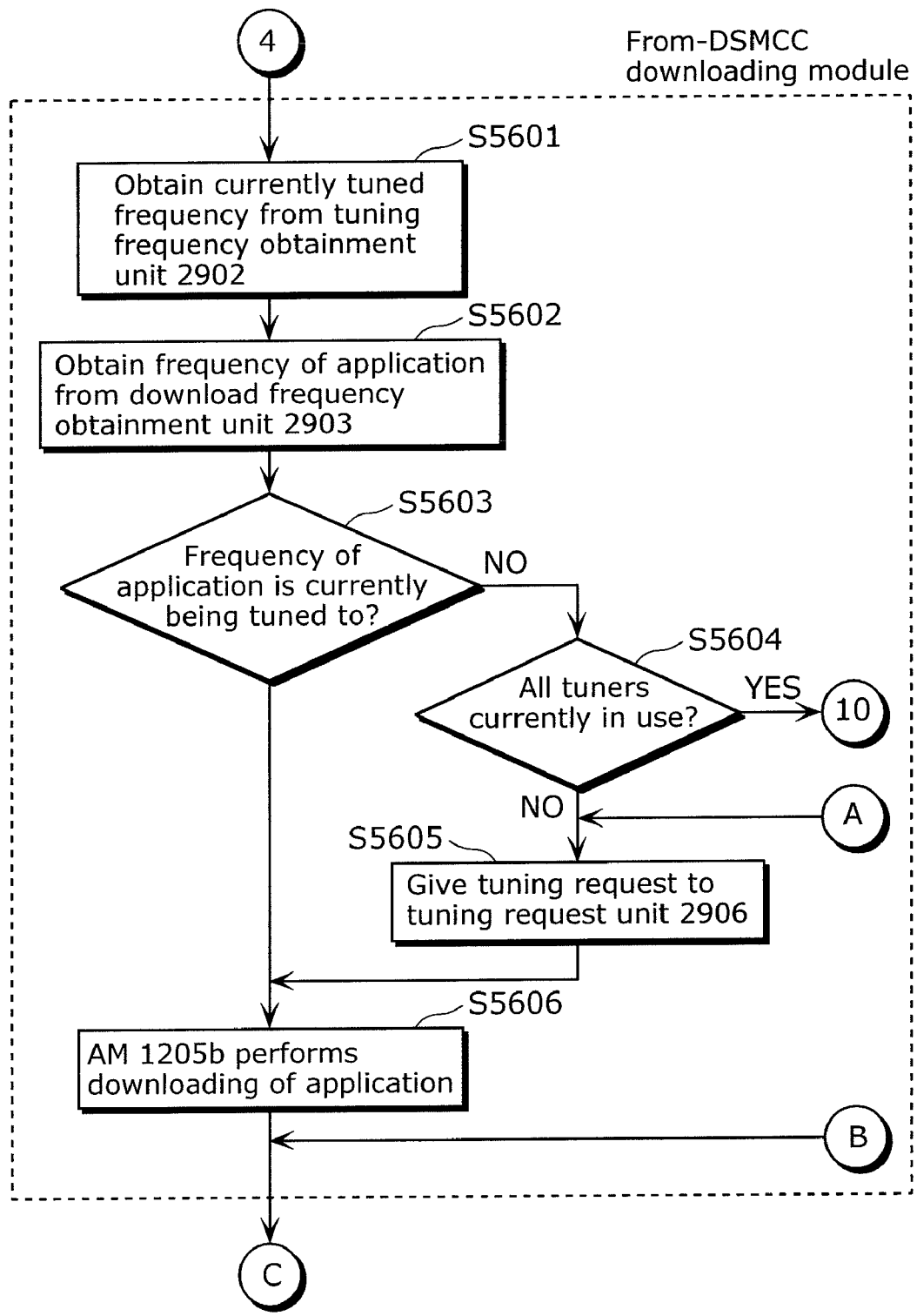
FIG. 59 is a part of FIG. 58 and is a flowchart showing an example of the operation of storing a specified application, in the seventh embodiment.

Note that although it is described here that the process is ended when, in the judgment of whether or not the network can be used (S5403) in FIG. 57, the network cannot be used, here, as shown in FIG. 58, it is also possible to continue to the process in FIG. 59 in which downloading from the tuner is performed. FIG. 59 merely removes the processing in S3001 in FIG. 39 and thus detailed description shall be omitted. With reference to FIG. 59, when the judgment as to whether all the tuners are in use (S5604) is YES, any of the notification module or the notification/reply module 1 shown in FIG. 50, or the notification/reply module 2 or the time setting module shown in FIG. 51 is executed, a tuner is used and downloading is performed (S4806 in FIG. 50 or S4806 in FIG. 51). Note that, as a from-DSMCC download module, the processes in S5601 to S5606 in FIG. 59 shall be referred to when the same processes are performed hereafter.

The present embodiment describes a method in which downloading from the network is preferentially performed. With this, it is possible to reduce the interruption of the viewing or recording by the user.

(Eight Embodiment)

A general method in downloading an application is a method in which downloading is performed from a tuner using DSMCC. For this reason, in the first to sixth embodiments, a method which prioritizes a method which performs downloading from DSMCC is described. Furthermore, the seventh embodiment describes a method which preferentially processes downloading from a network over downloading from DSMCC so as not to interrupt the user during downloading. However, the present embodiment shall describe a method in which the download source that allows the fastest downloading is searched from among methods for which downloading is possible, and downloading is performed.

Note that, even with the embodiments up to this point, and particularly in downloading a program using a network, it is possible to adopt a format in which downloading is performed from the fastest download source when plural download source designations 2005 exist.

Figure 60:
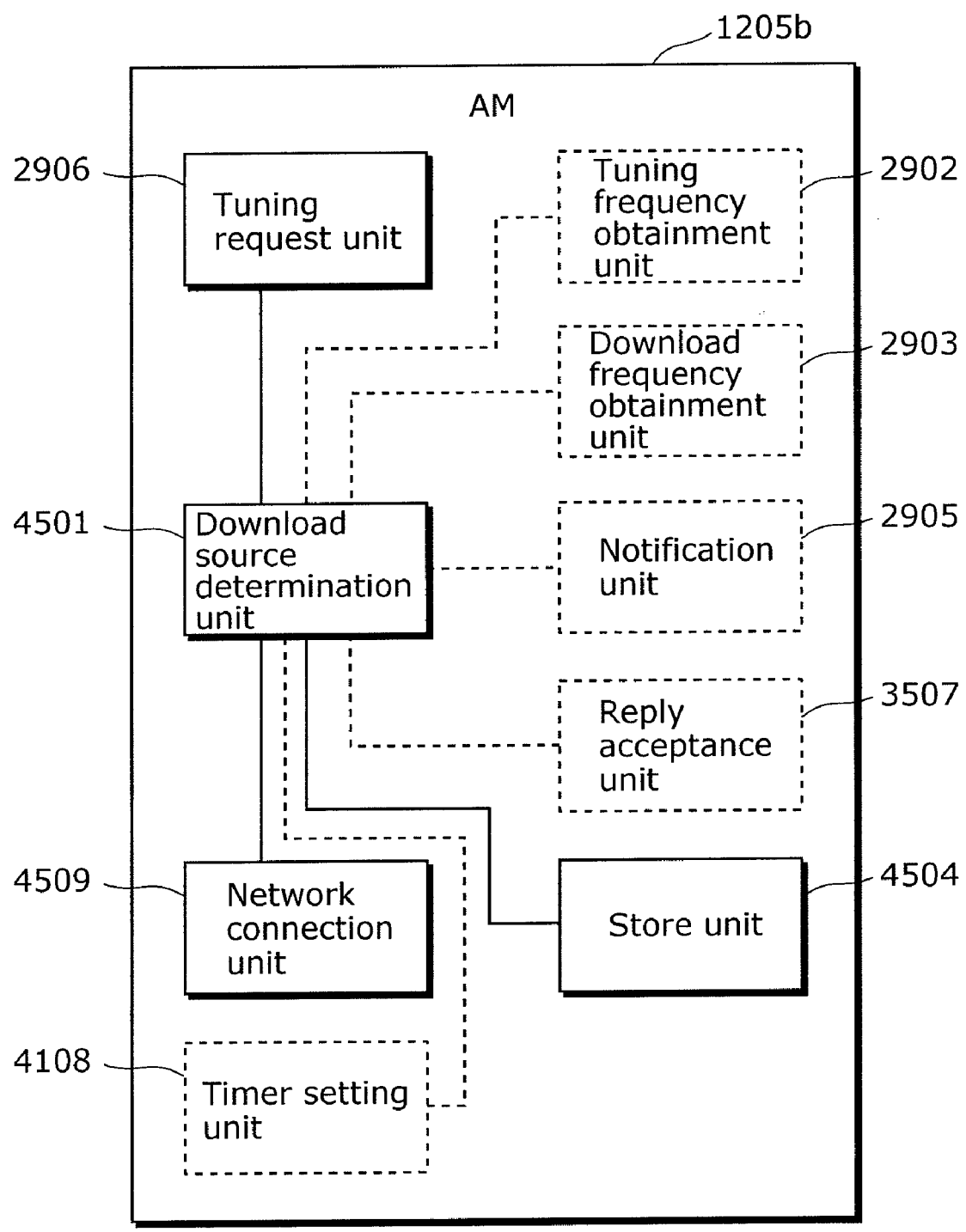
FIG. 60 is a diagram showing the configuration of the AM in the eighth embodiment.

FIG. 60 shows the constituent elements in the present embodiment. Since the constituent elements in the embodiments described thus far can be applied to the respective constituent elements shown in FIG. 60, description shall be omitted. Note that elements shown with dotted lines are not mandatory elements.

Figure 61:
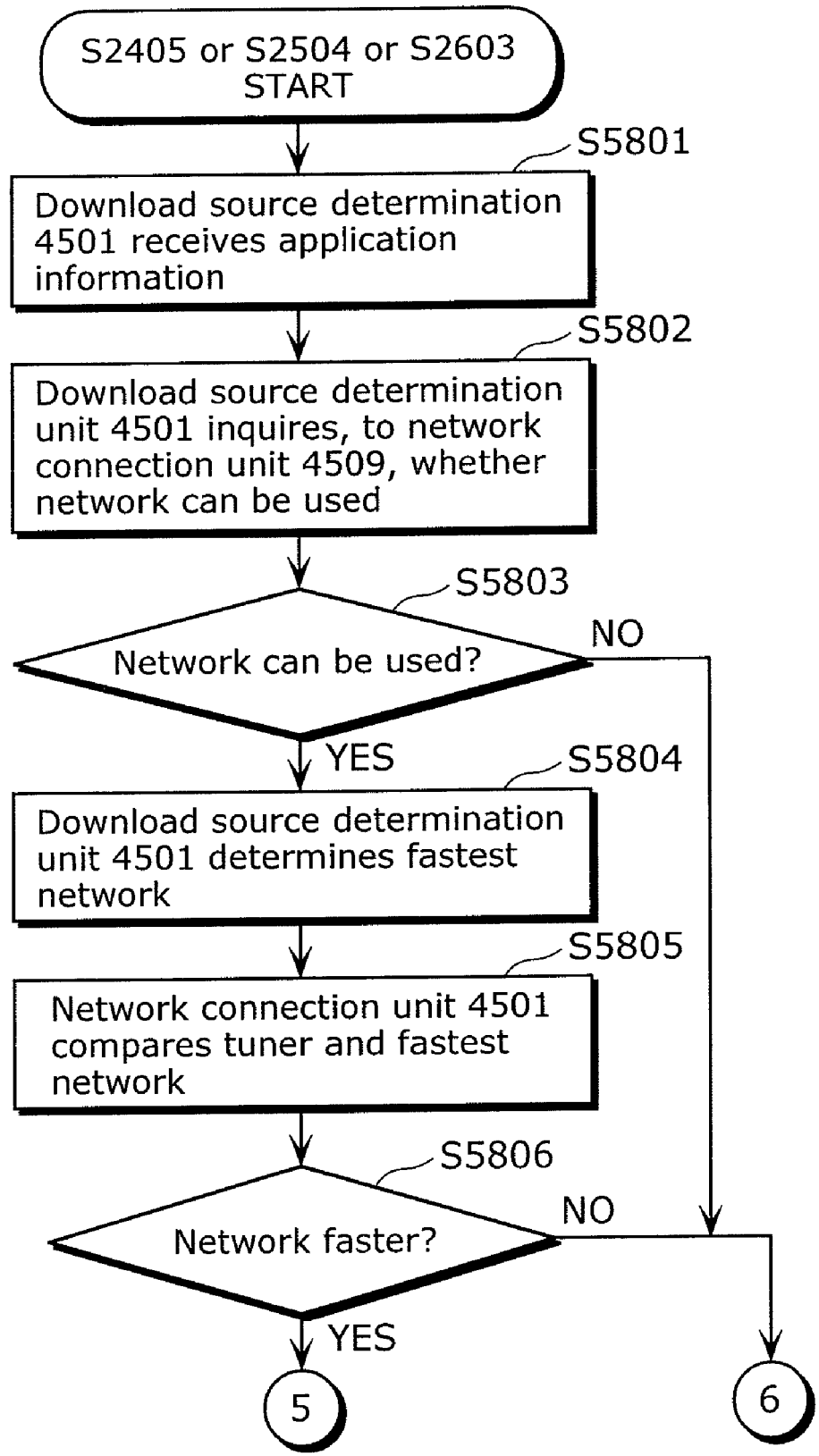
FIG. 61 is a flowchart showing an example of the operation of storing a specified application, in the eighth embodiment.
Figure 62:
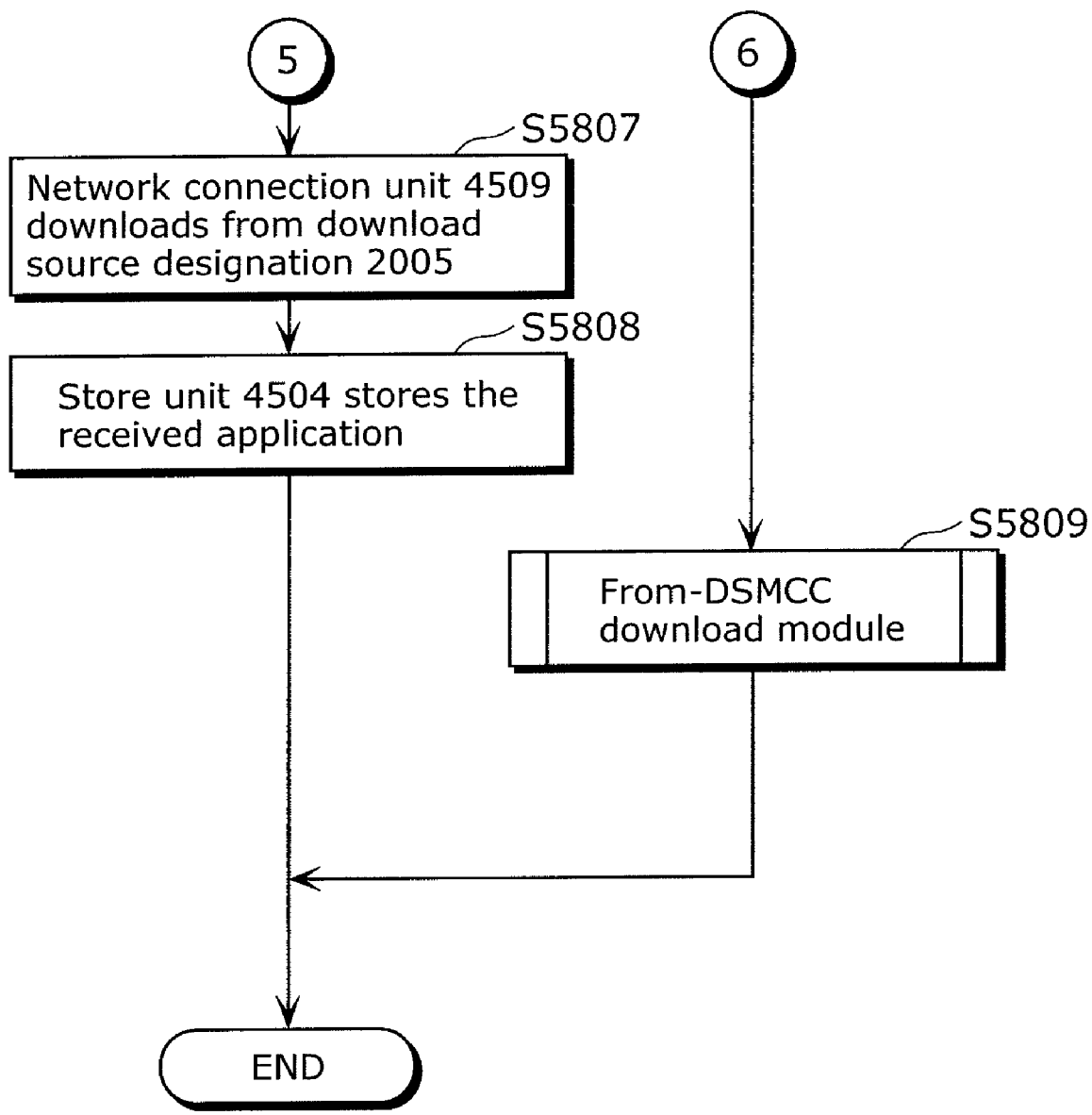
FIG. 62 is a flowchart showing an example of the operation of storing a specified application, in the eighth embodiment.

FIG. 61 and FIG. 62 are flowcharts showing an example of the operation for downloading from the fastest download source in the determination of a download source for an application. With reference to FIG. 61, the download source determination unit 4501 receives application information (S5801). The application information includes the protocol identifier 2003 and the download source designation 2005 for the selected application. Next, the download source determination unit 4501 inquires whether or not the network can be used, to the network connection unit 4509 (S5802). The download source determination unit 4501 judges whether or not the network can be used (S5803) and, when use is possible (YES in S5803), the download source determination unit 4501 determines the fastest network from among the designated sources for downloading the application using a network (S5804). As a method for obtaining the fastest network, there is a method which uses, on the server which is set on the download source designation 2005, a command for verifying network communication called ping. Ping is a command for issuing an IP packet to a host for which network communication is to be verified, and verifying whether such packet arrives properly and a reply is made. As such, although there is the method in which the server with the fastest reply is considered as being the fastest, methods other than this are also acceptable. Note that such method, in which the download source designation 2005 from the fastest network is identified, and downloading is performed from such server, can also be applied to the previous first through seventh embodiments. Next, the speed of the download source designation 2005 from the fastest network obtained by the download source determination unit 4501 and the downloading from the DSMCC which uses a tuner is compared (S5805). Note that it is possible to have a setting which allows the speed for downloading from the DSMCC to be detected using the hardware which obtains the packet, and such value to be obtained by the download source determination unit 4501. Furthermore, it is also possible for the download source determination unit 4501 to hold, in advance, the bit rate of the transport stream as a fixed value. Next, the download source determination unit 4501 judges, from the comparison in S5805, whether or not the network is the fastest (S5806). When, as a result, the network is the fastest (S5806), the process proceeds to process 5 in FIG. 62, and the network connection unit 4509 performs the program downloading from the download source designation 2005 (S5807). Then, the downloaded application is passed on to the download source determination unit 4501, and the download source determination unit 4501 passes the application to the store unit 4504, an instructs the storage of the application to the store unit 4504 (S5808). On the other hand, when it is judged in S5806 that the network is not the fastest (NO in S5806), the process proceeds to process 6 in FIG. 62. Moreover, in the case where the network cannot be used in S5803, the process proceeds to process 6 in FIG. 62. At this time, since the tuner is used, the process proceeds to that in FIG. 59 (S5809). Moreover, in process 10 in FIG. 59, the method shown in the first through third embodiments can be used.

In the present embodiment, description is carried out regarding a method for downloading from the source which allows the fastest downloading, between the downloading from a network and DSMCC.

(Ninth Embodiment)

In the embodiments up to this point, methods for downloading from a network and DSMCC have been considered as a method for downloading an application. In the present embodiment, application obtainment from a recording medium shall be considered.

In the case of downloading from a recording medium, the viewing or recording of a user is not interrupted since a tuner is not required. As such, when a request for obtaining an application from a recording medium is received, realization is possible through the sending of a recording medium insertion instruction. Here, a recording medium may be any medium such as optical disk media such as a CD, a DVD, and a BD, a memory card which uses a semiconductor, and the like, as long as information can be recorded within the medium.

Figure 63:
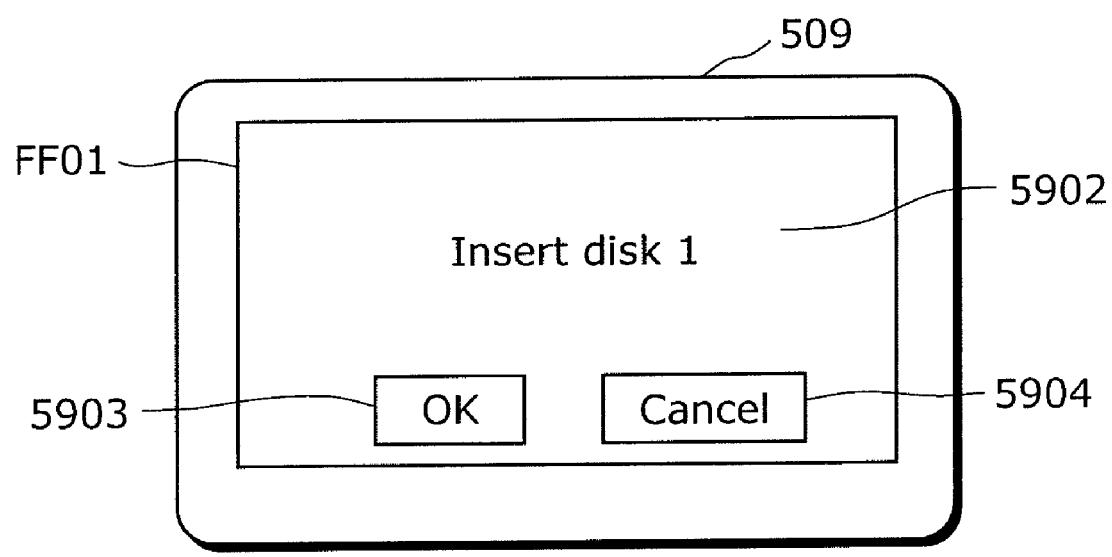
FIG. 63 is a diagram showing an example of the implementation of the download notification to the user by the notification unit, in the ninth embodiment.

FIG. 63 shows an example of a screen-display displayed by a notification unit. Here, a screen-display requesting the insertion of a recoding medium is displayed at a timing in which the obtainment of a program becomes necessary. Here, a message button 5902 which prompts the insertion of the recording medium, an OK button 5903, and a cancel button 5904 are included. Note that the display method and the reply from the user need not be limited to the aforementioned method, since it is sufficient that the completion of the recording medium insertion or the cancellation of processing is recognized.

Figure 64:
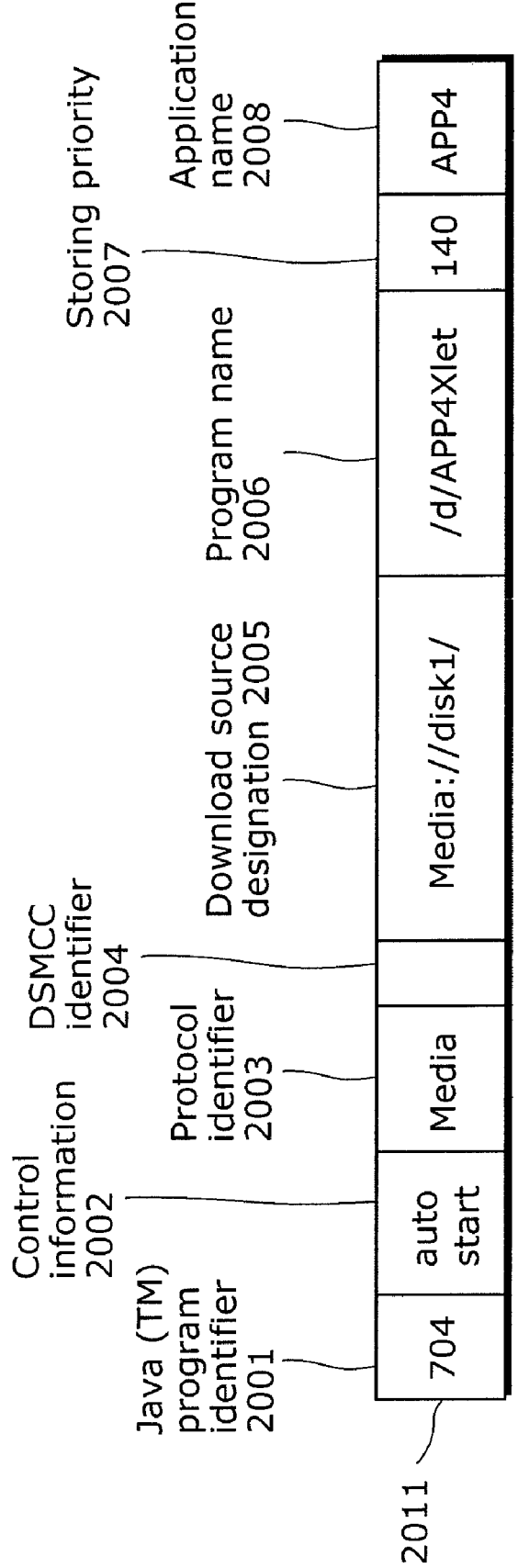
FIG. 64 is a schematic diagram showing details of the XAIT in which disc specification is made in the protocol identifier, in the ninth embodiment.

FIG. 64 shows an example of XAIT in the case where a recording medium is specified. Media is specified in the protocol identifier 2003, and the designation of a recording medium is indicated in the download source designation 2005. The other items are the same as those described in the first embodiment, and thus their description shall be omitted. Note that the obtainment of a program from a recording medium shown in the present embodiment is not limited to the obtainment from XAIT information, and can be applied even for requests which use other information. Furthermore, the items shown in FIG. 64 need not be limited to the items and expressions in FIG. 64 as long as the obtainment of an application from a recording medium can be identified.

Figure 65:
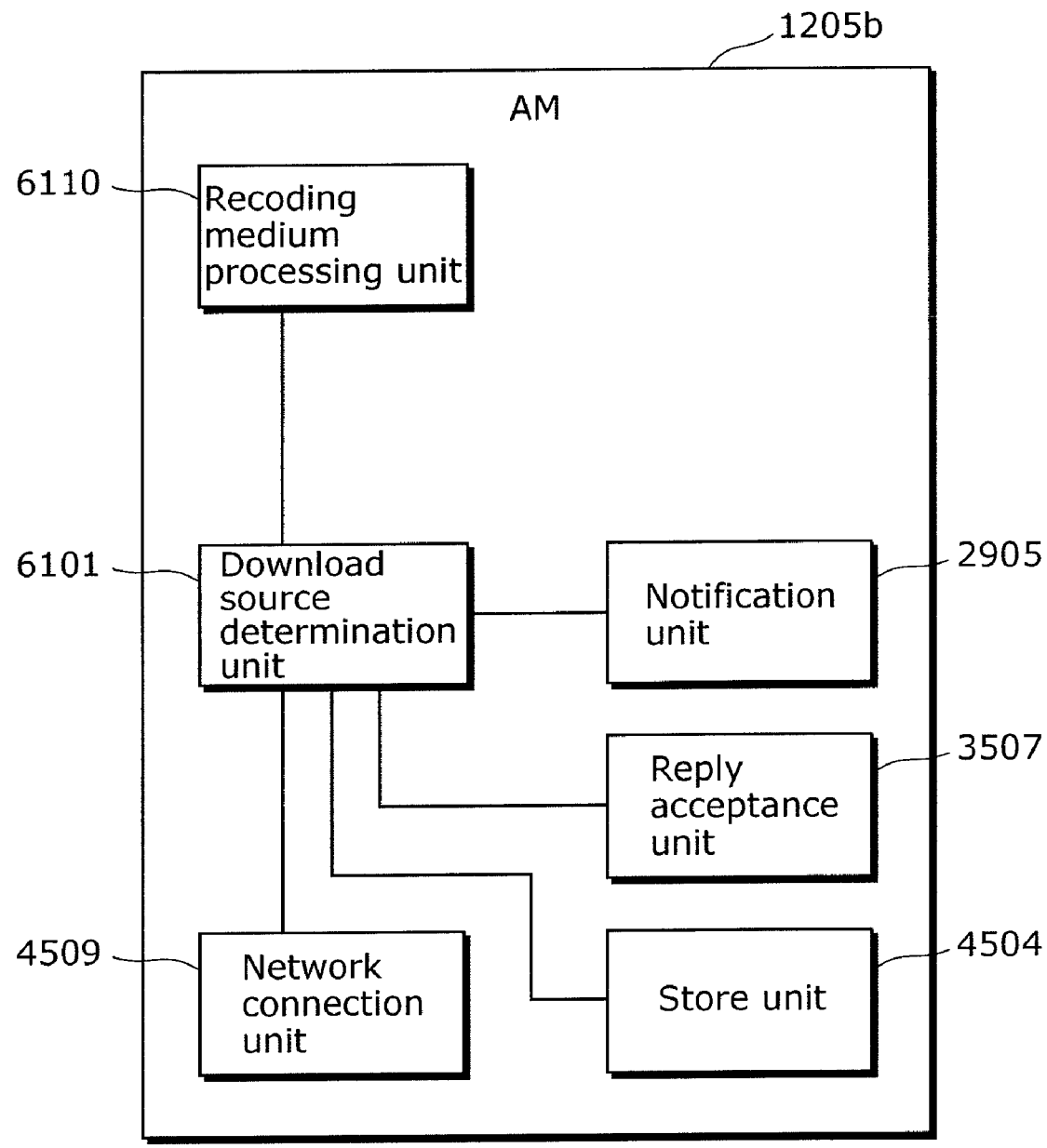
FIG. 65 is a diagram showing the configuration of the AM in the ninth embodiment.

FIG. 65 shows the constituent elements in the present embodiment. Constituent elements indicated with the same reference number as in FIG. 30, FIG. 35, and FIG. 45 can be implemented with the same functions as those elements previously described, and thus their description shall be omitted.

A download source determination unit 6101, in addition to the functions of the download source determination unit 4501, instructs the display of a message prompting the insertion of the recording medium to the notification unit 2905, and receives the user's reply from the reply acceptance unit 3507. In addition, the download source determination unit 6101 instructs the reading from the recording medium to a recording medium processing unit 6110, and instructs the storage of the obtained application to the store unit 4504.

The recording medium processing unit 6110 performs the reading of from the recording medium in accordance with the instruction from the download source determination unit 6101, and obtains the application specified by the download source determination unit.

Figure 66:
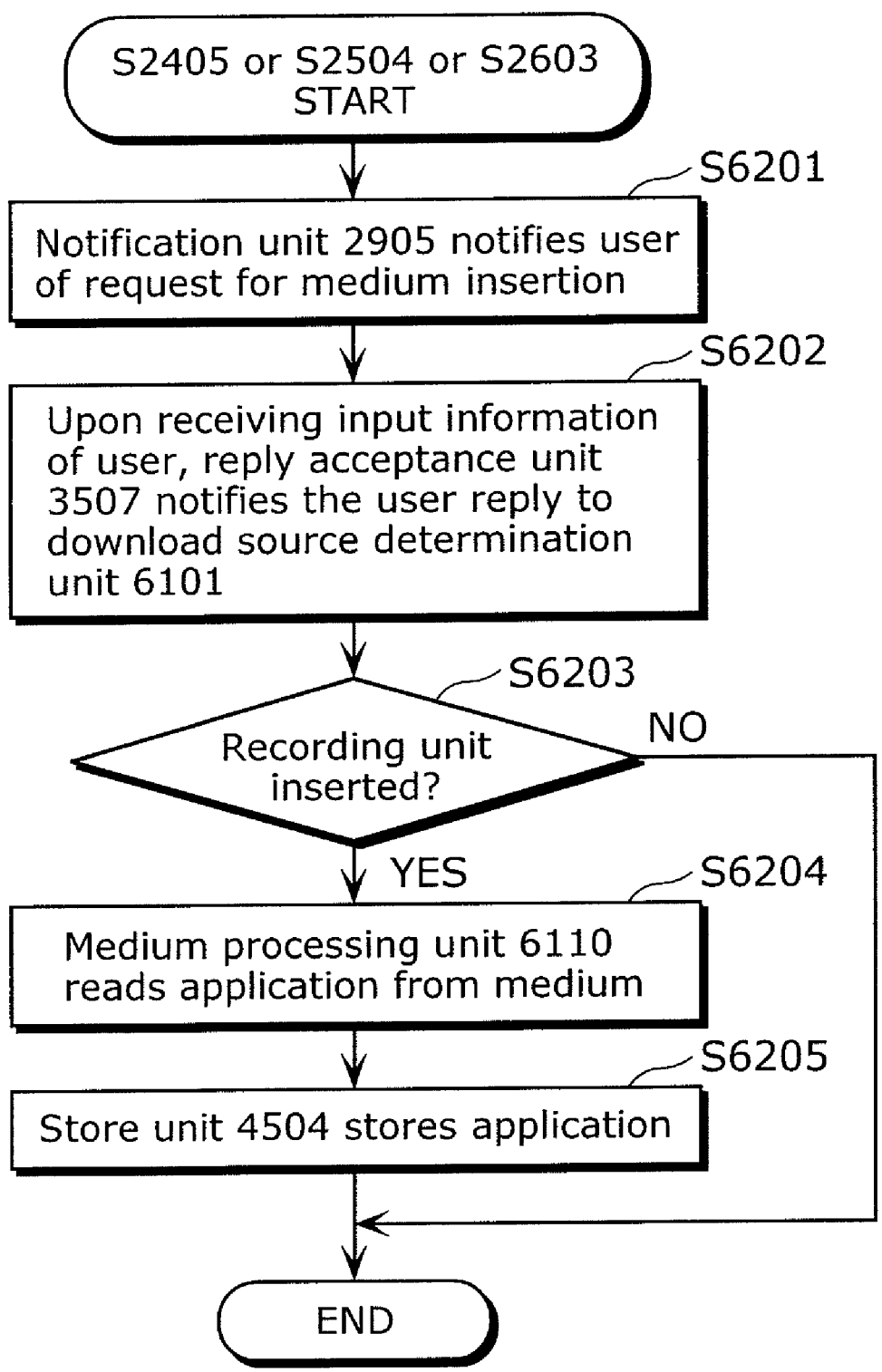
FIG. 66 is a flowchart showing an example of the operation of storing a specified application, in the ninth embodiment.

Next, FIG. 66 shows an example of a flowchart for application reading from the recording medium. The download source determination unit 6101 instructs the notification unit 2905 for the message display requesting the insertion of the recording medium to the user, and the notification unit 2905 displays such message (S6201). Subsequently, the download source determination unit 6101 instructs the reply acceptance unit 3507 to wait for the user's reply. Upon receiving such instruction, the reply acceptance unit 3507 waits for the user's input information and, upon accepting the input information, notifies the selected user reply to the download source determination unit 6101 (S6202). The download source determination unit 6101 judges whether or not the recording medium has been inserted based on the received user reply (S6203) and, in the case where the recording medium has been inserted, instructs the reading of the application to the recording medium processing unit 6110, and the recording medium processing unit 6110 performs the reading of the application from the recording medium (S6204). Then, the download source determination unit 6101 passes the obtained application to the download source determination unit 6101, and the download source determination unit 6101 instructs the storage of the application to the store unit 4504, and the store unit 4504 performs the storage (S6205). On the other hand, in the case where the insertion of the recording medium is cancelled, the process ends.

Note that although only the obtainment of an application from a recording medium is described here, it is also possible to check whether a new version of the application obtained from the recording apparatus exists by simultaneously using the network connection unit 4501. Here, in the case where both media and IP are designated in the protocol identifier 2003, the download source designation 2005 can be referred to. Alternatively, as an example, implementation is also possible by previously storing, together with the application, a file which specifies a server and directory for storing the newest version of the application within the recording medium, and referring to such file when the reading from the recording medium by the recording medium processing unit 6110 is performed, and checking the existence of a newest application, via the network connection unit 4509. When, as a result, a newest version exists, a method in which the application is downloaded from the network connection unit is also assumed.

Furthermore, the eighth embodiment describes a method in which downloading is performed from the source that enables the fastest downloading from among downloading from a network and DSMCC. However, in the case where, for example, application obtainment from a recording medium is also possible, it is also acceptable, in consideration of the transfer speed from the recording medium, to perform downloading from the source that enables the fastest downloading from among downloading from a network, downloading from DSMCC, and application obtainment from the recording medium.

Note that the following application is possible throughout the first to ninth embodiments.

Although the message notification and download path during application downloading have been described, in these cases, it is also possible to adopt a policy in which processing is repeated by designating an other download source designation 2005 when the download source is determined and an error is detected during downloading. In addition, in the case where downloading cannot be completed even when all download source designations 2005 are processed, it is also possible to try using the other method in the protocol designation 2003. At this time, the embodiments described thus far can be used.

Furthermore, the Java™ program may be a combination of a portion described in the Java™ language and a portion in a binary format that can be directly executed by the CPU, and may also be made up of only the binary format that can be directly executed by the CPU.

Furthermore, although the registered Java™ program is stored in the secondary storage unit 510, storage in the primary storage unit 511 can also be implemented. In the case of storing in the primary storage unit 511, all information stored is lost when the power source is turned OFF. Furthermore, the network may be implemented as a wired or a wireless network.

Furthermore, the present invention can be applied for information devices such as a personal computer and a mobile phone.

Furthermore, although a detachable form is adopted for the POD 504, it may also be implemented in a built-in form. Note that in the case where the POD 504 is built-in, it is also possible to have an implementation where the CPU 706 of the POD 504 is removed, and the CPU 514 performs the operations of the CPU 706.

The Java (™) program registered in the POD Lib 1205*e* is not limited to a downloaded Java (™) program, and may also be a Java™ program that is built-in beforehand. Furthermore, it is also possible to install a slot unit for attaching and detaching a detachable recording medium such as an SD memory card, and import the Java™ program therefrom.

(Tenth Embodiment)

In the above-described embodiments, description is carried out exemplifying the application operating on a terminal apparatus such as a digital television, as the application to be downloaded. However, aside from this, the application program also includes a program making up a platform recorded in advance within the terminal apparatus. In other words, a program making up a platform is also a target for downloading.

Here, the platform is assumed to be software embedded in a broadcast receiving apparatus, and is software that can be changed afterwards for adding a function and correcting a defect.

In the present embodiment, an example of the downloading of a platform is described.

Figure 67:
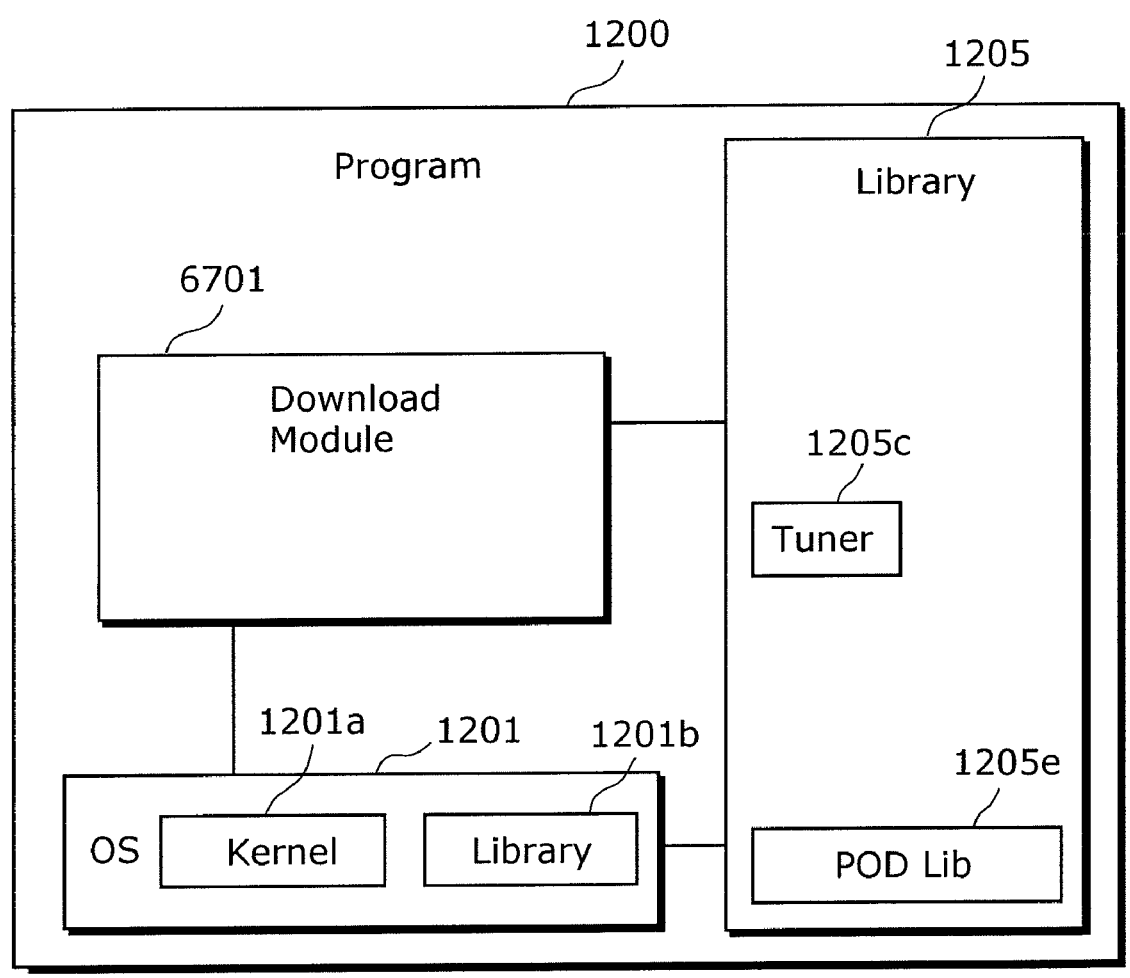
FIG. 67 is a diagram for describing an example of the download execution apparatus in the tenth embodiment.

FIG. 67 is a diagram for describing an example of the download execution apparatus in the present embodiment.

In FIG. 67, 6701 is a Download Module for downloading program data (hereinafter called as firmware) corresponding to a platform.

Figure 68:
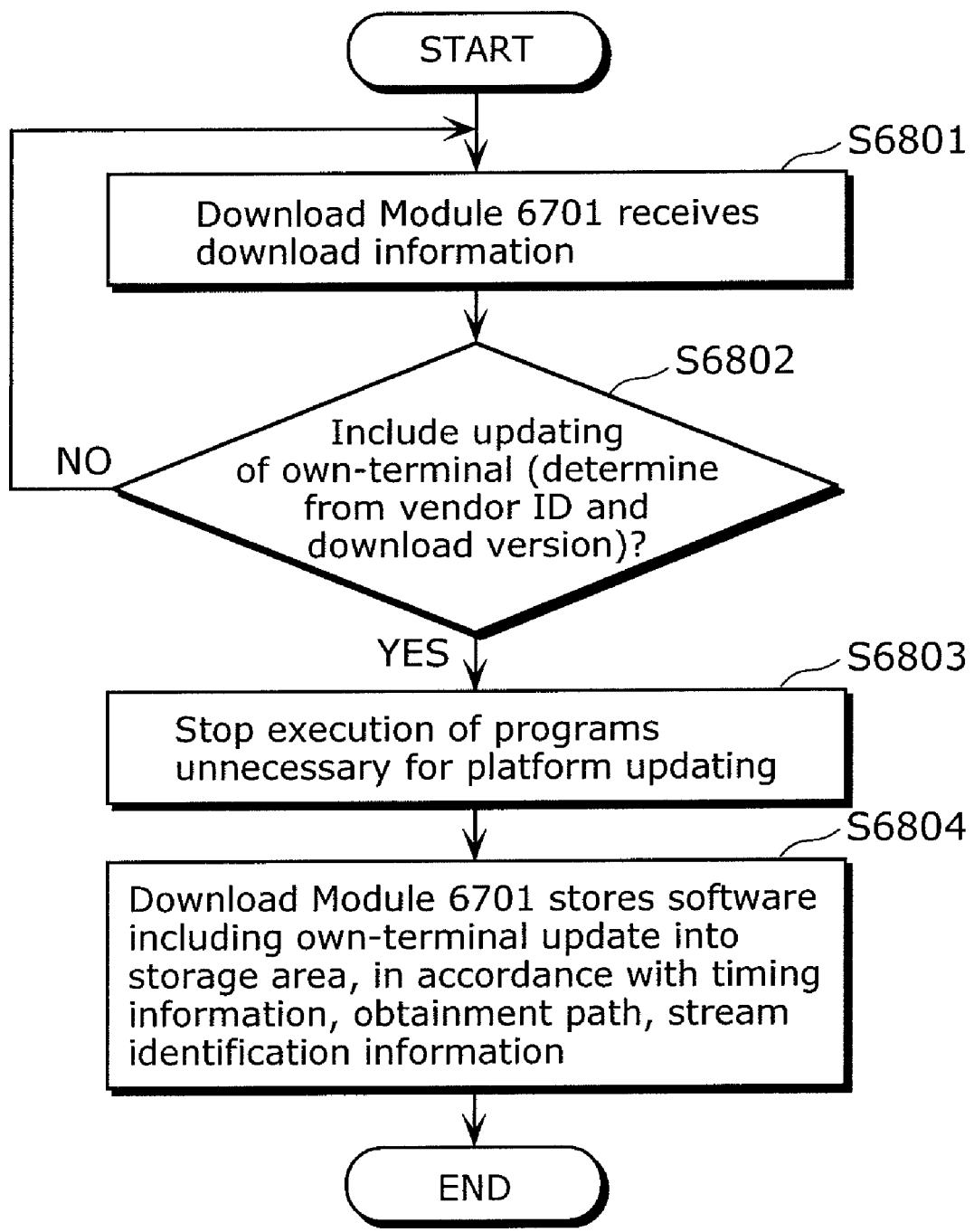
FIG. 68 is a flowchart showing an example of the processing operation of the Download Module in the tenth embodiment.

FIG. 68 shows a flowchart for an example of the processing by the Download Module 6701 shown in the present embodiment. The Download Module 6701 monitors whether or not firmware updating information, (described later) as shown in FIG. 69, for example, which is sent through a sending scheme other than the In-Band or OOB in FIG. 3 for example, or a network, is being sent.

FIG. 69 is an example of firmware updating information. Such information, to be more specific, is described in detail in the ANSI/SCTE 28 2004 HOST-POD Interface Standard.

In FIG. 69, a vendor ID 6901, the assignment of which to each vendor is determined, holds a value that can uniquely identify a vendor. As an example, there is an Organizationally Unique Identifier (OUI) which is a value assigned by the IEEE to a host device vendor. Furthermore, a hardware version 6902 holds an identifier that uniquely identifies hardware assigned to each type of hardware in a vendor indicated by a vendor ID. Furthermore, timing information 6903 holds information indicating the timing at which downloading is to be executed. As an example, the timing of downloading can be described in terms of numerical values such as immediate download (00), delayed download (01), no-exception immediate download (02). Furthermore, an obtainment path 6904 holds a path through which firmware identified by the vendor ID 6901 and the hardware version 6902 can be downloaded. For example, there are the In-Band and OOB in FIG. 3 for "broadcast signal", and there is Data-Over-Cable-Service Interface Specification (DOCSIS) for the "network". Refer to CM-SP-eDOCSIS-I16-050812 for details of DOCSIS. Furthermore, stream identification information 6905 holds an identifier that additionally identifies a transmission stream within a path described by the obtainment path 6904. As an example of an identifier that identifies a transmission stream, there are "TV show (=service)", "frequency and program number", and "frequency and packet ID". Description returns again to FIG. 68. After obtaining firmware updating information as shown in FIG. 69 for example, in (S6801), the vendor ID 6901 and the hardware version 6902 of the received hardware updating information is compared with the vendor ID and the hardware version held by the broadcast receiving apparatus (S6802). At this time, when the firmware information held by the broadcast receiving information is included in the received firmware updating information, the execution of programs (for example, the EPG 1202, the VM 1203, the service manager 1204, and a part of the functions in the library 1205 (such as the JMF 1205*a*, the AM 1205*b*, and the CA 1205*d*)) which are not necessary for platform updating are stopped (S6803). Furthermore, when the firmware information held by the broadcast receiving information is not included in the received firmware updating information, the process returns to (S6801), and once again the obtainment of firmware updating information is awaited.

After the execution of programs not necessary for platform updating is stopped in (S6803), the Download Module 6701 determines the download source for the firmware, using the timing information 6903, the obtainment path 6904, and the stream identification information 6905 for firmware updating, then downloads the firmware and stores it in a storage area.

Note that the primary storage unit 511 and the secondary storage unit 510 exist as an example of the storage area.

A more detailed flowchart for (S6804) is equivalent to the flowchart shown in FIG. 31 and FIG. 32 for example. Furthermore, the specific configuration of the Download Module is equivalent to the block diagram shown in FIG. 30. However, since such flowcharts are flowcharts showing the operation of the AM, and the block diagram is a block diagram showing the configuration of the AM, they can be read by replacing the AM with the Download Module 6701. At this time, "XAIT information" in the descriptive sentences corresponding to FIGS. 31 and 32, is replaced with "firmware updating information". Furthermore, it is sufficient to replace "protocol identifier" with "obtainment path", and replace the protocol identifier "OC" with "broadcast signal" and "IP" with "network". Note that as an example of a transmission method for "network", section information, and the like, in the DSMCC format may be contained in a communication protocol such as an IP packet and a UDP packet. Furthermore, "download source designation" is replaced with "stream identification information". As an example of "stream identification information", it is possible to specify a source ID, a set of the frequency and the program number, and a set of the frequency and packet ID.

The same replacement is possible for the flowcharts in FIGS. 38, 39, 40, 44, 46, 47, 49, 50, 51, 53, 54, 55, 57, 58, 59, 61, 62, 66, the block diagrams in FIGS. 35, 41, 45, 52, 56, 60, 65, and the descriptions corresponding to these diagrams.

Furthermore, when the information held in the timing information 6903 is information for immediate download (00), and no-exception immediate download (02), and downloading using a tuner, interruption of the viewing by the user is eliminated by a configuration in which download execution is not performed in the case where all tuners are in use.

Industrial Applicability

The download execution apparatus according to the present invention is particularly useful as a technique for the downloading of an application in a digital television. Furthermore, aside from a digital television, the download execution apparatus according to the present invention can also be applied to download source determination and message notification applications in an information device which is controlled by software, such as a personal computer and a mobile phone for example.

The invention claimed is:

1. A download execution apparatus that downloads a program, said download execution apparatus comprising:
   at least one tuner configured to receive a broadcast signal;
   a download request receiver configured to receive a single download request for downloading the program, the single download request including a plurality of sets, each set including control information of the program, a download method of the program, and download source information of the program, each control information indicating a control for execution of the program, each download method indicating a protocol that is available for downloading of the program, each download source information indicating a location of the program;
   a download source determiner configured to determine one set from the plurality of sets included in the download request;
   a tuning judger configured to judge whether or not there is a tuner that is available for downloading the program, based on the download method and the download source information of the set determined by said download source determiner; and
   a download executer configured to, when the tuning judger judges that there is a tuner that is available for downloading the program, download the program using the tuner that is available for downloading the program,
   wherein the plurality of sets included in the single download request include at least Object Carousel and Internet Protocol as the download methods,
   wherein the download executer is further configured to judge whether or not the control information in the set determined by the download source determiner indicates automatic execution of the program, and to download the program based on the download method and the download source information in the determined set, when the download executer judges that the control information in the determined set indicates automatic execution of the program, but the pro ram has not yet been stored.

2. The download execution apparatus according to claim 1, further comprising:
   a message notifier configured to notify a user by sending a message regarding the downloading of the program to a user, based on a result of the judgment by said tuning judger.

3. The download execution apparatus according to claim 1, further comprising:
   a tuning frequency obtainer configured to obtain a frequency being tuned to by said tuner; and
   a download frequency obtainer configured to obtain a frequency of a broadcast signal which includes the program, based on the download source information,
   wherein said tuning judger is configured to judge whether or not the program can be downloaded with the current tuning, based on the frequency obtained by said tuning frequency obtainer and the frequency obtained by said download frequency obtainer, and to judge that there is a tuner that can be used for the downloading of the program when the program can be downloaded with the current tuning.

4. The download execution apparatus according to claim 3, wherein said tuning judger is further configured to judge whether or not there is a tuner that is not being used, based on the frequency obtained by said tuning frequency obtainer, and to judge that there is a tuner that can be used for downloading the program when there is a tuner that is not being used.

5. The download execution apparatus according to claim 3, further comprising
   a tuning executer configured to execute tuning to the frequency obtained by said download frequency obtainer when said tuning judger judges that the program cannot be downloaded with the current tuning.

6. The download execution apparatus according to claim 5, wherein, when executing the tuning, said tuning executer is configured to select a tuner to execute the tuning, in accordance with a use situation of the tuner and a purpose of use.

7. The download execution apparatus according to claim 2, wherein said message notifier is configured to notify the user by the message, when said tuning judger judges that there is no tuner that can be used for downloading the program.

8. The download execution apparatus according to claim 2, wherein said message notifier is configured to display the message for a predetermined time period.

9. The download execution apparatus according to claim 2, wherein said message notifier is configured to notify the user that downloading is currently being executed, when the program is being downloaded by the download executer.

10. The download execution apparatus according to claim 2, wherein said message notifier is configured to provide at least one of a predetermined image, a predetermined video, and a predetermined sound to the user, when the program is being downloaded by the download executer.

11. The download execution apparatus according to claim 2, further comprising
    a reply acceptor configured to accept, from the user, a reply to the message notified to the user by said message notifier.

12. The download execution apparatus according to claim 11, wherein said reply acceptor is configured to set a time limit for accepting the reply from the user.

13. The download execution apparatus according to claim 11, wherein said message notifier is configured to notify the downloading of the program to the user, and
    said reply acceptor is configured to accept, from the user, an approval or rejection reply to the downloading of the program notified to the user by said message notifier.

14. The download execution apparatus according to claim 11, wherein said message notifier is configured to notify the downloading of the program and the download method to the user, and
    said reply acceptor is configured to accept, from the user, an approval or rejection reply to the downloading of the program and the download method notified to the user by said message notifier.

15. The download execution apparatus according to claim 14, wherein, when said reply acceptor accepts, from the user, a rejection reply to the download method, said download source determiner is configured to determine, from the plurality of sets included in the download request, a set having a download method other than the rejected download method.

16. The download execution apparatus according to claim 11,
wherein said message notifier is configured to notify, based on the plurality of sets, at least part of the download methods of the program to the user so as to make a download method inquiry,
said reply acceptor is configured to accept a download method selected by the user from the download methods of the program notified to the user by said message notifier, and
said download source determiner is configured to determine the set of the download method accepted by the reply acceptor.

17. The download execution apparatus according to claim 16,
wherein said message notifier is configured to notify a download method inquiry to the user, when said tuning judger judges that there is no tuner that can be used for downloading the program.

18. The download execution apparatus according to claim 16,
wherein said message notifier is further configured to notify supplementary information for selecting the download method to the user.

19. The download execution apparatus according to claim 11, further comprises
a time setter configured to set a time for starting downloading the program.

20. The download execution apparatus according to claim 19,
wherein said reply acceptor is configured to accept the time for starting downloading the program from the user, and
said time setter is configured to set the time accepted by the reply acceptor as the time for starting downloading the program.

21. The download execution apparatus according to claim 19,
wherein said time setter is configured to set the time for starting downloading the program, in accordance with a preset time.

22. The download execution apparatus according to claim 19, wherein said time setter is configured to set the time for starting the downloading of the program, when said reply acceptor accepts, from the user, a rejection reply to the downloading of the program.

23. The download execution apparatus according to claim 1,
wherein the download methods of the program in the download request include at least a method of receiving the program from a stream into which the program is encoded and multiplexed, a method of obtaining the program from a network, and a method of obtaining the program from a recording medium.

24. The download execution apparatus according to claim 23,
wherein said download executer is configured to perform at least one of downloading the program from the stream, downloading the program from the network, and obtaining the program from the recording medium.

25. The download execution apparatus according to claim 23,
wherein said download source determiner is configured to assign a priority to each of the download methods of the program in the download request, and to determine one set from the plurality of sets included in the download request based on the priority.

26. The download execution apparatus according to claim 25,
wherein said download source determiner is configured to assign a priority for preferential handling over other methods, to the download method of receiving the program from a stream into which the program is encoded and multiplexed.

27. The download execution apparatus according to claim 26, further comprising:
at least one tuner configured to receive a broadcast signal; and
a tuning judger configured to judge whether or not there is a tuner that can be used for downloading the program, based on the download source information.

28. The download execution apparatus according to claim 27, further comprising:
a tuning frequency obtainer configured to obtain a frequency being tuned to by said tuner; and
a download frequency obtainer configured to obtain a frequency of a broadcast signal which includes the program, based on the download source information,
wherein said tuning judger is configured to judge whether or not the program can be downloaded with the current tuning, based on the frequency obtained by said tuning frequency obtainer and the frequency obtained by said download frequency obtainer, and to judge that there is a tuner that can be used for downloading the program when the program can be downloaded with the current tuning.

29. The download execution apparatus according to claim 28,
wherein said tuning judger is further configured to judge whether or not there is a tuner that is not being used, based on the frequency obtained by said tuning frequency obtainer, and to judge that there is a tuner that can be used for downloading the program when there is a tuner that is not being used.

30. The download execution apparatus according to claim 27,
wherein said download source determiner is configured to determine, from the plurality of sets included in the download request, a set having the method of downloading the program from the network or the method of obtaining the program from the recording medium, when the tuning judger judges that there is no tuner that can be used for downloading the program.

31. The download execution apparatus according to claim 26, further comprising:
a message notifier configured to notify a message to a user; and
a reply acceptor configured to accept, from the user, a reply to the message notified to the user by said message notifier.

32. The download execution apparatus according to claim 31,
wherein said message notifier is configured to notify, to the user, the download method of receiving the program from a stream into which the program is encoded and multiplexed, and
when said reply acceptor accepts, from the user, a rejection reply to the download method, said download source determiner is configured to determine, from the sets included in the download request, a set having the method of downloading the program from the network.

33. The download execution apparatus according to claim 25,
  wherein said download source determiner is configured to assign a priority for preferential handling over other methods, to the method of downloading the program from the network.

34. The download execution apparatus according to claim 33,
  wherein said download source determiner is configured to determine, at all times, the method of downloading the program from the network, when the method of downloading the program from the network is present in the plurality of sets included in the download request.

35. The download execution apparatus according to claim 25, wherein said download source determiner is configured to assign a priority for preferential handling over other methods, to the method of obtaining of the program from the recording medium.

36. The download execution apparatus according to claim 35,
  wherein said download source determiner is configured to determine, at all times, the method of obtaining of the program from the recording medium, when the method of obtaining of the program from the recording medium is present in the plurality of sets included in the download request.

37. The download execution apparatus according to claim 1, wherein said download source determiner is configured to determine a set which enables the fastest downloading, from the sets included in the download request.

38. The download execution apparatus according to claim 1,
  wherein said download executer is configured to detect an error in downloading the program, and to generate error information when the error is detected, and
  when the error is detected by said download executer, said download source determiner is configured to again determine, based on the error information, one set from the plurality of sets included in the download request.

39. The download execution apparatus according to claim 38,
  wherein said download executer is configured to detect the error when detection of or a connection to a download source is not possible, and to generate the error information indicating that detection of or a connection to the download source of the program is not possible.

40. The download execution apparatus according to claim 38,
  wherein said download executer is configured to detect the error when the program does not exist in a download source of the program, and to generate the error information indicating that the program does not exist in the download source of the program.

41. The download execution apparatus according to claim 1, further comprising
  a tuning executer configured to detect an error in tuning, and to generate error information when the error is detected, and
  when the error is detected by said tuning executer, said download source determiner is configured to again determine, based on the error information, one set from the plurality of sets included in the download request.

42. The download execution apparatus according to claim 1, further comprising
  a storage configured to store the program downloaded by said download executer.

43. The download execution apparatus according to claim 1,
  wherein said download execution apparatus is a broadcast receiving apparatus.

44. A download execution method of downloading a program, the download execution method comprising:
  receiving a single download request for downloading the program, the single download request including a plurality of sets, each set including control information of the program, a download method of the program and download source information of the program, each control information indicating a control for execution of the program, each download method indicating a protocol that is available for downloading of the program, each download source information indicating a location of the program;
  determining one set from the plurality of sets included in the download request;
  judging whether or not there is a tuner that is available for downloading the program, based on the download method and the download source information of the determined set;
  downloading the program, when the judging judges that there is a tuner that is available for downloading the program, using the tuner available for downloading the program,
  judging whether or not the control information in the determined set indicates automatic execution of the program, and
  downloading the program based on the download method and the download source information in the determined set when it is judged that the control information in the determined set indicates automatic execution of the program, but the program has not yet been stored,
  wherein the plurality of sets included in the single download request includes at least Object Carousel and Internet Protocol as the download methods.

45. A non-transitory computer-readable recording medium storing a program for downloading an execution program, the program causing a computer to execute:
  receiving a single download request for downloading the execution program, the single download request including a plurality of sets, each set including control information of the program, a download method of the execution program, and download source information of the execution program, each control information indicating a control for execution of the program, each download method indicating a protocol that is available for downloading of the execution program, each download source information indicating a location of the execution program;
  determining one set from the plurality of sets included in the download request;
  judging whether or not there is a tuner that is available for downloading the execution program, based on the download method and the download source information of the determined set;
  downloading the program, when the judging judges that there is a tuner that is available for downloading the execution program, using the tuner available for downloading the execution program,
  judging whether or not the control information in the determined set indicates automatic execution of the program, and downloading the program based on the download method and the download source information in the determined set when it is judged that the control information in the determined set indicates automatic execution of the program, but the program has not yet been stored, wherein the plurality of sets included in the single download request includes at least Object Carousel and Internet Protocol as the download methods.

* * * * *